(12) United States Patent
Matsumura

(10) Patent No.: US 9,065,713 B2
(45) Date of Patent: Jun. 23, 2015

(54) OFDM RECEPTION DEVICE, OFDM RECEPTION CIRCUIT, OFDM RECEPTION METHOD, AND OFDM RECEPTION PROGRAM

(75) Inventor: Yoshinobu Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 42 days.

(21) Appl. No.: 13/519,203

(22) PCT Filed: Oct. 3, 2011

(86) PCT No.: PCT/JP2011/005571
§ 371 (c)(1),
(2), (4) Date: Jun. 26, 2012

(87) PCT Pub. No.: WO2012/060051
PCT Pub. Date: May 10, 2012

(65) Prior Publication Data
US 2012/0321021 A1    Dec. 20, 2012

(30) Foreign Application Priority Data

Nov. 2, 2010   (JP) ................................. 2010-246493

(51) Int. Cl.
*H04L 27/06*     (2006.01)
*H04L 27/26*     (2006.01)

(52) U.S. Cl.
CPC ........ *H04L 27/2607* (2013.01); *H04L 27/2613* (2013.01); *H04L 27/2657* (2013.01); *H04L 27/2675* (2013.01)

(58) Field of Classification Search
CPC ....................................................... H04L 25/067
USPC ........................................................... 375/340
See application file for complete search history.

(56) References Cited

U.S. PATENT DOCUMENTS 6,873,864 B2    3/2005  Kai et al.
8,090,333 B2 *  1/2012  Okada ........................ 455/192.2
(Continued)

FOREIGN PATENT DOCUMENTS

| CN | 1768501 | 5/2006 |
|---|---|---|
| CN | 101222465 | 7/2008 |
| CN | 102652408 | 8/2012 |
| JP | 2006-304152 | 11/2006 |
| JP | 2011-23993 | 2/2011 |

OTHER PUBLICATIONS

International Search Report issued Nov. 1, 2011 in International (PCT) Application No. PCT/JP2011/005571.

(Continued)

*Primary Examiner* — Santiago Garcia
(74) *Attorney, Agent, or Firm* — Wenderoth, Lind & Ponack, L.L.P.

(57) ABSTRACT

An OFDM reception device including: a first orthogonal transformation unit that orthogonally transforms a signal for a useful symbol duration included in an OFDM signal and outputs a resulting orthogonally transformed signal; a second orthogonal transformation unit that orthogonally transforms a signal for a guard interval duration included in the OFDM signal and outputs a resulting orthogonally transformed signal; a detection unit that detects a wide band carrier frequency error amount according to the signal output from the first orthogonal transformation unit and the signal output from the second orthogonal transformation unit; and a correction unit that corrects a wide band carrier frequency shift of the OFDM symbol according to the wide band carrier frequency error amount detected by the detection unit.

16 Claims, 39 Drawing Sheets

(56) References Cited

U.S. PATENT DOCUMENTS

| | | | |
|---|---|---|---|
| 2005/0113258 A1 | 5/2005 | Kai et al. | |
| 2005/0254414 A1 | 11/2005 | Suda et al. | |
| 2006/0233225 A1* | 10/2006 | Omoto | 375/149 |
| 2008/0090536 A1* | 4/2008 | Okada | 455/208 |
| 2010/0082668 A1* | 4/2010 | Hsueh et al. | 707/770 |
| 2010/0290449 A1* | 11/2010 | van Nee et al. | 370/338 |
| 2011/0013729 A1 | 1/2011 | Yuba et al. | |
| 2012/0207250 A1 | 8/2012 | Matsumura | |

OTHER PUBLICATIONS

Final draft ETSI EN 302 755 V1.2.1, (Oct. 2010), pp. 57-61, 118-123.

Jonathan Stott, "The P1 Symbol", DTG DVB-T2 Implementers' Seminar, Oct. 9, 2008, pp. 1-16, Internet<http://www.dtg.org.uk/dtg/t2docs/P1_Jonathon_Stott_BBC.pdf>.

"An Implementation-friendly Synchronization Algorithm for Multimedia HDTV Receivers", Alexander Viessmann et al., Applied Sciences in Biomedical and Communication Technologies, Nov. 27, 2009.

Draft ETSI TR 102 831 V0.10.04 Digital Video Broadcasting (DVB); Implementation guidelines for a second generation digital terrestrial television broadcasting system (DVB-T2), Mar. 2010.

Office Action issued May 26, 2014 in Chinese Application No. 201180005307.5, with partial English language translation.

A. Viemann et al., "Implementation-friendly sychronisation algorithm for DVB-T2", Electronic Letters, Feb. 18, 2010, vol. 46, No. 4.

Lorenzo Vangelista et al., "Key Technologies for Next-Generation Terrestrial Digital Television Standard DVB-T2", IEEE Comminucations Magazine, Oct. 2009, pp. 146-153.

* cited by examiner

FIG. 31

| Signal | Value | Sequence (hexadecimal) CSSs1 and CSSs2 |
|---|---|---|
| S1 | 000 | 124721741D482E7B |
| | 001 | 47127421481D7B2E |
| | 010 | 217412472E7B1D48 |
| | 011 | 742147127B2E481D |
| | 100 | 1D482E7B12472174 |
| | 101 | 481D7B2E47127421 |
| | 110 | 2E7B1D4821741247 |
| | 111 | 7B2E481D74214712 |
| S2 | 0000 | 121D4748212E747B1D1248472E217B7412E247B721D174841DED48B82EDE7B8B |
| | 0001 | 4748121D747B212E48471D127B742E2147B712E2748421D148B81DED7B8B2EDE |
| | 0010 | 212E747B121D47482E217B741D12484721D1748412E247B72EDE7B8B1DED48B8 |
| | 0011 | 747B212E4748121D7B742E2148471D12748421D147B712E27B8B2EDE48B81DED |
| | 0100 | 1D1248472E217B74121D4748212E747B1DED48B82EDE7B8B12E247B721D17484 |
| | 0101 | 48471D127B742E214748121D747B212E48B81DED7B8B2EDE47B712E2748421D1 |
| | 0110 | 2E217B741D124847212E747B121D47482EDE7B8B1DED48B821D1748412E247B7 |
| | 0111 | 7B742E2148471D12747B212E4748121D7B8B2EDE48B81DED748421D147B712E2 |
| | 1000 | 12E247B721D174841DED48B82EDE7B8B121D4748212E747B1D1248472E217B74 |
| | 1001 | 47B712E2748421D148B81DED7B8B2EDE4748121D747B212E48471D127B742E21 |
| | 1010 | 21D1748412E247B72EDE7B8B1DED48B8212E747B121D47482E217B741D124847 |
| | 1011 | 748421D147B712E27B8B2EDE48B81DED747B212E4748121D7B742E2148471D12 |
| | 1100 | 1DED48B82EDE7B8B12E247B721D174841D1248472E217B74121D4748212E747B |
| | 1101 | 48B81DED7B8B2EDE47B712E2748421D148471D127B742E214748121D747B212E |
| | 1110 | 2EDE7B8B1DED48B821D1748412E247B72E217B741D124847212E747B121D4748 |
| | 1111 | 7B8B2EDE48B81DED748421D147B712E27B742E2148471D12747B212E4748121D |

FIG. 32

| Modulation sequence | Active carrier positions of P1 symbol k(0)...k(383) |
|---|---|
| k(0)...k(63) CSS_S1 | 44 45 47 51 54 59 62 64 65 66 70 75 78 80 81 82 84 85 87 88 89 90<br>94 96 97 98 102 107 110 112 113 114 116 117 119 120 121 122 124<br>125 127 131 132 133 135 136 137 138 142 144 145 146 148 149 151<br>152 153 154 158 160 161 162 166 171 |
| k(64)...k(319) CSS_S2 | 172 173 175 179 182 187 190 192 193 194 198 203 206 208 209 210<br>212 213 215 216 217 218 222 224 225 226 230 235 238 240 241 242<br>244 245 247 248 249 250 252 253 255 259 261 263 264 265 266<br>270 272 273 274 276 277 279 280 281 282 286 288 289 290 294 299<br>300 301 303 307 310 315 318 320 321 322 326 331 334 336 337 338<br>340 341 343 344 345 346 350 352 353 354 358 363 364 365 367 371<br>374 379 382 384 385 386 390 395 396 397 399 403 406 411 412 413<br>415 419 420 421 423 424 425 426 428 429 431 435 438 443 446 448<br>449 450 454 459 462 464 465 466 468 469 471 472 473 474 478 480<br>481 482 486 491 494 496 497 498 500 501 503 504 505 506 508 509<br>511 515 516 517 519 520 521 522 526 528 529 530 532 533 535 536<br>537 538 542 544 545 546 550 555 558 560 561 562 564 565 567 568<br>569 570 572 573 575 579 580 581 583 584 585 586 588 589 591 595<br>598 603 604 605 607 611 612 613 615 616 617 618 622 624 625 626<br>628 629 631 632 633 634 636 637 639 643 644 645 647 648 649 650<br>654 656 657 658 660 661 663 664 665 666 670 672 673 674 678 683 |
| k(320)...k(383) CSS_S1 | 684 689 692 696 698 699 701 702 703 704 706 707 708<br>712 714 715 717 718 719 720 722 723 725 726 727 729<br>733 734 735 736 738 739 740 744 746 747 748 753 756<br>760 762 763 765 766 767 768 770 771 772 776 778 779<br>780 785 788 792 794 795 796 801 805 806 807 809 |

FIG. 33

| | FFT size | Guard interval fraction | | | | | | |
|---|---|---|---|---|---|---|---|---|
| | | 1/128 | 1/32 | 1/16 | 19/256 | 1/8 | 19/128 | 1/4 |
| | 32k | PP7 | PP4 PP6 | PP2 PP8 PP4 | PP2 PP8 PP4 | PP2 PP8 | PP2 PP8 | NA |
| | 16k | PP7 | PP6 | PP7 PP4 PP5 | PP2 PP8 PP4 PP5 | PP2 PP8 PP4 PP5 | PP2 PP3 PP8 | PP2 PP3 PP8 | PP1 PP8 |
| | 8k | PP7 | PP7 PP4 | PP8 PP4 PP5 | PP8 PP4 PP5 | PP2 PP3 PP8 | PP2 PP3 PP8 | PP1 PP8 |
| | 4k, 2k | NA | PP7 PP4 | PP4 PP5 | NA | PP2 PP3 | NA | PP1 |
| SISO | 1k | NA | NA | PP4 PP5 | NA | PP2 PP3 | NA | PP1 |
| | FFT size | Guard interval fraction | | | | | | |
| | | 1/128 | 1/32 | 1/16 | 19/256 | 1/8 | 19/128 | 1/4 |
| | 32k | PP8 PP4 PP6 | PP8 PP4 | PP2 PP8 | PP2 PP8 | NA | NA | NA |
| | 16k | PP8 PP4 PP5 | PP8 PP4 PP5 | PP3 PP8 | PP3 PP8 | PP1 PP8 | PP1 PP8 | NA |
| | 8k | PP8 PP4 PP5 | PP8 PP4 PP5 | PP3 PP8 | PP3 PP8 | PP1 PP8 | PP1 PP8 | NA |
| | 4k, 2k | NA | PP4 PP5 | PP3 | NA | PP1 | NA | PP1 |
| MISO | 1k | NA | NA | PP3 | NA | PP1 | NA | PP1 |

FIG. 34

| FFT size | Number of P2 symbols |
|---|---|
| 1k | 16 |
| 2k | 8 |
| 4k | 4 |
| 8k | 2 |
| 16k | 1 |
| 32k | 1 |

OFDM RECEPTION DEVICE, OFDM RECEPTION CIRCUIT, OFDM RECEPTION METHOD, AND OFDM RECEPTION PROGRAM

TECHNICAL FIELD

The present invention relates to technology for receiving a signal transmitted by multiplexing a plurality of orthogonal subcarriers.

BACKGROUND ART

Currently, Orthogonal Frequency Division Multiplexing (OFDM) is a widely used transmission scheme that has been adopted for digital terrestrial broadcasting and a variety of other digital communications, such as IEEE 802.11a. In the OFDM method, a plurality of narrow band digital modulated signals are frequency multiplexed using a plurality of orthogonal subcarriers. OFDM is therefore an excellent transmission scheme for efficiently using frequencies.

Furthermore, in the OFDM method, one symbol duration is composed of a useful symbol duration and a guard interval duration. To provide periodicity within a symbol, a signal for a portion of the useful symbol duration is copied and inserted into the guard interval duration. This allows for elimination of the effect of interference between symbols produced by multipath interference. OFDM is therefore also highly resistant to multipath interference.

In recent years, analog television broadcasting has ceased in many countries around the world, and efforts towards frequency reallocation are gaining momentum. Particularly, in Europe, in addition to Standard Definition (SD) broadcasting for Digital Video Broadcasting-Terrestrial (DVB-T), a demand for High Definition (HD) service is rising. Given these circumstances, progress has been made in the standardization of DVB-T2, the second generation of European digital terrestrial broadcasting. In the DVB-T2 system, as shown in FIG. 27, DVB-T2 frames are used. A DVB-T2 frame includes a P1 symbol, P2 symbols, and data symbols.

First, explanation is provided of a P1 symbol in a DVB-T2 frame.

A P1 symbol is set to have a Fast Fourier Transform (FFT) size of 1 k (1024). Further, as illustrated in FIG. 28, a guard interval duration is provided on both sides preceding and following the useful interval duration in a P1 symbol. Note that FIG. 28 illustrates a P1 symbol in the time domain. The guard interval durations in a P1 symbol differ from guard interval durations provided in conventional schemes such as Integrated Services Digital Broadcasting-Terrestrial (ISDB-T) and DVB-T. That is, in a P1 symbol, a signal for 59 μs from the earlier half of the useful symbol duration in the time domain, is copied and inserted into the guard interval duration that precedes the useful symbol duration (hereinafter referred to as a "preceding guard interval duration"). A signal for 53 μs from the latter half of the useful symbol duration, in the time domain, is copied and inserted into the guard interval duration that follows the useful symbol duration (hereinafter referred to as a "succeeding guard interval duration"). In addition, when copying and inserting such signals into the respective guard interval durations (the preceding guard interval duration or the succeeding guard interval duration), the original signals are frequency shifted by a predetermined frequency $f_{SH}$ before being inserted. Here, the predetermined frequency $f_{SH}$ corresponds to one subcarrier spacing in a P1 symbol. That is, the signal for the preceding guard interval duration and the signal for the succeeding guard interval duration are higher in frequency than the signal for the useful symbol duration by one subcarrier of a P1 symbol. Note that as illustrated in FIG. 28, the entire useful symbol duration is copied and used in the guard interval durations in a P1 symbol.

In addition, a P1 symbol is composed of active carriers and null carriers (unused carriers) as illustrated in FIG. 29. Note that FIG. 29 illustrates a P1 symbol in the frequency domain.

A P1 symbol includes information (hereinafter referred to as "P1 transmission information") such as: information indicating whether the transmission format of the P2 symbols and the data symbols is Multiple-Input-Single-Output (MISO) or Single-Input-Single-Output (SISO) (hereinafter referred to as "MISO/SISO information"); information indicating the FFT size of the P2 symbols and the data symbols (hereinafter referred to as "FFT size information"); and information indicating whether Future Extension Frames (FEFs) are included (hereinafter referred to as "FEF inclusion information"). An FEF is a part reserved for future transmission services differing from DVB-T2 and is inserted in between two DVB-T2 frames. Further, a P1 symbol is located at the head of an FEF as well.

In the following, explanation is provided concerning the generation of a P1 symbol.

FIG. 30 illustrates a structure of a P1 symbol generation unit 1000 that generates a P1 symbol. The P1 symbol generation unit 1000 includes: a sequence transformation unit 1001; a differential modulation unit 1002; a scrambling unit 1003; a CDS table generation unit 1004; a padding unit 1005; an IFFT unit 1006; and a GI adding unit 1007.

As explained above, P1 transmission information is transmitted in a P1 symbol. The P1 transmission information is represented as a three-bit S1 signal and a four-bit S2 signal. The sequence transformation unit 1001 receives a three-bit S1 signal and a four-bit S2 signal as input. The sequence transformation unit 1001 stores a transform table such as the one illustrated in FIG. 31. By referring to the transform table, the sequence transformation unit 1001 transforms the three-bit S1 signal into a 64-bit sequence $CSS_{S1}$, represented by Math 1 below, and the four-bit S2 signal into a 256-bit sequence $CSS_{S2}$, represented by Math 2 below. Values in the "Value" column in FIG. 31 indicate values input to the sequence transformation unit 1001 and the sequences in the "Sequence (hexadecimal) $CSS_{S1}$ and $CSS_{S2}$" column in FIG. 31 indicate sequences after transformation (the sequences output from the sequence transformation unit 1001). Note that in FIG. 31, the transformed sequences $CSS_{S1}$ and $CSS_{S2}$ are represented in hexadecimal for the sake of convenience.

$$CSS_{S1} = (CSS_{S1,0}, \ldots, CSS_{S1,63}) \qquad \text{Math 1}$$

$$CSS_{S2} = (CSS_{S2,0}, \ldots, CSS_{S2,255}) \qquad \text{Math 2}$$

The sequence transformation unit 1001 further forms a 384-bit signal sequence MSS_SEQ indicated in Math 3 below by using the sequence $CSS_{S1}$ represented by Math 1 and the sequence $CSS_{S2}$ represented by Math 2 and outputs the signal sequence MSS_SEQ to the differential modulation unit 1002. Note that the signal sequence MSS_SEQ includes two identical S1 signals.

$$\begin{aligned} \text{MSS\_SEQ} &= (\text{MSS\_SEQ}_0, \ldots, \text{MSS\_SEQ}_{383}) \qquad \text{Math 3}\\ &= (CSS_{S1}, CSS_{S2}, CSS_{S1})\\ &= (CSS_{S1,0}, \ldots, CSS_{S1,63}, CSS_{S2,0}, \ldots,\\ &\quad CSS_{S2,255}, CSS_{S1,0}, \ldots, CSS_{S1,63}) \end{aligned}$$

The differential modulation unit 1002 receives the signal sequence MSS_SEQ from the sequence transformation unit 1001 as input and performs differential modulation indicated in Math 4 below on the signal sequence MSS_SEQ. The differential modulation unit 1002 outputs a differentially modulated signal sequence MSS_DIFF to the scrambling unit 1003. The differential modulation performed by the differential modulation unit 1002 is Differential Binary Phase Shift Keying (DBPSK).

$$MSS\_DIFF = DBPSK(MSS\_SEQ) \qquad \text{Math 4}$$

In specific, the differential modulation unit 1002 treats a reference signal $MSS\_DIFF_{-1}$ as "1", as indicated in Math 5 below, and performs differential modulation in accordance with Math 6 below on the signals $MSS\_SEQ_i$ (I=0, 1, ..., 83) composing the signal sequence MSS_SEQ input from the sequence transformation unit 1001. The differential modulation unit 1002 outputs the differentially modulated signal $MSS\_DIFF_i$ to the scrambling unit 1003.

$$MSS\_DIFF_{-1} = 1 \qquad \text{Math 5}$$

$$MSS\_DIFF_i = \begin{cases} MSS\_DIFF_{i-1} & : MSS\_SEQ_i = 0 \\ -MSS\_DIFF_{i-1} & : MSS\_SEQ_i = 1 \end{cases} \qquad \text{Math 6}$$

The scrambling unit 1003 performs scrambling indicated in Math 7 below on the differentially modulated signal sequence MSS_DIFF input from the differential modulation unit 1002 and outputs a scrambled signal sequence MSS_SCR to the padding unit 1005.

$$MSS\_SCR = \text{SCRAMBLING}(MSS\_DIFF) \qquad \text{Math 7}$$

In specific, the scrambling unit 1003 performs scrambling indicated in Math 8 below on the differentially modulated signal $MSS\_DIFF_i$ by using a signal $PRBS_i$ (I=0, 1, ..., 383) based on a Pseudo Random Binary Sequence (PRBS). The scrambling unit 1003 outputs a scrambled signal $MSS\_SCR_i$ to the padding unit 1005.

$$MSS\_SCR_i = MSS\_DIFF_i \times 2\left(\frac{1}{2} - PRBS_i\right) \qquad \text{Math 8}$$

The CDS table generation unit 1004 generates a Carrier Distribution Sequence (CDS) table illustrated in FIG. 32, which indicates a position k(i) (i=0, 1, ..., 383) of each active carrier in a P1 symbol. Note that as illustrated in FIG. 32, two identical S1 signals are transmitted in two positions in one P1 symbol, one in a high frequency range and another in a low frequency range of the P1 symbol. On the other hand, an S2 signal is transmitted in a central frequency range of the P1 symbol.

The padding unit 1005 treats a subcarrier at a subcarrier position k(i), indicated in the CDS table (refer to FIG. 32) generated by the CDS table generation unit 1004, as an active carrier. The padding unit 1005 maps the scrambled signal $MSS\_SCR_i$ to a subcarrier at a subcarrier position k(i) and outputs the results of the mapping to the IFFT unit 1006. Further, the padding unit 1005 outputs subcarriers at subcarrier positions not listed in the CDS table illustrated in FIG. 32 to the IFFT unit 1006 as null carriers.

The IFFT unit 1006 performs an Inverse Fast Fourier Transform (IFFT) of a size 1 k on the signals output by the padding unit 1005. The IFFT unit 1006 then outputs the results of the IFFT (a time domain signal for the useful symbol duration illustrated in FIG. 28) to the GI adding unit 1007.

The GI adding unit 1007 uses the signal for the useful symbol duration input from the IFFT unit 1006 to frequency shift an earlier portion of the signal for the useful symbol duration by a frequency $f_{SH}$ and insert the result in the preceding guard interval duration, and also to frequency shift a later portion of the signal for the useful symbol duration by a frequency $f_{SH}$ and insert the result in the succeeding guard interval duration (refer to FIG. 28). A P1 symbol is thus generated.

Subsequently, explanation is provided of P2 symbols and data symbols.

P2 symbols and data symbols share a common FFT size and a common guard interval fraction (ratio of a time domain length of a guard interval duration to a time domain length of a useful symbol duration). Note that the guard interval duration in P2 symbols and in data symbols is provided preceding the useful symbol duration, as in DVB-T and ISDB-T. Further, a signal for a later portion of the useful symbol duration in the time domain is copied and inserted into the guard interval duration preceding the useful symbol duration.

FIG. 33 illustrates combinations of FFT size and guard interval fraction used in DVB-T2, along with pilot patterns that can be set for such combinations. There are eight pilot patterns, namely pilot patterns PP1 through PP8. In FIG. 33, "N/A" indicates a combination of FFT size and guard interval fraction that is not supported under DVB-T2.

A P2 symbol includes pilots (hereinafter referred to as "P2 pilots") inserted at equal intervals. In specific, one P2 pilot exists every six subcarriers for FFT size of 32 k and in SISO mode. Otherwise, one P2 pilot exists every three subcarriers.

A P2 symbol includes any transmission parameter information required for reception (hereinafter referred to as "P2 transmission information"). The P2 transmission information includes information such as: information indicating the pilot pattern of the data symbols (hereinafter referred to as "pilot pattern information"); information indicating whether the carrier extension mode is Extended mode or Normal mode (hereinafter referred to as "transmission mode information"); information indicating the number of symbols included per frame; information indicating the modulation method; and information indicating a coding ratio of the Forward Error Correction (FEC) code. Note that the number of P2 symbols included per DVB-T2 frame is set according to the FFT size of the P2 symbols as illustrated in FIG. 34.

Non-Patent Literature 1 provides one technology for demodulating P1 symbols in the above-described DVB-T2 transmission format.

FIG. 35 illustrates a structure of a P1 demodulation unit 2000 that demodulates P1 symbols. The P1 demodulation unit 2000 includes: a P1 position detection unit 2001; a P1 narrow band fc error detection/correction unit 2002; an FFT unit 2003; a CDS table generation unit 2004; a P1 wide band fc error detection/correction unit 2005; and a P1 decoding unit 2006.

The P1 position detection unit 2001 uses input signals and calculate correlations (guard correlations) between a signal for the guard interval duration (the preceding guard interval duration and the succeeding guard interval duration) and a signal for a predetermined portion of the useful symbol duration of the P1 symbol. The P1 position detection unit 2001 calculates the integral of the calculated correlations over the time domain length of the guard interval duration (the preceding guard interval duration and the succeeding guard interval duration) and detects the position of the P1 symbol in the input signals by detecting the peak value of the integral.

The calculation of the correlations takes into consideration a frequency shift of a frequency $f_{SH}$ that is added at the transmitting end. In addition, the "predetermined portion" of the useful symbol duration is the earlier portion of the useful symbol duration for the preceding guard interval duration and is the later portion of the useful symbol duration for the succeeding guard interval duration (refer to FIG. 28). The same applies for the calculation of the correlations performed by the P1 narrow band fc error detection/correction unit 2002 described in the following.

The P1 narrow band fc error detection/correction unit 2002 calculates the correlations (guard correlations) between the signal for the guard interval duration (the preceding guard interval duration and the succeeding guard interval duration) and the signal for a predetermined portion of the useful symbol duration of the P1 symbol. According to the correlations, the P1 narrow band fc error detection/correction unit 2002 detects a frequency error amount (a narrow band carrier frequency error amount) that is equal to or smaller than one subcarrier spacing of the P1 symbol. According to the narrow band carrier frequency error amount so detected, the P1 narrow band fc error detection/correction unit 2002 corrects a narrow band carrier frequency shift of the P1 symbol and outputs the P1 symbol whose narrow band carrier frequency shift has been corrected to the FFT unit 2003.

The FFT unit 2003 performs an FFT of size 1 k on the time domain signal for the useful symbol duration of the P1 symbol and outputs the results of the FFT (a frequency domain signal of the useful symbol duration of the P1 symbol) to the P1 wide band fc error detection/correction unit 2005.

The CDS table generation unit 2004 generates a sequence indicating the positions of active carriers in the P1 symbol (hereinafter referred to as an "active carrier arrangement sequence") and outputs the active carrier arrangement sequence so generated to the P1 wide band fc error detection/correction unit 2005. The active carrier arrangement sequence is a sequence with a "1" at positions corresponding to active carriers, as indicated in FIG. 32, and a "0" at other positions corresponding to null carriers.

The P1 wide band fc error detection/correction unit 2005 uses the active carrier arrangement sequence input from the CDS table generation unit 2004 and detects a frequency error amount (a wide band carrier frequency error amount) in units of a subcarrier spacing of the P1 symbol of the signal output by the FFT unit 2003. According to the wide band carrier frequency error amount so detected, the P1 wide band fc error detection/correction unit 2005 corrects a wide band carrier frequency shift of the P1 symbol. The P1 wide band fc error detection/correction unit 2005 extracts only active carriers in the P1 symbol whose wide band carrier frequency shift has been corrected and outputs the active carriers so extracted to the P1 decoding unit 2006.

In the following, explanation is provided concerning the detection of the wide band carrier frequency error amount for the P1 symbol. As described above, subcarriers composing a P1 symbol are either active carriers or null carriers. By taking advantage of this structure, the P1 wide band fc error detection/correction unit 2005 calculates the power of each subcarrier, and further, calculates the correlations (arrangement correlations) between the results of the calculation and a known active carrier arrangement sequence (input from the CDS table generation unit 2004) while shifting the results of the calculation one subcarrier at a time.

Since signals on which DBPSK has been performed are mapped to the active carriers, the arrangement correlation value for a shift amount corresponding to a wide band carrier frequency error amount is the sum of the power values of all active carriers. This arrangement correlation value is a greater value than the arrangement correlation values for other shift amounts, which include power values of null carriers. As such, the shift amount yielding the greatest arrangement correlation value is determined as the wide band carrier frequency error amount. It is thus possible to detect the wide band carrier frequency error amount. Note that the shift amount when there is no wide band carrier frequency error amount in the input signal is treated as a reference (shift amount "0") here and in the following description.

The P1 decoding unit 2006 illustrated in FIG. 35 decodes the P1 symbol according to the active carriers in the P1 symbol input from the P1 wide band fc error detection/correction unit 2005 and extracts the P1 transmission information.

Explanation is provided of the P1 decoding unit 2006 with reference to FIG. 36. FIG. 36 illustrates a structure of the P1 decoding unit 2006 illustrated in FIG. 35. The P1 decoding unit 2006 includes: a descrambling unit 2101; a differential demodulation unit 2102; and a pattern matching unit 2103. Note that here, the P1 decoding unit 2006 decodes a P1 symbol by using only the S1 signal included in the low frequency range of the P1 symbol.

The descrambling unit 2101 receives a signal sequence Act of the active carriers of the P1 symbol from the P1 wide band fc error detection/correction unit 2005 illustrated in FIG. 35 as input. The descrambling unit 2101 performs the descrambling indicated in Math 9 below on the active carrier signal sequence Act and outputs a descrambled signal sequence DESCR to the differential demodulation unit 2102.

DESCR=DESCRAMBLING(Act)  Math 9

In specific, the descrambling unit 2101 performs descrambling as indicated in Math 10 below on the active carrier signal Act by using a signal $PRBS_i$ (I=0, 1, ..., 319), based on a PRBS used for multiplication at the transmitting end, and outputs a descrambled signal $DESCR_i$ to the differential demodulation unit 2102.

$$DESCR_i = Act_i \times 2\left(\frac{1}{2} - PRBS_i\right) \quad \text{Math 10}$$

The differential demodulation unit 2102 receives the descrambled signal $DESCR_i$ (i=0, 1, ..., 319) from the descrambling unit 2101 as input. The differential demodulation unit 2102 performs differential detection by complex multiplication of the signal $DESCR_i$ (i=0, 1, ..., 319) and a signal $DESCR^*_{i-1}$, which is the complex conjugate of a signal $DESCR_{i-1}$ obtained by shifting the signal $DESCR_i$ by one active carrier. Note that the suffix "*" in superscript represents a complex conjugate (the same applying in the following as well). Further, the differential demodulation unit 2102 demodulates (hard decision) the signal $DESCR_i \cdot DESCR^*_{i-1}$ according to the polarity of the real axis of the result of the differential detection and outputs the demodulated signal $DEMOD_i$ to the pattern matching unit 2103. The processing by the differential demodulation unit 2102 is represented by Math 11 below. The differential demodulation by the differential demodulation unit 2102 is demodulation corresponding to DBPSK.

$$DEMOD_i = \begin{cases} 0: & \text{real } (DESCR_i \cdot DESCR_{i-1}^*) \geq 0 \\ 1: & \text{real } (DESCR_i \cdot DESCR_{i-1}^*) < 0 \end{cases} \quad \text{Math 11}$$

Since i=0 is a reference, the differential demodulation unit 2102 performs demodulation (hard decision) according to the polarity of the real axis of the signal $DESCR_0$ and outputs the demodulated signal $DEMOD_0$ to the pattern matching unit 2103.

The pattern matching unit 2103 divides the signals $DEMOD_0$, $DEMOD_1$, ..., $DEMOD_{319}$ differentially demodulated by the differential demodulation unit 2102 into a signal sequence $DEMOD\_CSS_{S1}$ (corresponding to the S1 signal) and a signal sequence $DEMOD\_CSS_{S2}$ (corresponding to the S2 signal) as indicated in Math 12 and Math 13 below.

$$\begin{aligned} DEMOD\_CSS_{S1} &= (DEMOD_0, \ldots, DEMOD_{63}) \\ &= (DEMOD\_CSS_{S1,0}, \ldots, DEMOD\_CSS_{S1,63}) \end{aligned} \quad \text{Math 12}$$

$$\begin{aligned} DEMOD\_CSS_{S2} &= (DEMOD_{64}, \ldots, DEMOD_{319}) \\ &= (DEMOD\_CSS_{S2,0}, \ldots, DEMOD\_CSS_{S2,255}) \end{aligned} \quad \text{Math 13}$$

Further, the pattern matching unit 193 performs the following processing to calculate which of the sequences $CSS_{S1,k}$ (k=0, 1, ..., 7) indicated in FIG. 31 has the highest degree of certainty and to calculate which of the signal sequences $CSS_{S2,k}$ (k=0, 1, ..., 15) indicated in FIG. 31 has the highest degree of certainty. In this context, the index k is used to differentiate the 8 sequences $CSS_{S1}$ indicated in FIG. 31 and to differentiate the 16 sequences $CSS_{S2}$ indicated in FIG. 31 (the same applying in the following as well).

The pattern matching unit 2103 calculates correlations $CORR_{S1,k}$ between the sequences $CSS_{S1,k}$ indicated in FIG. 31 and the sequence $DEMOD\_CSS_{S1}$, as indicated in Math 14 below. The pattern matching unit 2103 also calculates correlations $CORR_{S2,k}$ between the sequences $CSS_{S2,k}$ indicated in FIG. 31 and the sequence $DEMOD\_CSS_{S2}$, as indicated in Math 15 below.

$$CORR_{S1,k} = \sum_{i=0}^{63} DEMOD\_CSS_{S1,i} \oplus CSS_{S1,k,i} \quad \text{Math 14}$$

$\oplus$ indicates exclusive or $$CORR_{S2,k} = \sum_{i=0}^{255} DEMOD\_CSS_{S2,i} \oplus CSS_{S2,k,i} \quad \text{Math 15}$$

$\oplus$ indicates exclusive or

The pattern matching unit 2103 estimates that the three-bit S1 signal (refer to FIG. 31) corresponding to the signal sequence $CSS_{S1,k}$ having the greatest correlation value among the 8 correlation values calculated by using Math 14 above is the transmitted S1 signal. The pattern matching unit 2103 also estimates that the four-bit S2 signal (refer to FIG. 31) corresponding to the signal sequence $CSS_{S2,k}$ having the greatest correlation value among the 16 correlation values calculated by using Math 15 above is the transmitted S2 signal. The pattern matching unit 2103 obtains the P1 transmission information by using the S1 signal and the S2 signal so estimated.

CITATION LIST

Non-Patent Literature

[Non-Patent Literature 1]
Draft ETSI TR 102 831 v0.10.04 Digital Video Broadcasting (DVB); Implementation guidelines for a second generation digital terrestrial television broadcasting system (DVB-T2)

SUMMARY OF INVENTION

Technical Problem

However, as already mentioned in the above, a P1 symbol is composed of active carriers and null carriers (refer to FIG. 29). Further, as illustrated in FIG. 37, the signal for the guard interval duration of the P1 symbol is yielded by frequency shifting the signal for the useful symbol duration in the high frequency direction by a frequency corresponding to one subcarrier (a frequency corresponding to $f_{SH}$ above). As such, the following problems occur in an environment with noise and/or an environment with multi-path interference. Note that in FIG. 37, the values shown below the frequency axis are subcarrier numbers and not the actual frequency values.

FIG. 38 is a schematic diagram of a reception signal in a case where multi-path interference exists. The first wave received is treated as a main wave and the second wave received is treated as a delayed wave. FIG. 39 illustrates a distribution of subcarriers in a case where FFT is performed on a section corresponding to the signal for the useful symbol duration of the first (main) wave as illustrated in FIG. 38.

When multi-path interference exists, not only signal components for the useful symbol duration of the main wave of the FFT-target P1 symbol but also signal components for the preceding guard interval duration of the delayed wave of the FFT-target P1 symbol is included in the FFT section. In addition, depending upon the delay amount of the delayed wave (particularly, in a case where the delay amount exceeds the time domain length of the preceding guard interval duration), the FFT section includes signal components for a preceding guard interval duration of the delayed wave of the FFT-target P1 symbol and signal components for a previous OFDM symbol (for instance, a data symbol), in addition to signal components for the main wave of the FFT-target P1 symbol.

The signal for the preceding guard interval duration and the signal for the succeeding guard interval duration are each yielded by frequency shifting the signal for the useful symbol duration in the high frequency direction by a frequency corresponding to one subcarrier. As such, in a case where a delayed wave exists, in the result of the FFT, the active carrier signal components for the preceding guard interval duration of the delayed wave appear higher in position in the frequency direction by a frequency corresponding to one subcarrier than the active carrier signal components for the useful symbol duration of the main wave as illustrated in FIG. 39. In addition, although not illustrated in FIG. 39, signal components for another OFDM symbol (for instance, a data symbol) are to appear in all subcarriers in the result of the FFT.

This brings about an increase in the power of null carrier signal components, which may cause the calculation of the arrangement correlations by the P1 wide band fc error detection/correction unit 2005 to be performed in an undesirable manner. That is, cases may occur where the arrangement correlation values for arrangements of subcarriers other than the correct arrangement of subcarriers do not fall smaller than the arrangement correlation value for the correct arrangement of subcarriers as desired, but exceed the arrangement correlation value for the correct arrangement of subcarriers. In such a case, the estimation of the wide band carrier frequency error amount by the P1 wide band fc error detection/correction unit 2005 is performed incorrectly. Note that the estimation of the wide band carrier frequency error amount by the P1 wide band fc error detection/correction unit 2005 is also performed incorrectly in a case where a preceding wave exists, due to the existence of the preceding wave.

In addition, there are cases where the estimation of the wide band carrier frequency error amount by the P1 wide band fc error detection/correction unit 2005 is performed incorrectly in an environment with noise due to noise components appearing in all subcarriers in the result of the FFT, which results in an undesirable increase in the power values of null carrier signal components.

When the estimation of the wide band carrier frequency error amount is performed incorrectly as in such cases as described above, differential demodulation is performed by using the incorrect subcarriers, which results in the P1 transmission information not being obtained correctly. Such a situation is problematic since stable reception of OFDM data cannot be performed.

In the above, explanation has been provided that the incorrect estimation of the wide band carrier frequency error amount in an environment with multi-path interference and/or an environment with noise is problematic in a case where the P1 symbol of a DVB-T2 frame is the processing target. However, the incorrect estimation of the wide band carrier frequency error amount is problematic not only in such a case where the P1 symbol of a DVB-T2 frame is the processing target. That is, the incorrect estimation of the wide band carrier frequency error amount is a significant problem in general at the reception end since degradation in reception performance for the reception of signals is brought about.

In view of such problems, one aim of the present invention is to provide an OFDM reception device, an OFDM reception circuit, an OFDM reception method, and an OFDM reception program that can improve the accuracy with which the wide band carrier frequency error amount is estimated for an OFDM symbol that includes a signal for a useful symbol duration and a signal for a guard interval duration based on the signal for the useful symbol duration.

Solution to Problem

So as to achieve the above-described aim, an OFDM reception device that is one aspect of the present invention is an OFDM reception device for receiving an OFDM symbol that includes a signal for a useful symbol duration and a signal for a guard interval duration generated based on the signal for the useful symbol duration, the OFDM reception device comprising: a first orthogonal transformation unit that orthogonally transforms the signal for the useful symbol duration and outputs a resulting orthogonally transformed signal; a second orthogonal transformation unit that orthogonally transforms the signal for the guard interval duration and outputs a resulting orthogonally transformed signal; a detection unit that detects a wide band carrier frequency error amount according to the signal output from the first orthogonal transformation unit and the signal output from the second orthogonal transformation unit; and a correction unit that corrects a wide band carrier frequency shift of the OFDM symbol according to the wide band carrier frequency error amount.

Advantageous Effects of Invention

According to the above-described OFDM reception device that is one aspect of the present invention, the detection of the wide band carrier frequency error amount for the OFDM symbol is performed by using two signals, namely the signal for the useful symbol duration and the signal for the guard interval duration based on the signal for the useful symbol duration. Hence, even in an environment with multi-path interference and/or a very noisy environment, incorrect estimation of the wide band carrier frequency error amount for the OFDM symbol is suppressed, and further, the improvement of reception performance is realized.

BRIEF DESCRIPTION OF DRAWINGS

FIG. 31 illustrates transformation sequences for values of an S1 signal and an S2 signal.

FIG. 32 illustrates active carrier positions in a P1 symbol.

FIG. 33 illustrates combinations of FFT size, guard interval fraction, and pilot patterns permitted under the DVB-T2 transmission standard.

FIG. 34 illustrates the number of P2 symbols per frame for various FFT sizes.

DESCRIPTION OF EMBODIMENTS

Figure 1:
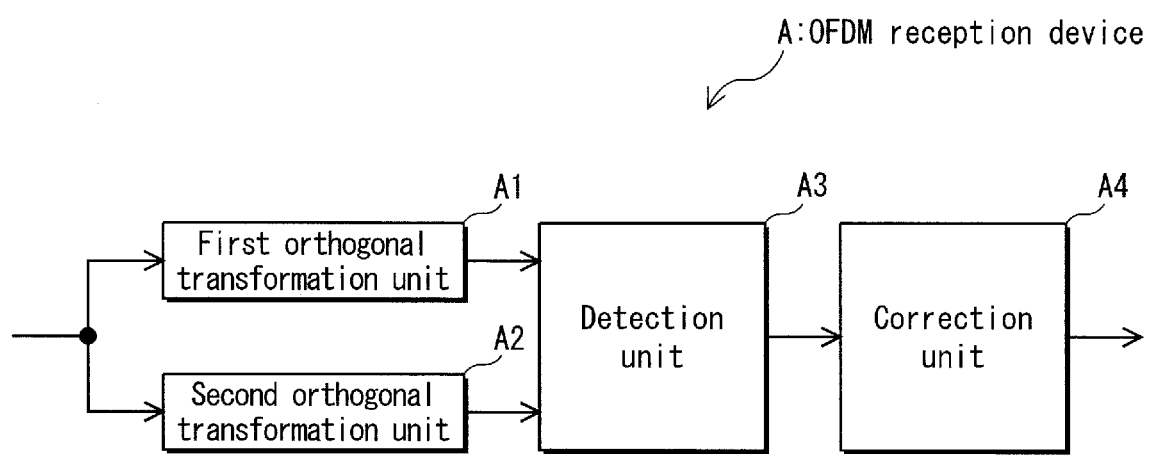
FIG. 1 illustrates a structure of an OFDM reception device A, which is one example of the present invention.

One aspect of the present invention is a first OFDM reception device for receiving an OFDM symbol that includes a signal for a useful symbol duration and a signal for a guard interval duration generated based on the signal for the useful symbol duration, the OFDM reception device comprising: a first orthogonal transformation unit that orthogonally transforms the signal for the useful symbol duration and outputs a resulting orthogonally transformed signal; a second orthogonal transformation unit that orthogonally transforms the signal for the guard interval duration and outputs a resulting orthogonally transformed signal; a detection unit that detects a wide band carrier frequency error amount according to the signal output from the first orthogonal transformation unit and the signal output from the second orthogonal transformation unit; and a correction unit that corrects a wide band carrier frequency shift of the OFDM symbol according to the wide band carrier frequency error amount.

One aspect of the present invention is a first OFDM reception circuit for receiving an OFDM symbol that includes a signal for a useful symbol duration and a signal for a guard interval duration generated based on the signal for the useful symbol duration, the OFDM reception circuit comprising: a first orthogonal transformation circuit that orthogonally transforms the signal for the useful symbol duration and outputs a resulting orthogonally transformed signal; a second orthogonal transformation circuit that orthogonally transforms the signal for the guard interval duration and outputs a resulting orthogonally transformed signal; a detection circuit that detects a wide band carrier frequency error amount according to the signal output from the first orthogonal transformation circuit and the signal output from the second orthogonal transformation circuit; and a correction circuit that corrects a wide band carrier frequency shift of the OFDM symbol according to the wide band carrier frequency error amount.

One aspect of the present invention is a first OFDM reception method used in an OFDM reception device for receiving an OFDM symbol that includes a signal for a useful symbol duration and a signal for a guard interval duration generated based on the signal for the useful symbol duration, the OFDM reception method comprising: a first orthogonal transformation step of orthogonally transforming the signal for the useful symbol duration; a second orthogonal transformation step of orthogonally transforming the signal for the guard interval duration; a detection step of detecting a wide band carrier frequency error amount according to results of the orthogonal transformation in the first orthogonal transformation step and results of the orthogonal transformation in the second orthogonal transformation step; and a correction step of correcting a wide band carrier frequency shift of the OFDM symbol according to the wide band carrier frequency error amount.

One aspect of the present invention is a first OFDM reception program for causing an OFDM reception device, which receives an OFDM symbol that includes a signal for a useful symbol duration and a signal for a guard interval duration generated based on the signal for the useful symbol duration, to perform: a first orthogonal transformation step of orthogonally transforming the signal for the useful symbol duration; a second orthogonal transformation step of orthogonally transforming the signal for the guard interval duration; a detection step of detecting a wide band carrier frequency error amount according to results of the orthogonal transformation in the first orthogonal transformation step and results of the orthogonal transformation in the second orthogonal transformation step; and a correction step of correcting a wide band carrier frequency shift of the OFDM symbol according to the wide band carrier frequency error amount.

According to each of the first OFDM reception device, the first OFDM reception circuit, the first OFDM reception method, and the first OFDM reception program described above, the detection of the wide band carrier frequency error amount for the OFDM symbol is performed by using two signals, namely the signal for the useful symbol duration and the signal for the guard interval duration based on the signal for the useful symbol duration. Hence, even in an environment with multi-path interference and/or a very noisy environment, incorrect estimation of the wide band carrier frequency error amount for the OFDM symbol is suppressed, and further, the improvement of reception performance is realized.

An example of a structure of the first OFDM reception device is illustrated in FIG. 1. An OFDM reception device A illustrated in FIG. 1 receives an OFDM symbol that includes a signal for a useful symbol duration and a signal for a guard interval duration based on the signal for the useful symbol duration. A first orthogonal transformation unit A1 corresponds to the first orthogonal transformation unit of the first OFDM reception device. The first orthogonal transformation unit A1 orthogonally transforms the signal for the useful symbol duration and outputs a resulting orthogonally transformed signal. The second orthogonal transformation unit A2 corresponds to the second orthogonal transformation unit of the first OFDM reception device. The second orthogonal transformation unit A2 orthogonally transforms the signal for the guard interval duration and outputs a resulting orthogonally transformed signal. The detection unit A3 corresponds to the detection unit of the first OFDM reception device and detects a wide band carrier frequency error amount for the OFDM symbol according to the signal output from the first orthogonal transformation unit A1 and the signal output from the second orthogonal transformation unit A2. The correction unit A4 corresponds to the correction unit of the first OFDM reception device and corrects a wide band carrier frequency shift of the OFDM symbol according to the wide band carrier frequency error amount detected by the detection unit A3.

One aspect of the present invention is a second OFDM reception device that is the first OFDM reception device wherein the signal for the guard interval duration results from a frequency shift applied to the signal for the useful symbol duration.

According to this, the detection of the wide band carrier frequency error amount for the OFDM symbol is performed by using both the signal for the useful symbol duration and the signal for the guard interval duration. In specific, the signal for the guard interval duration is yielded by frequency shifting the signal for the useful symbol duration. Thus, the same signal is transmitted at two different frequencies (transmitted with two different channel characteristics). Therefore, incorrect detection of the wide band carrier frequency error amount is suppressed in a very noisy environment and/or an environment with multipath interference, thus allowing for stable reception.

One aspect of the present invention is a third OFDM reception device that is the second OFDM reception device further comprising: a frequency shift correction unit that corrects one of (i) the signal for the guard interval duration input to the second orthogonal transformation unit and (ii) the signal output from the second orthogonal transformation unit by applying an opposite direction frequency shift so as to eliminate the frequency shift applied to the signal for the useful symbol duration, wherein the detection unit detects the wide band carrier frequency error amount according to the signal output from the first orthogonal transformation unit and one of (i) the signal output from the second orthogonal transformation unit, which has been corrected by the frequency shift correction unit, and (ii) the signal output from the frequency shift correction unit, which has been orthogonally transformed by the second orthogonal transformation unit.

According to this, detection of the wide band carrier frequency error amount is performed while taking into consideration that the signal for the guard interval duration is yielded by frequency shifting the signal for the useful symbol duration. Therefore, incorrect detection of the wide band carrier frequency error amount is suppressed in a very noisy environment and/or an environment with multipath interference, thus allowing for stable reception.

One aspect of the present invention is a fourth OFDM reception device that is the first OFDM reception device wherein the OFDM symbol is a P1 symbol in the DVB-T2 transmission standard, the guard interval duration includes a preceding guard interval duration that precedes the useful symbol duration and a succeeding guard interval duration that follows the useful symbol duration, and the second orthogonal transformation unit performs the orthogonal transformation by orthogonally transforming a signal that is a combination of a signal for the preceding guard interval duration and a signal for the succeeding guard interval duration.

According to this, incorrect detection of the wide band carrier frequency error amount for the P1 symbol under the DVB-T2 transmission standard is suppressed.

One aspect of the present invention is a fifth OFDM reception device that is the first OFDM reception device wherein the OFDM symbol includes a plurality of subcarriers, the subcarriers including active carriers and null carriers, a predetermined arrangement pattern specifies positions, in the OFDM symbol, of subcarriers corresponding to the active carriers, and the detection unit performs summation processing with respect to continuous subcarriers of a signal in accordance with the signals output from the first and second orthogonal transformation units, the summation processing being processing of summing values of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing, and the detection unit detects the wide band carrier frequency error amount according to results of iterations of the summation processing.

According to this, the detection of the wide band carrier frequency error amount for the OFDM symbol is performed by using two signals, namely the signal for the useful symbol duration and the signal for the guard interval duration. Hence, even in an environment with multi-path interference and/or a very noisy environment, incorrect estimation of the wide band carrier frequency error amount for the OFDM symbol is suppressed, and further, the improvement of reception performance is realized.

One aspect of the present invention is a sixth OFDM reception device that is the fifth OFDM reception device wherein the detection unit includes: a complex multiplication unit that performs a complex multiplication of corresponding subcarriers of the signals output from the first and second orthogonal transformation units to obtain complex products of the continuous subcarriers; a summation processing unit that performs the summation processing by summing complex products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing; a power calculation unit that calculates power values for signals output from the summation processing unit and that outputs the power values so calculated, the signals output from the summation processing unit each being a result of an iteration of the summation processing; and a maximum value detection unit that detects the wide band carrier frequency error amount by detecting the greatest power value among the power values output from the power calculation unit.

One aspect of the present invention is a seventh OFDM reception device that is the fifth OFDM reception device wherein the detection unit includes: a first power calculation unit that calculates a power value for each subcarrier of the signal output from the first orthogonal transformation unit; a second power calculation unit that calculates a power value for each subcarrier of the signal output from the second orthogonal transformation unit; a multiplication unit that performs multiplication of power values of corresponding subcarriers of the signals output from the first and second orthogonal transformation units to obtain products of the continuous subcarriers; a summation processing unit that performs the summation processing by summing products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing; and a maximum value detection unit that detects the wide band carrier frequency error amount by detecting the greatest value among values of signals output from the summation processing unit, the signals output from the summation processing unit each being a result of an iteration of the summation processing.

One aspect of the present invention is an eighth OFDM reception device that is the fifth OFDM reception device wherein the detection unit includes: a first amplitude calculation unit that calculates an amplitude value for each subcarrier of the signal output from the first orthogonal transformation unit; a second power calculation unit that calculates an amplitude value for each subcarrier of the signal output from the second orthogonal transformation unit; a multiplication unit that performs multiplication of amplitude values of corresponding subcarriers of the signals output from the first and second orthogonal transformation units to obtain products of the continuous subcarriers; a summation processing unit that performs the summation processing by summing products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing; and a maximum value detection unit that detects the wide band carrier frequency error amount by detecting the greatest value among values of signals output from the summation processing unit, the signals output from the summation processing unit each being a result of an iteration of the summation processing.

According to such aspects, a structure is provided for detecting the wide band carrier frequency error amount for the OFDM symbol by using two signals, namely the signal for the useful symbol duration and the signal for the guard interval duration.

One aspect of the present invention is a ninth OFDM reception device that is the first OFDM reception device wherein the OFDM symbol includes a plurality of subcarriers, the subcarriers including active carriers and null carriers, a predetermined arrangement pattern specifies positions, in the OFDM symbol, of subcarriers corresponding to the active carriers, the detection unit performs at least two of: (i) a first detection processing of detecting a first candidate of the wide band carrier frequency error amount by using both the signal output from the first orthogonal transformation unit and the signal output from the second orthogonal transformation unit and of further detecting a reliability degree of the first candidate; (ii) a second detection processing of detecting a second candidate of the wide band carrier frequency error amount by using only the signal output from the first orthogonal transformation unit, among the signals output from the first and second orthogonal transformation units, and of further detecting a reliability degree of the second candidate; and (iii) third detection processing of detecting a third candidate of the wide band carrier frequency error amount by using only the signal output from the second orthogonal transformation unit, among the signals output from the first and second orthogonal transformation units, and of further detecting a reliability degree of the third candidate, and the detection unit selects the candidate having the highest reliability degree among the first, second, and third candidates of the wide band carrier frequency error amount as the wide band carrier frequency error amount to be used by the correction unit for correcting the wide band carrier frequency shift of the OFDM symbol.

According to this, multiple types of detection are performed of the wide band carrier frequency error amount by using respective combinations of signals. Hence, the wide band carrier frequency error amount to be used by the correction unit is detected with improved accuracy.

One aspect of the present invention is a tenth OFDM reception device that is the ninth OFDM reception device wherein the detection unit performs the first detection processing by (i) performing summation processing, with respect to a first signal in accordance with the signals output from the first and second orthogonal transformation units, of summing values of subcarriers, among continuous subcarriers of the first signal, at positions matching the positions of the subcarriers corresponding to the active carriers in the OFDM symbol specified by the predetermined arrangement pattern, the continuous subcarriers of the first signal being shifted one subcarrier at a time in a subcarrier direction within a predetermined range for every iteration of the summation processing performed with respect to the first signal, and (ii) detecting the first candidate of the wide band carrier frequency error amount and the reliability degree of the first candidate according to results of the summation processing performed with respect to the first signal, the detection unit performs the second detection processing by (i) performing summation processing, with respect to a second signal in accordance with the signal output from the first orthogonal transformation unit, of summing values of subcarriers, among continuous subcarriers of the second signal, at positions matching the positions of the subcarriers corresponding to the active carriers in the OFDM symbol specified by the predetermined arrangement pattern, the continuous subcarriers of the second signal being shifted one subcarrier at a time in a subcarrier direction within a predetermined range for every iteration of the summation processing performed with respect to the second signal, and (ii) detecting the second candidate of the wide band carrier frequency error amount and the reliability degree of the second candidate according to results of the summation processing performed with respect to the second signal, and the detection unit performs the third detection processing by (i) performing summation processing, with respect to a third signal in accordance with the signal output from the second orthogonal transformation unit, of summing values of subcarriers, among continuous subcarriers of the third signal, at positions matching the positions of the subcarriers corresponding to the active carriers in the OFDM symbol specified by the predetermined arrangement pattern, the continuous subcarriers of the third signal being shifted one subcarrier at a time in a subcarrier direction within a predetermined range for every iteration of the summation processing performed with respect to the third signal, and (ii) detecting the third candidate of the wide band carrier frequency error amount and the reliability degree of the third candidate according to results of the summation processing performed with respect to the third signal.

According to this, multiple types of detection are performed of the wide band carrier frequency error amount by using respective combinations of signals. Hence, the wide band carrier frequency error amount to be used by the correction unit is detected with improved accuracy.

One aspect of the present invention is an eleventh OFDM reception device that is the tenth OFDM reception device wherein the reliability degree of each of the first, second, and third candidates is calculated as (i) a value obtained by dividing a greatest value, among the results of the summation processing performed with respect to the corresponding signal, by a second greatest value, among the results of the summation processing performed with respect to the corresponding signal, or (ii) a value obtained by dividing the second greatest value by the greatest value, and when the reliability degree is calculated by dividing the greatest value by the second greatest value, a relatively great value obtained as a result of division indicates a high reliability degree of the corresponding candidate, whereas when the reliability degree is calculated by dividing the second greatest value by the greatest value, a relatively great value obtained as a result of division indicates a high reliability degree of the corresponding candidate.

One aspect of the present invention is a twelfth OFDM reception device that is the tenth OFDM reception device wherein the reliability degree of each of the first, second, and third candidates is a greatest value among the results of the summation processing performed with respect to the corresponding signal, and a greatest value for a candidate having a relatively high reliability degree indicates a relatively great value among the greatest values for the first, second, and third candidates.

One aspect of the present invention is a thirteenth OFDM reception device that is the tenth OFDM reception device wherein the reliability degree of each of the first, second, and third candidates is calculated as a value obtained by subtracting a second greatest value, among the results of the summation processing performed with respect to the corresponding signal, from a greatest value, among the results of the summation processing performed with respect to the corresponding signal, and a relatively great value obtained as a result of the subtraction indicates a high reliability degree of the corresponding candidate.

According to such aspects, specific examples of reliability degrees are provided.

One aspect of the present invention is a fourteenth OFDM reception device that is the tenth OFDM reception device further comprising: a selection unit that selects one of the signal for the useful symbol duration and the signal for the guard interval duration according to the reliability degrees of the first, second, and third candidates and that outputs a selected signal to the correction unit, wherein the correction unit corrects the wide band carrier frequency shift of the selected signal.

According to such aspects, the correction of the wide band carrier frequency shift is performed with respect to one of the signal for the useful symbol duration and the signal for the guard interval duration having a higher reliability degree. Thus, the improvement of reception performance is realized.

Embodiments of the present invention are described below with reference to the accompanying drawings.

Embodiment 1

In the following, explanation is provided concerning an OFDM reception device 1 pertaining to embodiment 1 of the present invention with reference to the accompanying drawings. It should be noted that in embodiment 1 and in the successive embodiments, explanation is provided taking as examples OFDM reception devices operating as receivers for digital broadcasts conforming to the DVB-T2 standard, which is a standard for second-generation European digital terrestrial broadcasting. In addition, note that the signal received by the OFDM reception device 1 is an OFDM signal composed of OFDM symbols conforming to the DVB-T2 transmission format.

Figure 2:
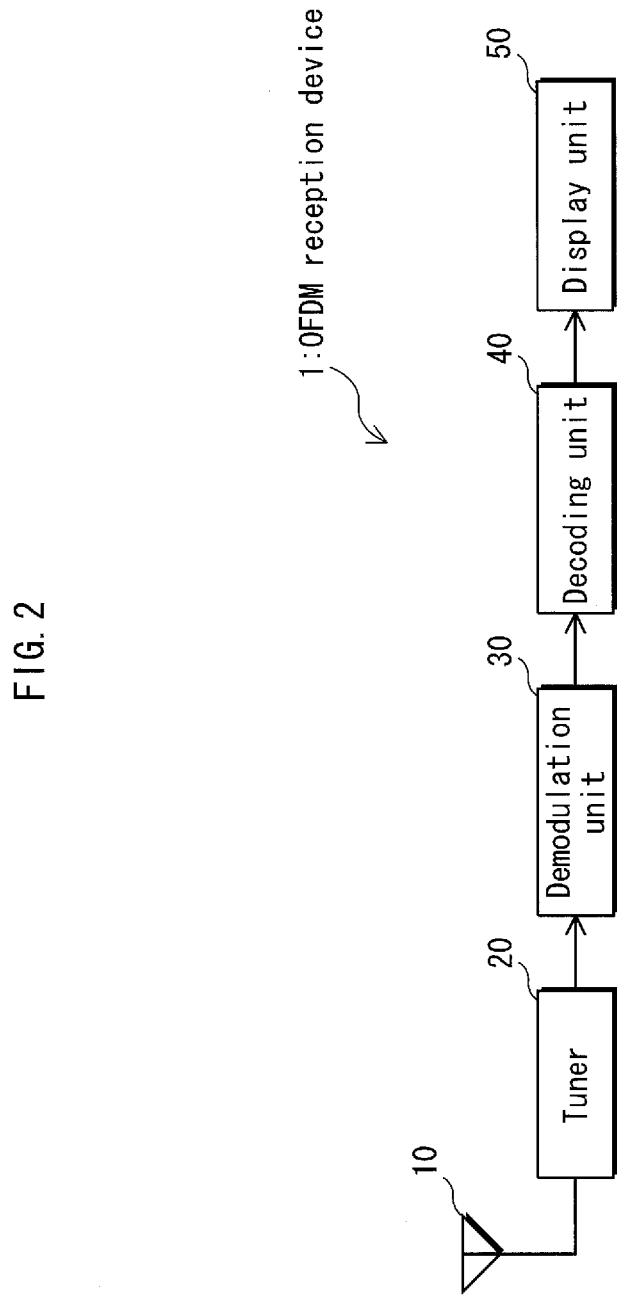
FIG. 2 illustrates a structure of an OFDM reception device 1 pertaining to embodiment 1.

FIG. 2 illustrates a structure of the OFDM reception device 1 pertaining to embodiment 1. The OFDM reception device 1 includes: an antenna 10; a tuner 20; a demodulation unit 30; a decoding unit 40; and a display unit 50.

The antenna 10 receives broadcast waves emitted by an undepicted broadcast station and outputs the broadcast waves so received to the tuner 20. The tuner 20 selects a reception signals for a desired reception channel from among the broadcast waves input from the antenna 10. The tuner 20 converts the selected reception signal from a Radio Frequency (RF) band signal to an Intermediate Frequency (IF) band signal and outputs the IF band reception signal to the demodulation unit 30. As detailed explanation is provided in the following, the demodulation unit 30 demodulates the reception signal input from the tuner 20 and outputs a demodulated signal to the decoding unit 40.

The decoding unit 40 decodes the signal input from the demodulation unit 30, such as a signal compressed with H.264 or the like, obtains a video signal, audio signals and the like, and outputs the video signal, the audio signal and the like to the display unit 50. The display unit 50 produces displays video by using the video signal input from the decoding unit 40 and produces audio output by using the audio signal input from the decoding unit 40.

Figure 3:
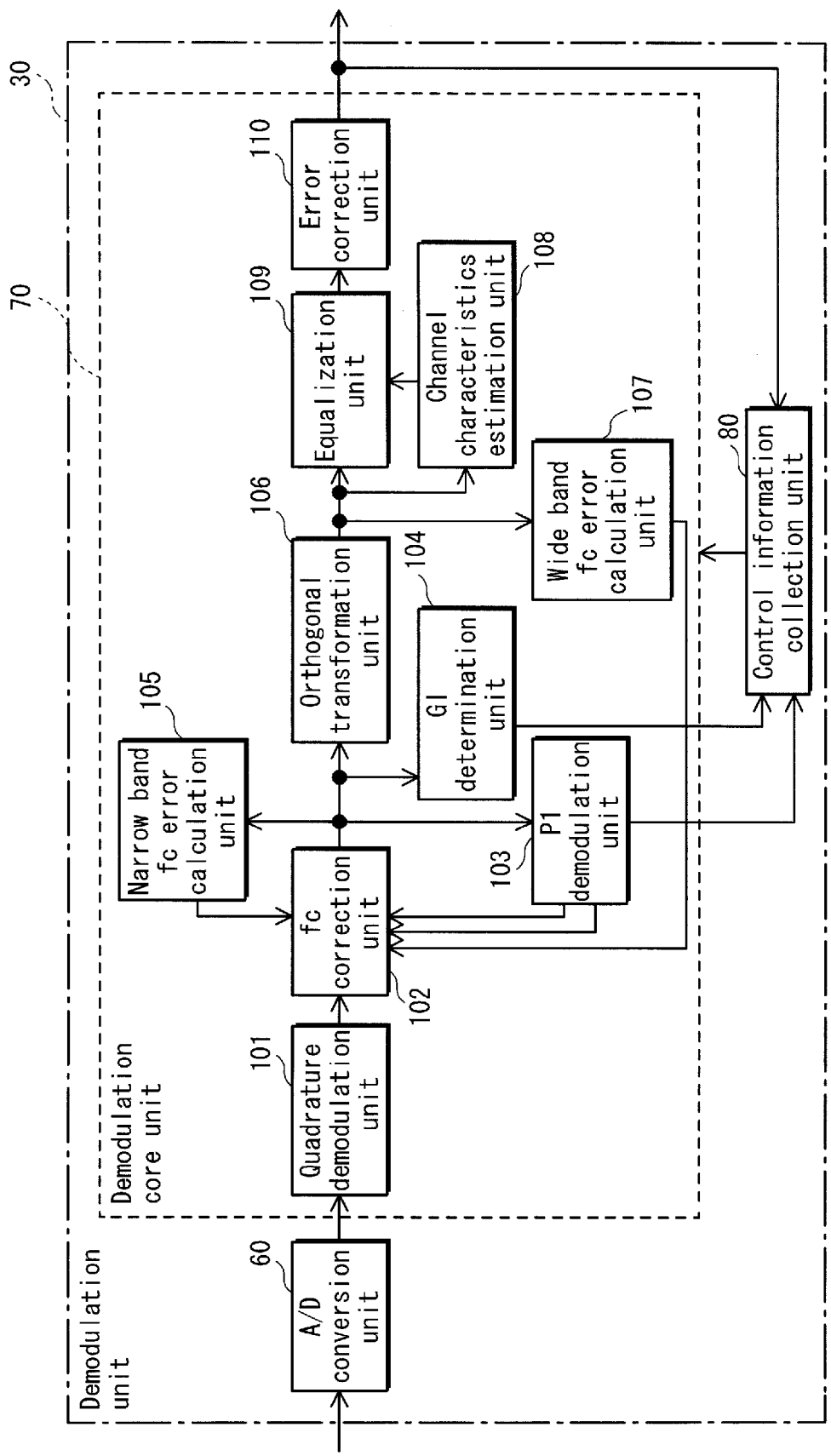
FIG. 3 illustrates a structure of a demodulation unit 30 illustrated in FIG. 2.

In the following, explanation is provided of the demodulation unit 30 illustrated in FIG. 2 with reference to FIG. 3. FIG. 3 illustrates a structure of the demodulation unit 30 illustrated in FIG. 2. The demodulation unit 30 includes: an A/D conversion unit 60; a demodulation core unit 70; and a control information collection unit 80.

The A/D conversion unit 60 receives the IF band reception signal from the tuner 20 illustrated in FIG. 2 as input. The A/D conversion unit 60 converts the reception signal input from the tuner 20 from an analog signal to a digital signal. The A/D conversion unit 60 then outputs the reception signal converted into a digital signal (referred to hereinafter as a "digital reception signal") to a quadrature demodulation unit 101 included in the demodulation core unit 70. Explanation concerning the quadrature demodulation unit 101 is provided in the following.

The demodulation core unit 70 includes: the quadrature demodulation unit 101; an fc correction unit 102, a P1 demodulation unit 103, a GI determination unit 104, a narrow band fc error calculation unit 105, an orthogonal transformation unit 106, a wide band fc error calculation unit 107, a channel characteristics estimation unit 108, an equalization unit 109, and an error correction unit 110. Each unit included in the demodulation core unit 70 operates by using, as necessary, control information collected by the control information collection unit 80.

The quadrature demodulation unit 101 performs quadrature demodulation on the IF band digital reception signal input from the A/D conversion unit 60 by using a fixed frequency and outputs a complex baseband signal (a signal composed of an in-phase component and a quadrature component) yielded as a result of the quadrature demodulation to the fc correction unit 102.

The fc correction unit 102 generates a correction carrier frequency according to: (i) a narrow band carrier frequency error amount (described in the following) and a wide band carrier frequency error amount (described in the following) detected thus far by the P1 demodulation unit 103; (ii) a narrow band carrier frequency error amount (described in the following) calculated thus far by the narrow band fc error calculation unit 105; and (iii) a wide band carrier frequency error amount (described in the following) calculated thus far by the wide band fc error calculation unit 107. The fc correction unit 102 corrects a carrier frequency shift of the complex baseband signal input from the quadrature demodulation unit 101 according to the correction carrier frequency and outputs the complex baseband signal whose carrier frequency shift has been corrected to the P1 demodulation unit 103, the GI determination unit 104, the narrow band fc error calculation unit 105, and the orthogonal transformation unit 106.

Note that while explanation has been provided above that the quadrature demodulation unit 101 performs quadrature demodulation by using a fixed frequency, and the fc correction unit 102 corrects the carrier frequency shift of the complex baseband signal, the present embodiment is not limited to this. For instance, processing may be performed as explained in the following. A quadrature demodulation unit may perform both the correction of the carrier frequency shift and the quadrature demodulation. In such a case, the quadrature demodulation unit performs quadrature demodulation by using a frequency that is the sum of the fixed frequency and the carrier frequency error amount detected in order to yield a complex baseband signal whose carrier frequency shift has been corrected.

The P1 demodulation unit 103 receives the complex baseband signal whose carrier frequency shift has been corrected from the fc correction unit 102 as input. The P1 demodulation unit 103 detects a P1 symbol included in a DVB-T2 frame from the complex baseband signal input. Further, the P1 demodulation unit 103 detects, for the P1 symbol, a carrier frequency error amount having a frequency domain size within a subcarrier spacing of the P1 symbol (a narrow band carrier frequency error amount) and a carrier frequency error amount having a frequency domain size in units of a subcarrier spacing of the P1 symbol (a wide band carrier frequency error amount). The P1 demodulation unit corrects the carrier frequency shift of the P1 symbol according to the narrow band carrier frequency error amount and the wide band carrier frequency error amount. The P1 demodulation unit 103 decodes the P1 symbol whose carrier frequency shift has been corrected so as to obtain P1 transmission information (including information such as FFT size information, MISO/SISO information, and FEF inclusion information) transmitted in the P1 symbol. Further, the P1 demodulation unit 103 outputs the P1 transmission information to the control information collection unit 80 as control information. In addition, the P1 demodulation unit 103 outputs the narrow band carrier frequency error amount and the wide band carrier frequency error amount detected to the fc correction unit 102. Detailed description concerning the P1 demodulation unit 103 is provided in the following with reference to FIG. 4 and other figures.

The GI determination unit 104 receives information concerning the FFT size of the P2 symbols and the data symbols (the FFT size information) transmitted in the P1 symbol from the control information collection unit 80. The GI determination unit 104 calculates, for the P2 symbols and the data symbols input from the fc correction unit 102, correlations (guard correlations) between the signal for the guard interval duration and the signal for the later portion of the useful symbol duration. The calculation is performed for the respective guard interval fractions specified under the DVB-T2 standard and by using the FFT size received. The GI determination unit 104 estimates the guard interval fraction actually used for the transmission of the P2 symbols and the data symbols according to the result of the calculation of the guard correlations and outputs the estimated guard interval fraction to the control information collection unit 80 as control information.

Note that instead of the GI determination unit 104 calculating the guard correlations for all of the guard interval fractions specified under the DVB-T2 standard, the calculation may, for example, be performed only for the guard interval fractions that can be identified as possibly being used for actual transmission (refer to FIG. 33) according to the FFT size. Alternatively, the calculation may be performed only for the guard interval fractions that can be identified as possibly being used for actual transmission (refer to FIG. 33) according to the FFT size and to whether MISO or SISO is used.

The narrow band fc error calculation unit 105 receives the FFT size of the P2 symbols and the data symbols and their guard interval fractions from the control information collection unit 80. Further, the narrow band fc error calculation unit 105 calculates, for the P2 symbols and the data symbols input from the fc correction unit 102, correlations (guard correlations) between the signal for the guard interval duration and the signal for the later portion of the useful symbol duration. The calculation is performed by using the FFT size and the guard interval fractions received. The narrow band fc error calculation unit 105 calculates, for the P2 symbols and the data symbols, a carrier frequency error amount having a frequency domain size within a subcarrier spacing of the P2 symbols and the data symbols (a narrow band carrier frequency error amount) according to the guard correlations calculated and outputs the narrow band carrier frequency error amount calculated to the fc correction unit 102.

The orthogonal transformation unit 106 performs orthogonal transformation on the signal (a time domain complex baseband signal) for the useful symbol duration of the P2 symbols and the data symbols input from the fc correction unit 102 and outputs the result of the orthogonal transformation (a frequency domain complex baseband signal) to the wide band fc error calculation unit 107, the channel characteristics estimation unit 108, and the equalization unit 109. Note that the orthogonal transformation unit 106 performs orthogonal transformation based on a Fourier transform, a cosine transform, a wavelet transform, a Hadamard transform, or the like.

In this embodiment, as an example, the orthogonal transformation unit 106 performs orthogonal transformation by using a Fourier transform. More specifically, an FFT is used for the Fourier transform. The orthogonal transformation unit 106 performs an FFT on the signal (a time domain complex baseband signal) for the useful symbol duration of the P2 symbols and the data symbols and outputs the result of the FFT (a frequency domain complex baseband signal) to the wide band fc error calculation unit 107, the channel characteristics estimation unit 108, and the equalization unit 109. Note that processing performed by the orthogonal transformation unit 106 is not limited to the above-described processing.

The wide band fc error calculation unit 107 uses the frequency domain complex baseband signal (signal relating to the P2 symbols and the data symbols) input from the orthogonal transformation unit 106 to calculate correlations between the frequency domain complex baseband signal and the arrangement sequence of the pilot symbols included in the frequency domain complex baseband signals. The wide band fc error calculation unit 107 calculates a carrier frequency error amount having a frequency domain size in units of a subcarrier spacing of the P2 symbols and the data symbols (a wide band carrier frequency error amount) by using the results of the calculation of the correlations and outputs the wide band carrier frequency error amount so calculated to the fc correction unit 102.

Note that the demodulation unit 30 may have a structure different from the structure described in the above. For instance, the structure of the demodulation unit 30 may be altered as described in the following. A wide band fc correction unit may be provided between (i) the orthogonal transformation unit 106 and (ii) the channel characteristics estimation unit 108 and the equalization unit 109. In such a case, the wide band fc error calculation unit 107 may output the wide band carrier frequency error amount to the wide band fc correction unit instead of to the fc correction unit 102. Further, the wide band fc correction unit corrects the wide band carrier frequency shift of the P2 symbols and the data symbols input from the orthogonal transformation unit 106 by using the wide band carrier frequency error amount calculated by the wide band fc error calculation unit 107 and outputs the P2 symbols and the data symbols whose wide band carrier frequency shift has been corrected to the channel characteristics estimation unit 108 and the equalization unit 109.

The channel characteristics estimation unit 108 receives the frequency domain complex baseband signal (a signal relating to the P2 symbols and the data symbols) from the orthogonal transformation unit 106 as input. The channel characteristics estimation unit 108 estimates the characteristics of amplitude and phase distortion experienced along the transmission channel (channel characteristics) by the frequency domain complex baseband signal by using the pilot signals included therein and outputs the estimated channel characteristics to the equalization unit 109.

The equalization unit 109 receives the frequency domain complex baseband signal (a signal relating to the P2 symbols and the data symbols) from the orthogonal transformation unit 106 as input. The equalization unit 109 corrects the amplitude and phase distortion in the frequency domain complex baseband signal by using the channel characteristics estimated by the channel characteristics estimation unit 108. The equalization unit 109 outputs the signal whose amplitude and phase distortion has been corrected to the error correction unit 110.

The error correction unit 110 performs error correction on the signal whose amplitude and phase distortion has been corrected input from the equalization unit 109 and outputs a stream, such as a transport stream, to the decoding unit 40 illustrated in FIG. 2. The error correction unit 110 outputs P2 transmission information (including information such as pilot pattern information, transmission mode information, information indicating the number of symbols included per frame, information indicating the modulation method, and information indicating the coding ratio of the FEC code) transmitted in the P2 symbols to the control information collection unit 80 as control information.

The control information collection unit 80 categorizes pieces of control information collected from the P1 demodulation unit 103, the GI determination unit 104, and the error correction unit 110 into transmission parameters and outputs the transmission parameters to the units in the demodulation core unit 70. Each of the units of the demodulation core unit 70 operates while using, as necessary, the control information collected by the control information collection unit 80.

Noted that in the OFDM reception device 1 of embodiment 1, among the units described with reference to FIGS. 2 and 3, the P1 demodulation unit 103 included in the demodulation unit 30 differs greatly from conventional technology.

In the following, explanation is provided of the P1 demodulation unit 103 illustrated in FIG. 3 with reference to FIG. 4.

Figure 4:
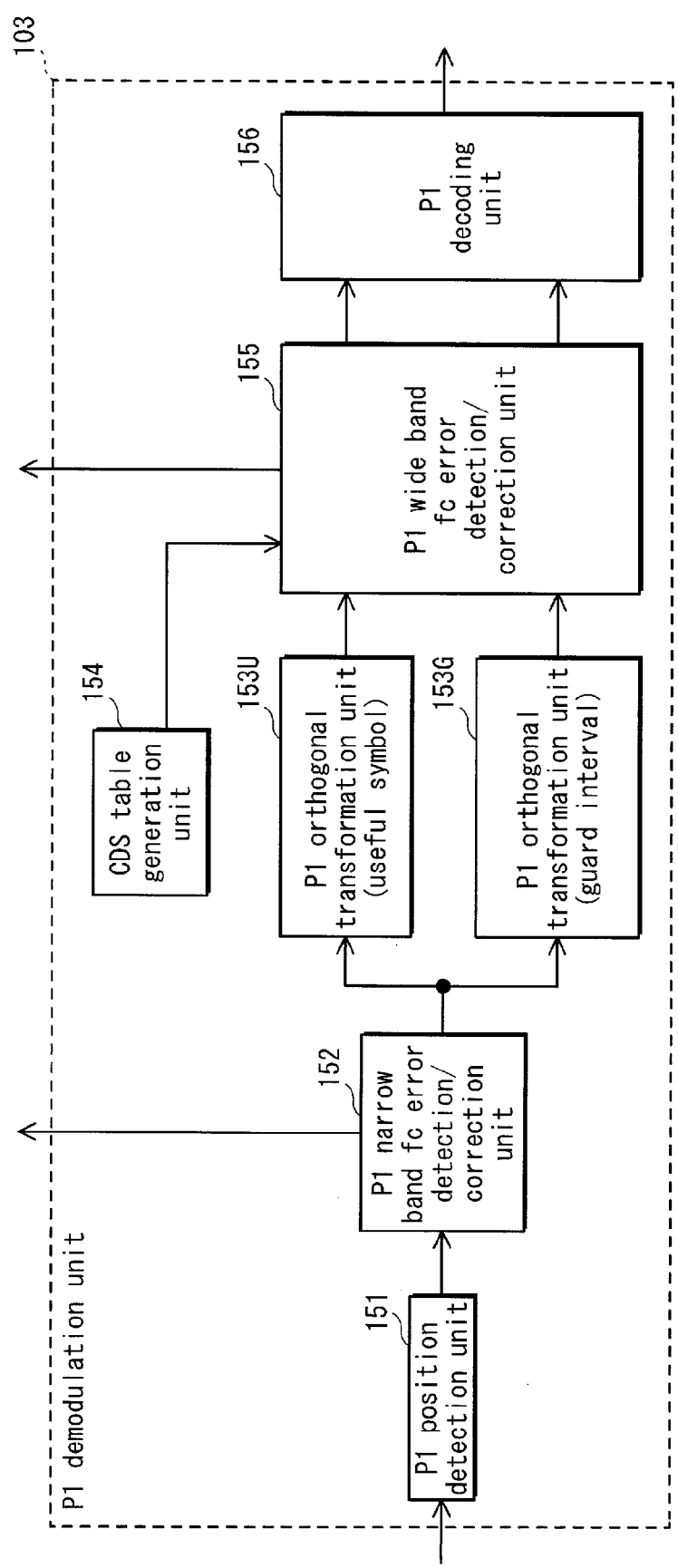
FIG. 4 illustrates a structure of a P1 demodulation unit 103 illustrated in FIG. 3.

FIG. 4 illustrates a structure of the P1 demodulation unit 103 illustrated in FIG. 3. The P1 demodulation unit 103 includes: a P1 position detection unit 151; a P1 narrow band fc error detection/correction unit 152; a P1 orthogonal transformation unit 153U; a P1 orthogonal transformation unit 153G; a CDS table generation unit 154; a P1 wide band fc error detection/correction unit 155; and a P1 decoding unit 156.

The P1 position detection unit 151 receives the signal (a time domain complex baseband signal) output from the fc correction unit 102 illustrated in FIG. 3. The P1 position detection unit 151, by using the time domain complex baseband signals, calculates correlations (guard correlations) between the signal for the guard interval duration of the P1 symbol (the preceding guard interval duration and the succeeding guard interval duration) and the signal for a predetermined portion of the useful symbol duration of the P1 symbol. The P1 position detection unit 151 calculates the integral of the calculated correlations over the time domain length of the guard interval duration (the preceding guard interval duration and the succeeding guard interval duration) and detects the position of the P1 symbol in the complex baseband signal by detecting the peak value of the integral.

Figure 28:
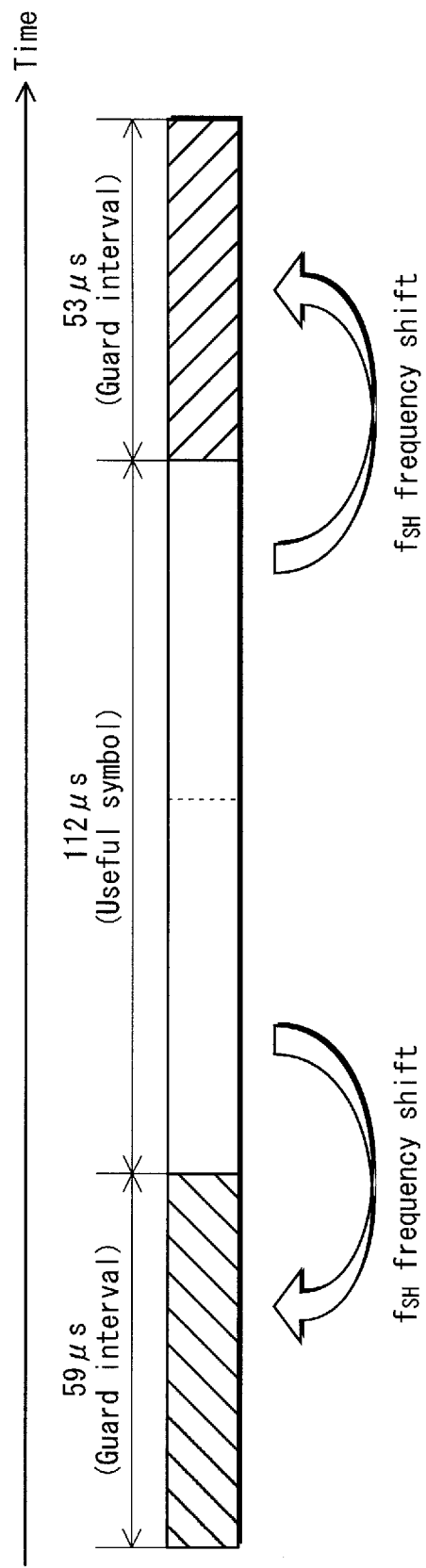
FIG. 28 is a schematic diagram illustrating a time domain transmission format of the P1 symbol.

The calculation of the correlations takes into consideration the frequency shift of a frequency $f_{SH}$ that is added at the transmitting end. The "predetermined portion" above refers to the earlier portion of the useful symbol duration for the preceding guard interval duration and refers to the later portion of the useful symbol duration for the succeeding guard interval duration (refer to FIG. 28). The same applies for the calculation of the correlations performed by the P1 narrow band fc error detection/correction unit 152 described in the following.

The P1 narrow band fc error detection/correction unit 152 calculates correlations (guard correlations) between the signal for the guard interval duration (the preceding guard interval duration and the succeeding guard interval duration) and the signal for the predetermined portion of the useful symbol duration of the P1 symbol. Further, the P1 narrow band fc error detection/correction unit 152 calculates the integral of the calculated correlations over the time domain length of the guard interval duration (the preceding guard interval duration and the succeeding guard interval duration) and calculates the phase of the integral. The P1 narrow band fc error detection/correction unit 152 detects a carrier frequency error amount having a frequency domain size within a subcarrier spacing of the P1 symbol (a narrow band carrier frequency error amount) according to the phase at the timing of the position of the P1 symbol detected by the P1 position detection unit 151. According to the narrow band carrier frequency error amount so detected, the P1 narrow band fc error detection/correction unit 152 corrects the narrow band carrier frequency shift of the P1 symbol and outputs the P1 symbol whose narrow band carrier frequency shift has been corrected to the P1 orthogonal transformation unit 153U and the P1 orthogonal transformation unit 153G. The P1 narrow band fc error detection/correction unit 152 outputs the narrow band carrier frequency error amount detected to the fc correction unit 102 illustrated in FIG. 3.

Figure 5:
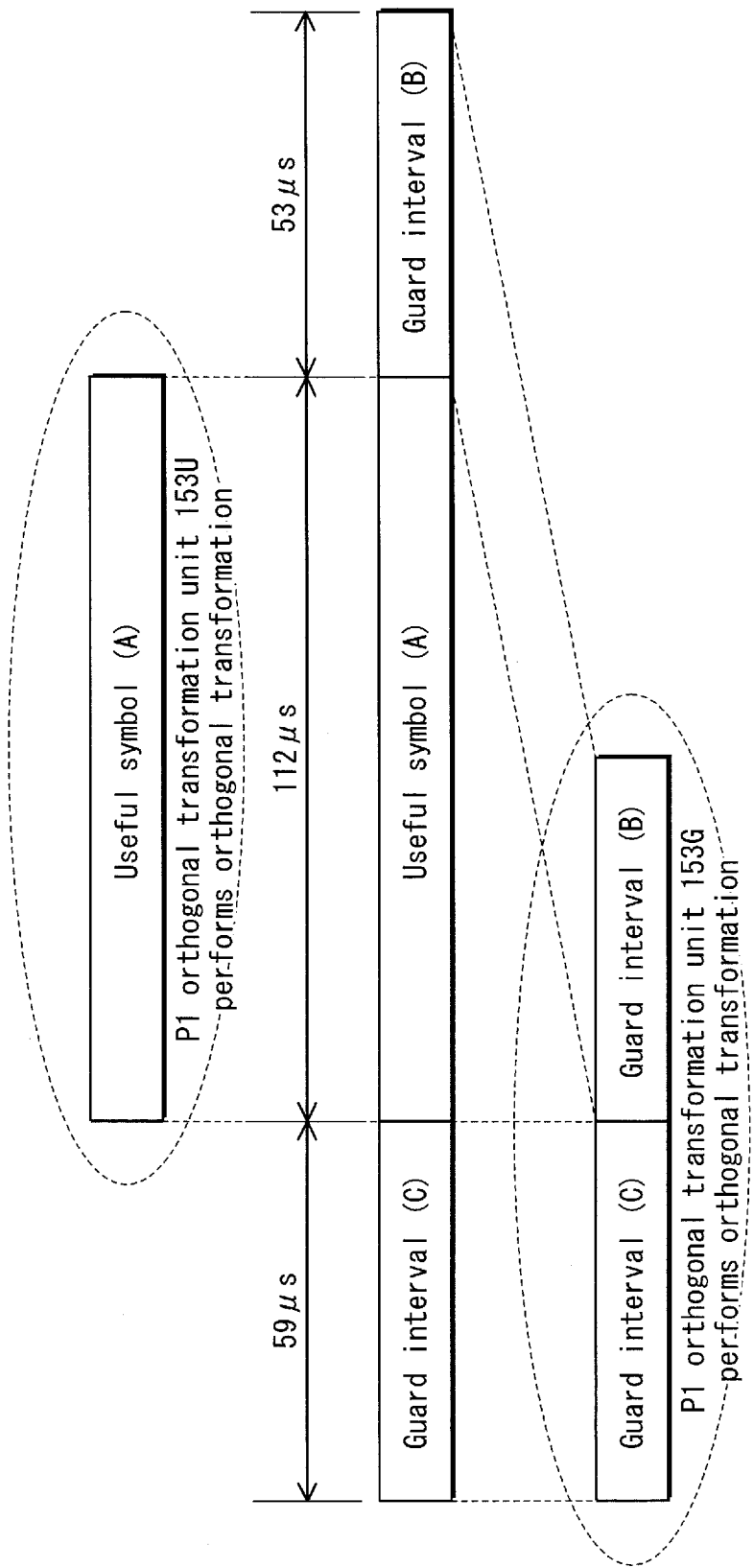
FIG. 5 is a schematic diagram illustrating a section of a signal for a P1 symbol on which a P1 orthogonal transformation unit 153U and a P1 orthogonal transformation unit 153G illustrated in FIG. 4 perform an orthogonal transformation.

The P1 orthogonal transformation unit 153U receives the signal (a time domain complex baseband signal for the P1 symbol) output from the P1 narrow band fc error detection/correction unit 152 as input. As illustrated in FIG. 5, the P1 orthogonal transformation unit 153U extracts the signal for the useful symbol duration (the signal for the useful symbol (A) in FIG. 5) from the P1 symbol, performs orthogonal transformation on the extracted signal for the useful symbol duration (a time domain complex baseband signal), and outputs the result of the orthogonal transformation (a frequency domain complex baseband signal) to the P1 wide band fc error detection/correction unit 155. Note that the P1 orthogonal transformation unit 153U performs orthogonal transformation based on a Fourier transform, a cosine transform, a wavelet transform, a Hadamard transform or the like.

In this embodiment, as an example, the P1 orthogonal transformation unit 153U performs orthogonal transformation by using a Fourier transform. An FFT is used for the Fourier transform. The P1 orthogonal transformation unit 153U performs an FFT of size 1 k on the signal for the useful symbol duration of the P1 symbol (a time domain complex baseband signal) and outputs the result of the FFT (a frequency domain complex baseband signal) to the P1 wide band fc error detection/correction unit 155. Note that processing performed by the P1 orthogonal transformation unit 153U is not limited to the above-described processing.

Note that in an environment with multi-path interference and the like, the signal for the useful symbol duration that is extracted from the signal output from the P1 narrow band fc error detection/correction unit 152 and that is to be orthogonally transformed by the P1 orthogonal transformation unit 153U may include, not only signal components for the useful symbol duration of the main wave of the P1 symbol to be orthogonally transformed but also signal components for a succeeding guard interval duration of a preceding wave of the P1 symbol and/or signal components for a preceding guard interval of a delayed wave of the P1 symbol. In addition, the signal for the useful symbol duration that is extracted from the signal output from the P1 narrow band fc error detection/correction unit 152 and that is to be orthogonally transformed by the P1 orthogonal transformation unit 153U may also include signal components for OFDM symbols other than the P1 symbol (for instance, a data symbol). In addition, in an environment with noise and the like, the signal for the useful symbol duration that is extracted from the signal output from the P1 narrow band fc error detection/correction unit 152 and that is to be orthogonally transformed by the P1 orthogonal transformation unit 153U may include noise components.

The P1 orthogonal transformation unit 153G receives the signal (a time domain complex baseband signal for the P1 symbol) output from the P1 narrow band fc error detection/correction unit 152 as input. As illustrated in FIG. 5, the P1 orthogonal transformation unit 153G extracts the signal for the preceding guard interval duration (the signal for the guard interval (C) in FIG. 5) and the signal for the succeeding guard interval duration (the signal for the guard interval (B) in FIG. 5) from the P1 symbol and combines the two signals so as to be continuous in the time domain. Note that the combined duration yielded by combining the preceding guard interval duration and the succeeding guard interval duration is hereinafter referred to as a "combined guard interval duration". The P1 orthogonal transformation unit 153G performs orthogonal transformation on the signal for the combined guard interval duration (a time domain complex baseband signal) and outputs the result of the orthogonal transformation (a frequency domain complex baseband signal) to the P1 wide band fc error detection/correction unit 155. Note that the P1 orthogonal transformation unit 153G performs orthogonal transformation based on a Fourier transform, a cosine transform, a wavelet transform, a Hadamard transform or the like.

In this embodiment, as an example, the P1 orthogonal transformation unit 153G performs orthogonal transformation by using a Fourier transform. An FFT is used for the Fourier transform. In specific, the P1 orthogonal transformation unit 153G performs an FFT of size 1 k on the signal for the combined guard interval duration (a time domain complex baseband signal) and outputs the result of the FFT (a frequency domain complex baseband signal) to the P1 wide band fc error detection/correction unit 155. Note that processing performed by the P1 orthogonal transformation unit 153U is not limited to the above-described processing.

Note that in an environment with multi-path interference and the like, the signal for the combined guard interval duration that is extracted from the signal output from the P1 narrow band fc error detection/correction unit 152 and that is to be orthogonally transformed by the P1 orthogonal transformation unit 153G may include, not only signal components for the combined guard interval duration of the main wave of the P1 symbol to be orthogonally transformed but also signal components for a useful symbol duration of a preceding wave of the P1 symbol and/or signal components for a useful symbol duration of a delayed wave of the P1 symbol. In addition, the signal for the combined guard interval duration that is extracted from the signal output from the P1 narrow band fc error detection/correction unit 152 and that is to be orthogonally transformed by the P1 orthogonal transformation unit 153G may also include signal components for OFDM symbols other than the P1 symbol (for instance, a data symbol). In addition, in an environment with noise and the like, the signal for the combined guard interval duration that is extracted from the signal output from the P1 narrow band fc error detection/correction unit 152 and that is to be orthogonally transformed by the P1 orthogonal transformation unit 153G may include noise components.

The CDS table generation unit 154 generates a sequence indicating the positions of active carriers (active carrier arrangement sequence) and outputs the active carrier arrangement sequence so generated to the P1 wide band fc error detection/correction unit 155. The active carrier arrangement sequence is a sequence with a "1" at positions corresponding to active carriers, as indicated in FIG. 32, and a "0" at other positions corresponding to null carriers (unused carriers).

The CDS table generation unit 154 may, for example, store a table with the content illustrated in FIG. 32 in advance and generate the active carrier arrangement sequence according to such a table. Alternatively, the CDS table generation unit 154 may be composed of a logical circuit which generates the active carrier arrangement sequence. In addition, the method according to which the CDS table generation unit 154 generates the active carrier arrangement sequence is not particularly limited.

The P1 wide band fc error detection/correction unit 155 detects, for the P1 symbol, a carrier frequency error amount having a frequency domain size in units of a subcarrier spacing of the P1 symbol (a wide band carrier frequency error amount) by using: (i) the signal (a frequency domain complex baseband signal for the useful symbol duration of the P1 symbol) output from the P1 orthogonal transformation unit 153U; (ii) the signal (a frequency domain complex baseband signal for the combined guard interval duration of the P1 symbol) output from the P1 orthogonal transformation unit 153G; and (iii) the active carrier arrangement sequence input from the CDS table generation unit 154. According to the wide band carrier frequency error amount so detected, the P1 wide band fc error detection/correction unit 155 corrects a wide band carrier frequency shift of the P1 symbol. The P1 wide band fc error detection/correction unit 155 extracts only active carriers in the P1 symbol whose wide band carrier frequency shift has been corrected and outputs the active carriers so extracted to the P1 decoding unit 156. In addition, the P1 wide band fc error detection/correction unit 155 outputs the wide band carrier frequency error amount so detected to the fc correction unit 102 illustrated in FIG. 3. Note that detailed description concerning the P1 wide band fc error detection/correction unit 155 is provided in the following with reference to FIG. 6.

The P1 decoding unit 156 uses the active carriers in the P1 symbol input from the P1 wide band fc error detection/correction unit 155 and decodes the P1 symbol. The decoding unit 156 then outputs P1 transmission information transmitted in the P1 symbol to the control information collection unit 80 illustrated in FIG. 3 as control information. Note that detailed description concerning the P1 decoding unit 156 is provided in the following with reference to FIG. 7.

Figure 6:
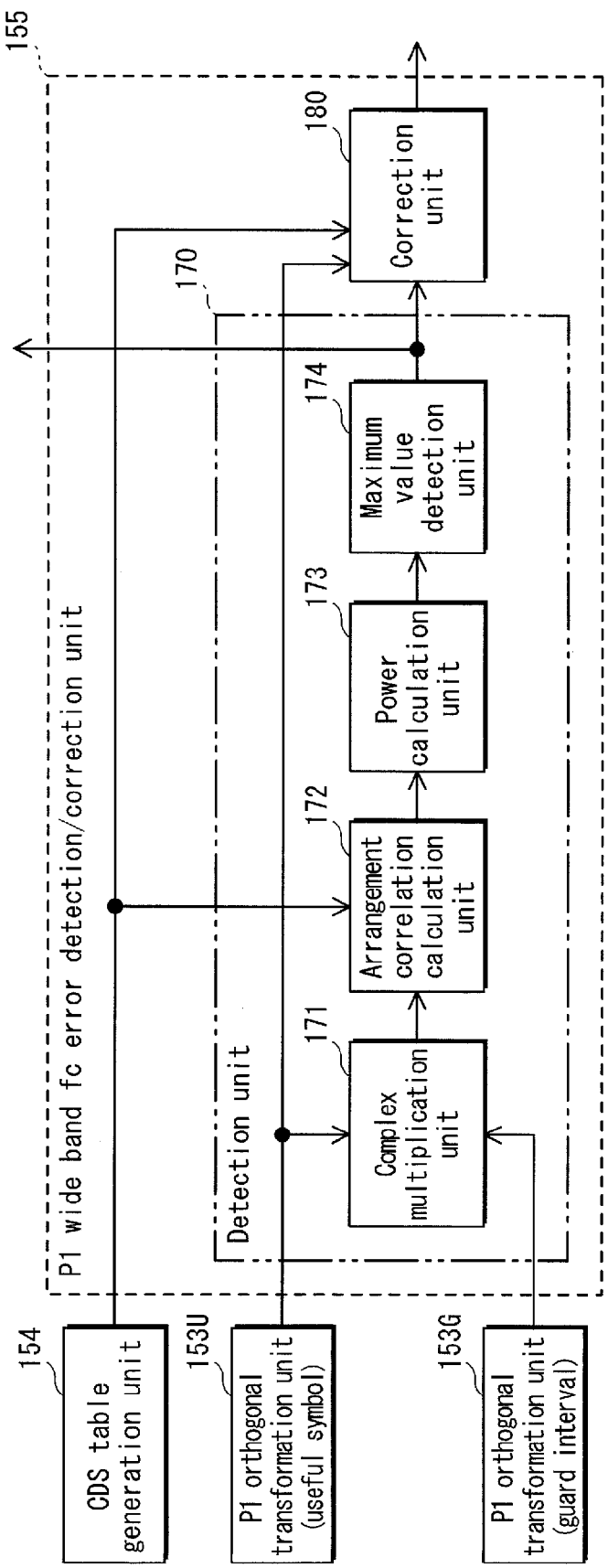
FIG. 6 illustrates a structure of a P1 wide band error detection/correction unit 155 illustrated in FIG. 4.

In the following, explanation is provided of the P1 wide band fc error detection/correction unit 155 illustrated in FIG. 4 with reference to FIG. 6. FIG. 6 illustrates a structure of the P1 wide band fc error detection/correction unit 155 illustrated in FIG. 4. Note that, in order as to clarify input to each of the units of the P1 wide band fc error detection/correction unit 155, the P1 orthogonal transformation unit 153U, the P1 orthogonal transformation unit 153G, and the CDS table generation unit 154 are also illustrated in FIG. 6.

The P1 wide band fc error detection/correction unit 155 includes a detection unit 170 and a correction unit 180.

The detection unit 170 detects, for the P1 symbol, a carrier frequency error amount having a frequency domain size in units of a subcarrier spacing of the P1 symbol (a wide band carrier frequency error amount). The detection unit 170 includes: a complex multiplication unit 171; an arrangement correlation calculation unit (summation processing unit) 172; a power calculation unit 173; and a maximum value detection unit 174.

The complex multiplication unit 171 receives the signal (a frequency domain complex baseband signal for the useful symbol duration of the P1 symbol) output from the P1 orthogonal transformation unit 153U and the signal (a frequency domain complex baseband signal for the combined guard interval duration of the P1 symbol) output from the P1 orthogonal transformation unit 153G. The complex multiplication unit 171 performs complex multiplication, as indicated in Math 16 below, of the signal $Y_U(n)$ output from the P1 orthogonal transformation unit 153U and the signal $Y_G(n+1)$ output from the P1 orthogonal transformation unit 153G for each subcarrier. The complex multiplication unit 171 outputs the result $Y_{COMB}(n)$ of the complex multiplication to the arrangement correlation calculation unit 172. Note that the variable in parentheses in $Y_U(n)$, $Y_G(n+1)$, and $Y_{COMB}(n)$ indicates a subcarrier number (the same applying in the following as well).

$$Y_{comb}(n) = Y_U(n) \cdot Y_G(n+1)^*$$ Math 16

Note that the complex multiplication unit 171 may multiply the signal $Y_U(n)^*$, which is the complex conjugate of the signal $Y_U(n)$, and the signal $Y_G(n+1)$ and output the result $Y_U(n)^* \cdot Y_G(n+1)$ of the multiplication to the arrangement correlation calculation unit 172, instead of performing the calculation indicated in Math 16 above.

The signal for the preceding guard interval duration and the signal for the succeeding guard interval duration are signals yielded by frequency shifting the signal for the useful symbol duration by a frequency $f_{SH}$ (by frequency shifting the signal for the useful symbol duration in the high frequency direction by a frequency corresponding to one subcarrier). As such, the signal output from the P1 orthogonal transformation unit 153G is shifted in the high frequency direction by a frequency corresponding to one subcarrier with respect to the signal output from the P1 orthogonal transformation unit 153U. Taking this into consideration, the complex multiplication unit 171 performs complex multiplication of the signal $Y_U(n)$ output from the P1 orthogonal transformation unit 153U and the signal $Y_G(n+1)$ output from the P1 orthogonal transformation unit 153G, which is shifted in the high frequency direction by a frequency corresponding to one subcarrier with respect to the signal $Y_U(n)$.

The arrangement correlation calculation unit 172 receives the signal output from the complex multiplication unit 171 as input, as well as the active carrier arrangement sequence input from the CDS table generation unit 154. The arrangement correlation calculation unit 172 performs summation processing of summing values of subcarriers, among continuous subcarriers of the signal output from the complex multiplication unit 171, corresponding to subcarriers with a value "1" in the active carrier arrangement sequence. The summation processing is performed while sequentially shifting the continuous subcarriers of the signal output from the complex multiplication unit 171 one subcarrier at a time in the subcarrier direction within a predetermined range for every iteration (i.e. the arrangement correlation calculation unit 172 calculates arrangement correlations between the signal output from the complex multiplication unit 171 and the active carrier arrangement sequence while sequentially shifting the signal output from the complex multiplication unit 171 one subcarrier at a time in the subcarrier direction within the predetermined range). The arrangement correlation calculation unit 172 sequentially outputs summed values (arrangement correlation values) yielded as results of iterations of the summation processing to the power calculation unit 173.

In specific, the arrangement correlation calculation unit 172 multiplies the signals $Y_{COMB}(1+A+i)$, $Y_{COMB}(2+A+i)$, ..., $Y_{COMB}(852+A+i)$ output from the complex multiplication unit 171 and the signals $C(0)$, $C(1)$, $C(2)$, ..., $C(852)$ output from the CDS table generation unit 154. The arrangement correlation calculation unit 172 sums the results of the multiplication and outputs the result $C(0) \times Y_{COMB}(0+A+i) + C(1) \times Y_{COMB}(1+A+i) + C(2) \times Y_{COMB}(2+A+i) + \ldots + C(852) \times Y_{COMB}(852+A+i)$ of the calculation to the power calculation unit 173.

Figure 29:
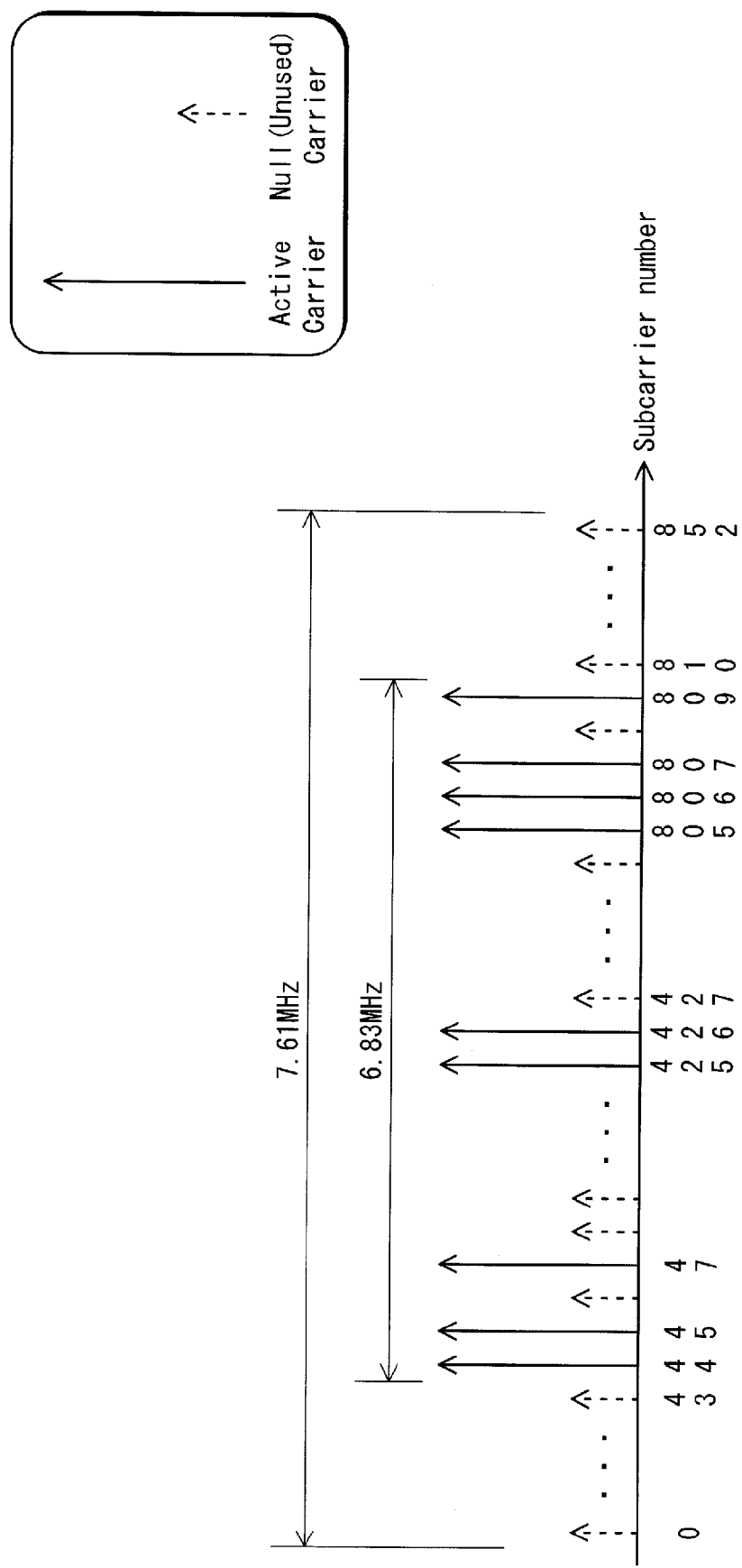
FIG. 29 is a schematic diagram illustrating a frequency domain transmission format of the P1 symbol.
Figure 30:
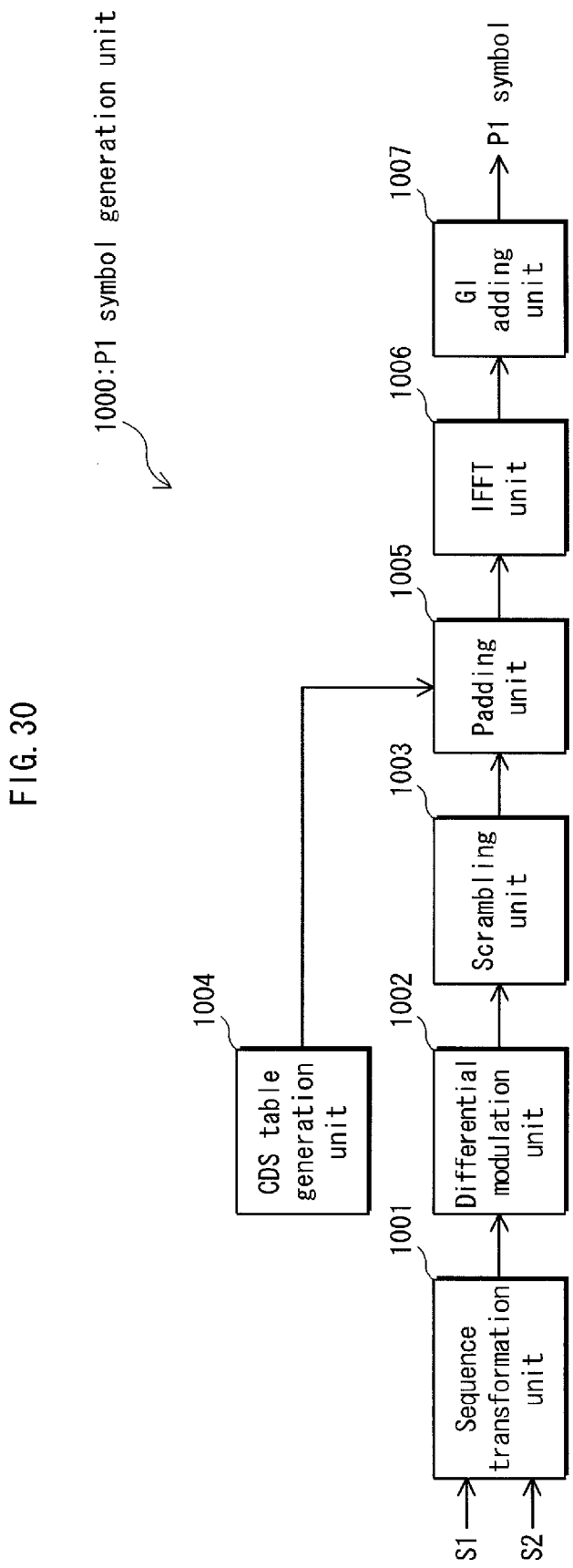
FIG. 30 illustrates a structure of a P1 generation unit 1000 that generates a P1 symbol.
Figure 35:
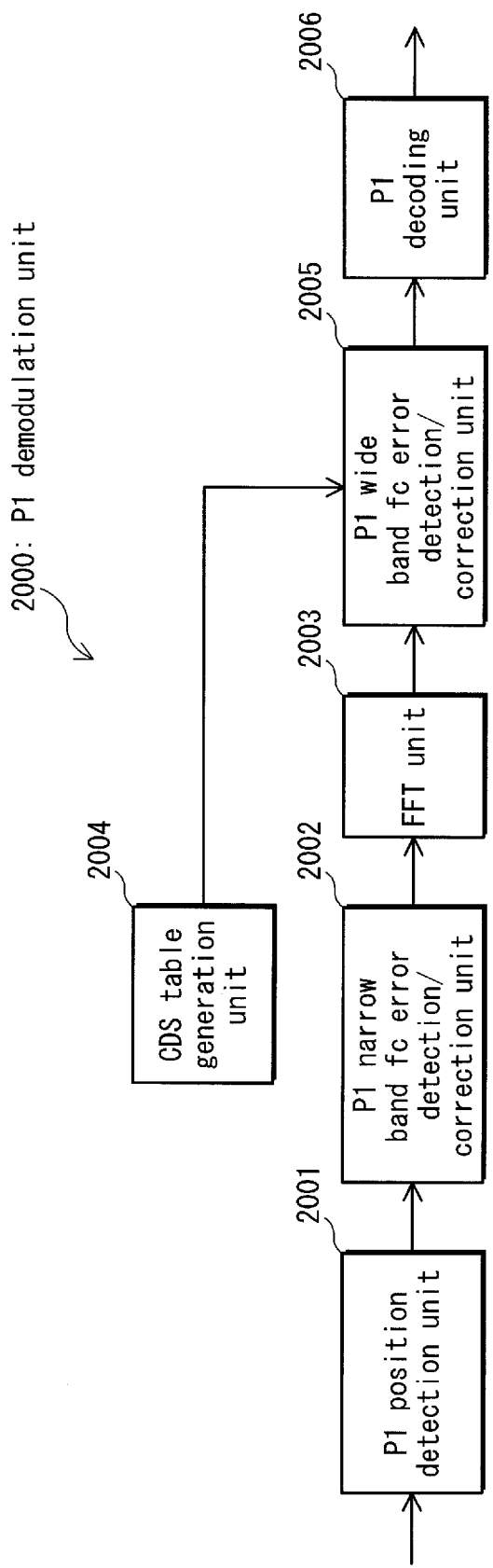
FIG. 35 illustrates a structure of a conventional P1 demodulation unit 2000.
Figure 36:
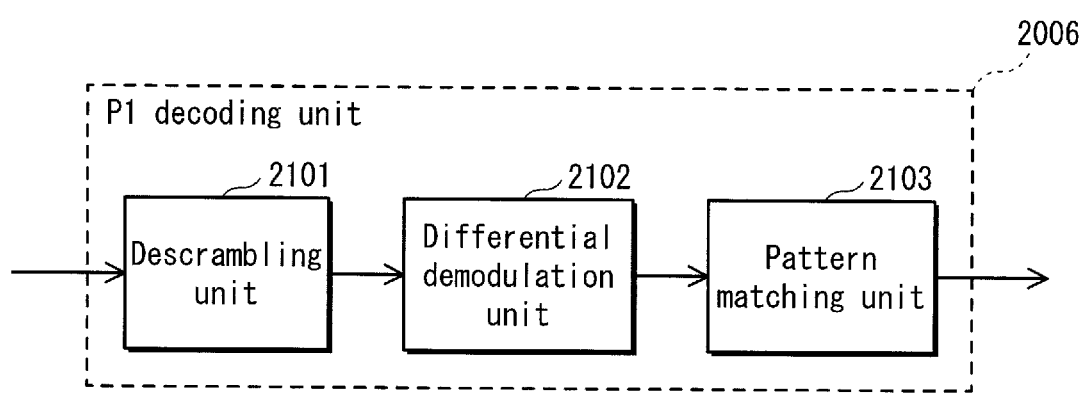
FIG. 36 illustrates a structure of a P1 decoding unit 2006 illustrated in FIG. 35.

Note that $C(i)$ denotes a value of the active carrier arrangement sequence at a subcarrier position i ("1" when subcarrier position i corresponds to an active carrier and "0" when subcarrier position i corresponds to a null carrier) (refer to FIG. 32). $Y_{COMB}(j)$ denotes a value of the signal output from the complex multiplication unit 171 for a subcarrier number j. In addition, "852" is a value taking into consideration the arrangement of active carriers and null carriers illustrated in FIG. 29 and the value "852" may be changed as necessary according to the range of subcarriers in which active carriers and null carriers are arranged.

The arrangement correlation calculation unit 172 performs the above-described calculation while shifting the value of i one at a time within a predetermined range (for instance, −M to N, wherein both M and N are positive integers and including M=N). Note that A is a reference point based on which the calculation of arrangement correlations is performed. In addition, $Y_{COMB}(0+A)$, $Y_{COMB}(1+A)$, $Y_{COMB}(2+A)$, ..., $Y_{COMB}(852+A)$ is a set of signals output from the complex multiplication unit 171 corresponding to a greatest power value of the arrangement correlations when presuming that the signal input to the P1 wide band fc error detection/correction unit 155 does not include a wide band carrier frequency error amount.

The power calculation unit 173 calculates power values for the arrangement correlations according to the arrangement correlation values sequentially input from the arrangement correlation calculation unit 172 and outputs the arrangement correlation power values to the maximum value detection unit 174.

The maximum value detection unit 174 detects the greatest arrangement correlation power value from among the arrangement correlation power values sequentially input from the power calculation unit 173. The maximum value detection unit 174 outputs a shift amount which yields the greatest arrangement correlation power value to the correction unit 180 and the fc correction unit 102 illustrated in FIG. 3 as a carrier frequency error amount having a frequency domain size in units of a subcarrier spacing of the P1 symbol (a wide band carrier frequency error amount).

The correction unit 180 corrects the wide band carrier frequency shift of the signal (a frequency domain complex baseband signal for the useful symbol duration of the P1 symbol) output from the P1 orthogonal transformation unit 153U according to the wide band carrier frequency error amount input from the maximum value detection unit 174. The correction unit 180 extracts only the active carriers from the frequency domain complex baseband signal whose wide band carrier frequency shift has been corrected by using the active carrier arrangement sequence input from the CDS table generation unit 154 and outputs the active carriers so extracted to the P1 decoding unit 156 illustrated in FIG. 4 (more specifically, to a descrambling unit 191 illustrated in FIG. 7, explanation of which is provided in the following).

Figure 7:
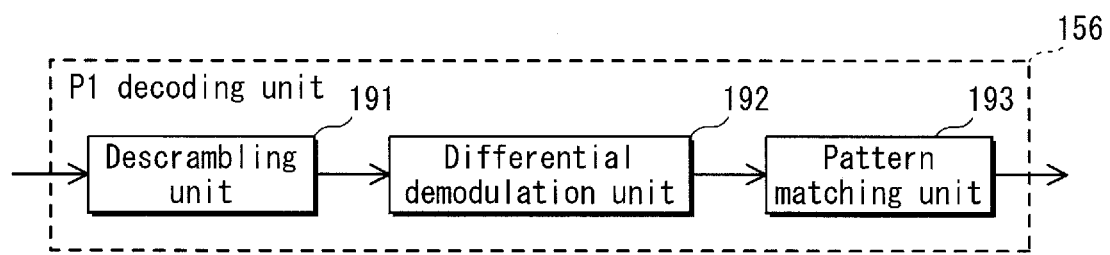
FIG. 7 illustrates a structure of a P1 decoding unit 156 illustrated in FIG. 4.

In the following, explanation is provided of the P1 decoding unit 156 illustrated in FIG. 4 with reference to FIG. 7. FIG. 7 illustrates a structure of the P1 decoding unit 156 illustrated in FIG. 4. The P1 decoding unit 156 includes: a descrambling unit 191; a differential demodulation unit 192; and a pattern matching unit 193. Note that the P1 decoding unit 156 decodes a P1 symbol by using only the S1 signal included in the low frequency range of the P1 symbol.

The descrambling unit 191 receives a signal sequence Act of the active carriers in the P1 symbol from the P1 wide band fc error detection/correction unit 155 illustrated in FIG. 4 (more specifically, from the correction unit 180 illustrated in FIG. 6) as input. The descrambling unit 191 performs the descrambling indicated in Math 9 above on the signal sequence Act of the active carriers and outputs a descrambled signal sequence DESCR to the differential demodulation unit 192.

In specific, the descrambling unit 191 uses a signal $PRBS_i$ (I=0, 1, . . . , 319), based on a PRBS used for multiplication at the transmitting end, and performs the descrambling indicated in Math 10 above on a signal Act constituting the signal sequence Act of the active carriers. The descrambling unit 191 then outputs a descrambled signal $DESCR_i$ to the differential demodulation unit 192.

The differential demodulation unit 192 receives the descrambled signal $DESCR_i$(i=0, 1, . . . , 319) from the descrambling unit 191 as input. The differential demodulation unit 192 performs differential detection by complex multiplication of the signal $DESCR_i$(i=0, 1, . . . , 319) and a signal $DESCR^*_{i-1}$, which is the complex conjugate of a signal $DESCR_{i-1}$ obtained by shifting the signal $DESCR_i$ by one active carrier. Further, the differential demodulation unit 192 demodulates (hard decision) the signal $DESCR_i \cdot DESCR^*_{i-1}$ according to the polarity of the real axis of the result of the differential detection and outputs the demodulated signal $DEMOD_i$ to the pattern matching unit 193. The processing by the differential demodulation unit 192 is represented by Math 11 above. The differential demodulation by the differential demodulation unit 192 is demodulation corresponding to DBPSK. Since i=0 is a reference, the differential demodulation unit 192 performs demodulation (hard decision) according to the polarity of the real axis of the signal $DESCR_0$ and outputs the demodulated signal $DEMOD_0$ to the pattern matching unit 193. Note that as the hard decision, when the signal $DESCR_i \cdot DESCR^*_{i-1}$ is "0", the signal $DEMOD_i$ is output as "0", but a "1" may be output instead.

The pattern matching unit 193 divides the signals $DEMOD_0$, $DEMOD_1$, . . . , $DEMOD_{319}$ differentially demodulated by the differential demodulation unit 192 into a signal sequence $DEMOD\_CSS_{S1}$ (corresponding to the S1 signal) and a signal sequence $DEMOD\_CSS_{S2}$ (corresponding to the S2 signal) as indicated in Math 12 and Math 13 above.

Further, the pattern matching unit 193 performs the following processing to calculate which of the sequences $CSS_{S1,k}$ (k=0, 1, . . . , 7) indicated in FIG. 31 has the highest degree of certainty and to calculate which of the signal sequences $CSS_{S2,k}$(k=0, 1, . . . , 15) indicated in FIG. 31 has the highest degree of certainty.

The pattern matching unit 193 calculates correlations $CORR_{S1,k}$ between the sequences $CSS_{S1,k}$ indicated in FIG. 31 and the sequence $DEMOD\_CSS_{S1}$, as indicated in Math 14 above. The pattern matching unit 2103 also calculates correlations $CORR_{S2,k}$ between the sequences $CSS_{S2,k}$ indicated in FIG. 31 and the sequence $DEMOD\_CSS_{S2}$, as indicated in Math 15 above.

The pattern matching unit 193 estimates that the three-bit S1 signal (refer to FIG. 31) corresponding to the signal sequence $CSS_{S1,k}$ having the greatest correlation value among the eight correlation values yielded by the calculation indicated by Math 14 above is the transmitted S1 signal. In addition, the pattern matching unit 193 estimates that the four-bit S2 signal (refer to FIG. 31) corresponding to the signal sequence $CSS_{S2,k}$ having the greatest correlation value among the sixteen correlation values yielded by the calculation indicated by Math 15 above is the transmitted S2 signal. The pattern matching unit 193 obtains the P1 transmission information by using the S1 signal and the S2 signal so estimated.

In the explanation provided in the above, among the S1 signal in the low frequency range and the S1 signal in the high frequency range, only the S1 signal in the low frequency range of the P1 symbol is used when decoding the P1 symbol, but decoding is not limited in this way. It is also possible to use both S1 signals, or to use only the S1 signal in the high frequency range. Using both S1 signals allows for estimation of the S1 signal by using two S1 signals in different frequency ranges, thus improving the accuracy of estimation of the S1 signal.

In the explanation provided in the above, the differential demodulation unit 192 included in the P1 decoding unit 156 performs hard decision. However, the present embodiment is not limited to this, and the differential demodulation unit 192 need not perform hard decision. In such a case where hard decision is not performed, the differential demodulation unit 192 outputs the result $DESCR_i \cdot DESCR^*_{i-1}$ of the differential detection as $DEMOD_i$ (i=1, . . . , 319) to the pattern matching unit 193, and when i=0, the differential demodulation unit 192 outputs $DESCR_0$ as $DEMOD_0$ to the pattern matching unit 193. Further, in such a case, the pattern matching unit 193 calculates correlations by using Math 17 and Math 18 below instead of using Math 14 and Math 15 above.

$$CORR_{S1,k} = \sum_{i=0}^{63} DEMOD_i \times 2\left(\frac{1}{2} - CSS_{S1,k,i}\right) \quad \text{Math 17}$$

$$CORR_{S2,k} = \sum_{i=0}^{255} DEMOD_{i+64} \times 2\left(\frac{1}{2} - CSS_{S2,k,i}\right) \quad \text{Math 18}$$

In the explanation provided in the above, the P1 decoding unit 156 performs pattern-matching following the differential demodulation since explanation is provided presuming application to the DVB-T2 transmission standard. The present embodiment is not, however, limited in this way. For example, for application to a transmission scheme with error correction coding, error correction is to be performed following the differential demodulation, and decoding would be performed by using the results of the error correction with the fewest errors.

In the following, explanation is provided of the reason as to why the accuracy of the detection of the wide band carrier frequency error amount by the P1 demodulation unit 103 is improved.

Figure 37:
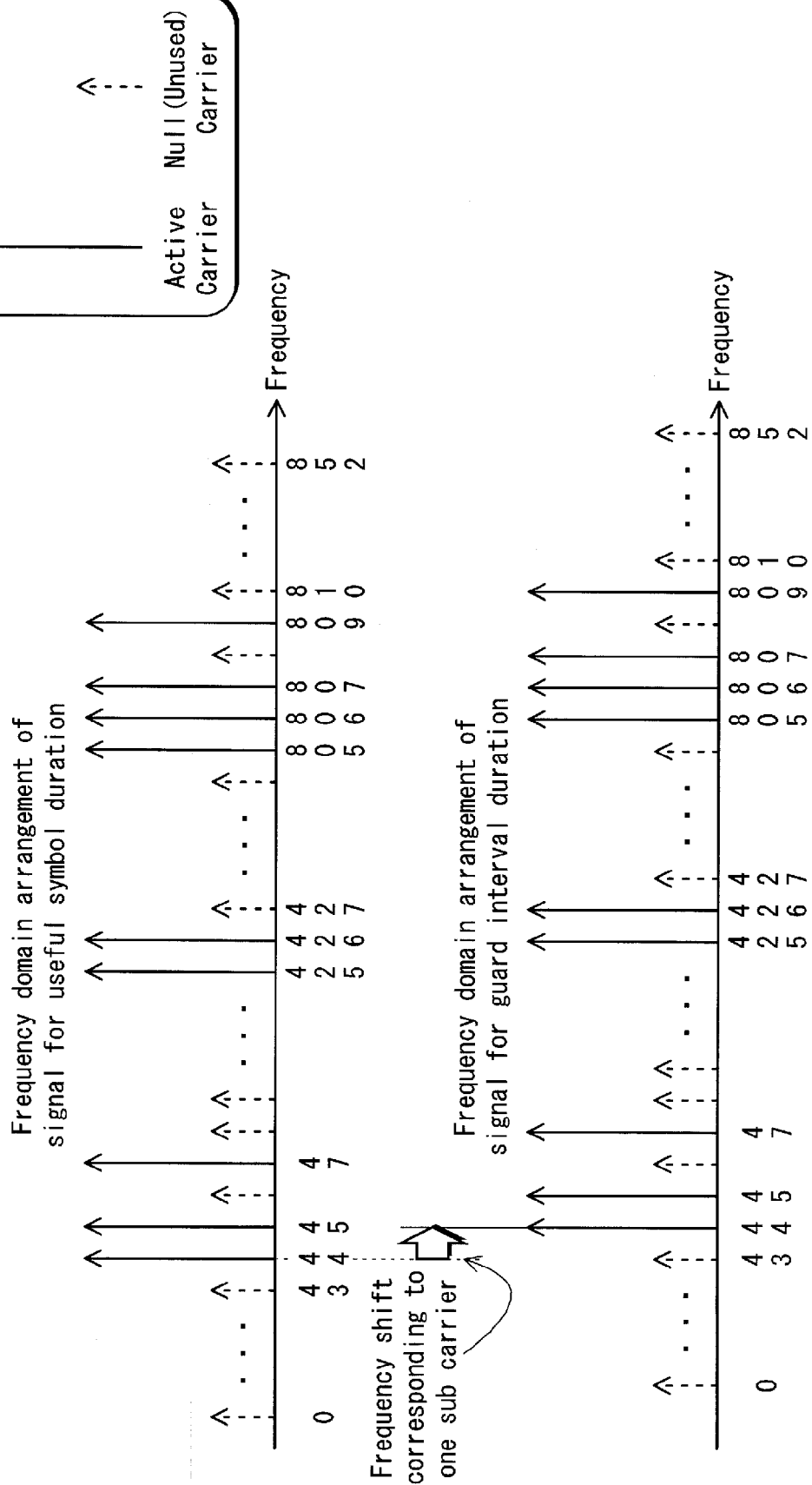
FIG. 37 is a schematic diagram for comparing a frequency domain position of a signal for a useful symbol duration of a P1 symbol and a frequency domain position of a signal for a guard interval duration of a P1 symbol.
Figure 38:
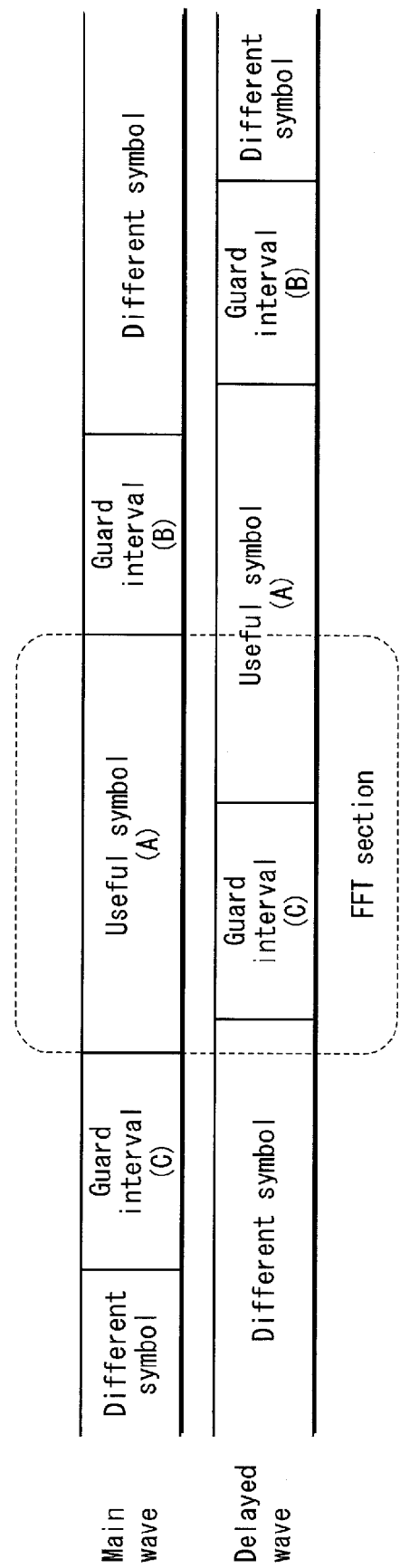
FIG. 38 is a schematic diagram illustrating a P1 symbol in the time domain in a case where a delayed wave exists.
Figure 39:
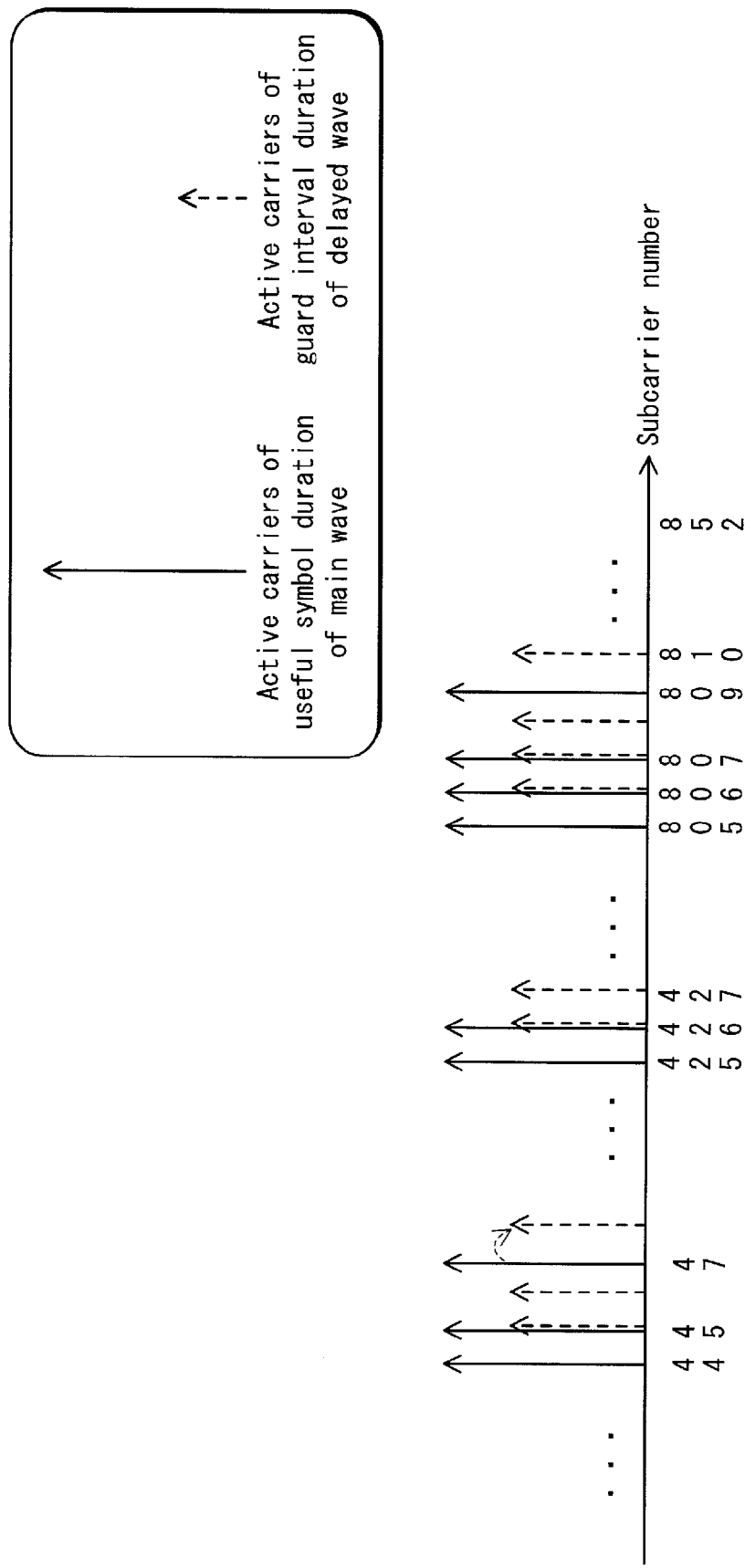
FIG. 39 is a schematic diagram illustrating a P1 symbol in the frequency domain in a case where a delayed wave exists.

As already mentioned in the above, the signal for the preceding guard interval duration of the P1 symbol and the signal for the succeeding guard interval duration of the P1 symbol are each yielded by frequency shifting the signal for the useful symbol duration of the P1 symbol in the high frequency direction by a frequency corresponding to one subcarrier. That is, the signal for the preceding guard interval duration of the P1 symbol and the signal for the succeeding guard interval duration of the P1 symbol are higher in frequency than the signal for the useful symbol duration of the P1 symbol by one subcarrier (refer to FIG. 37).

Figure 8:
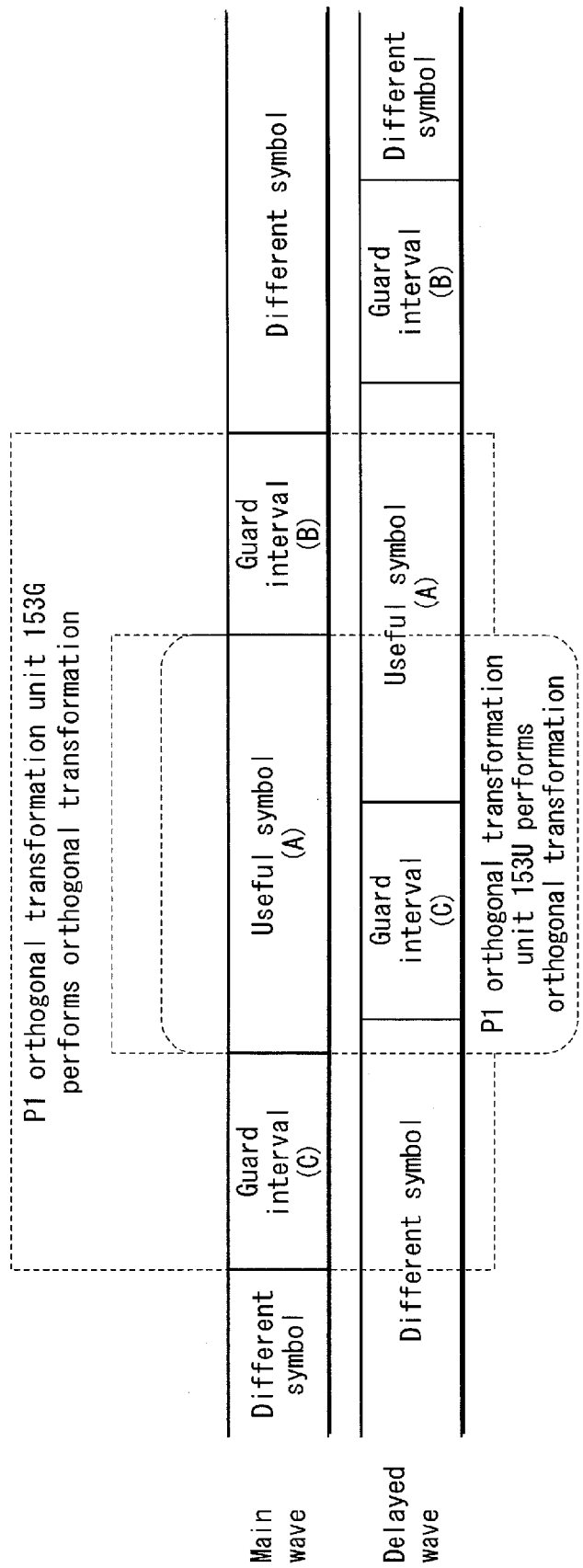
FIG. 8 is a schematic diagram illustrating a P1 symbol in a time domain in a case where a delayed wave exists.
Figure 9:
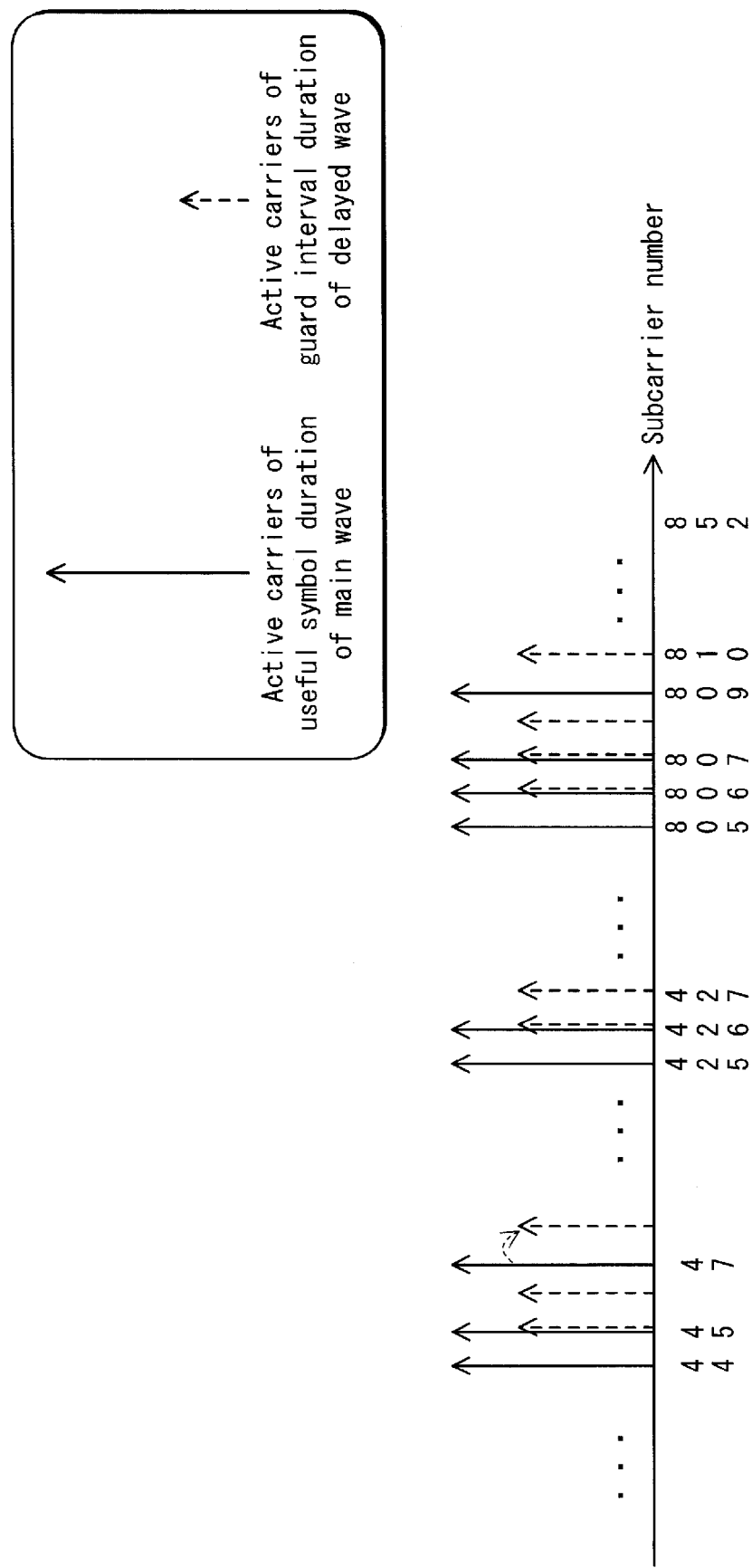
FIG. 9 is a schematic diagram illustrating a P1 symbol in a frequency domain in a case where a delayed wave exists.
Figure 10:
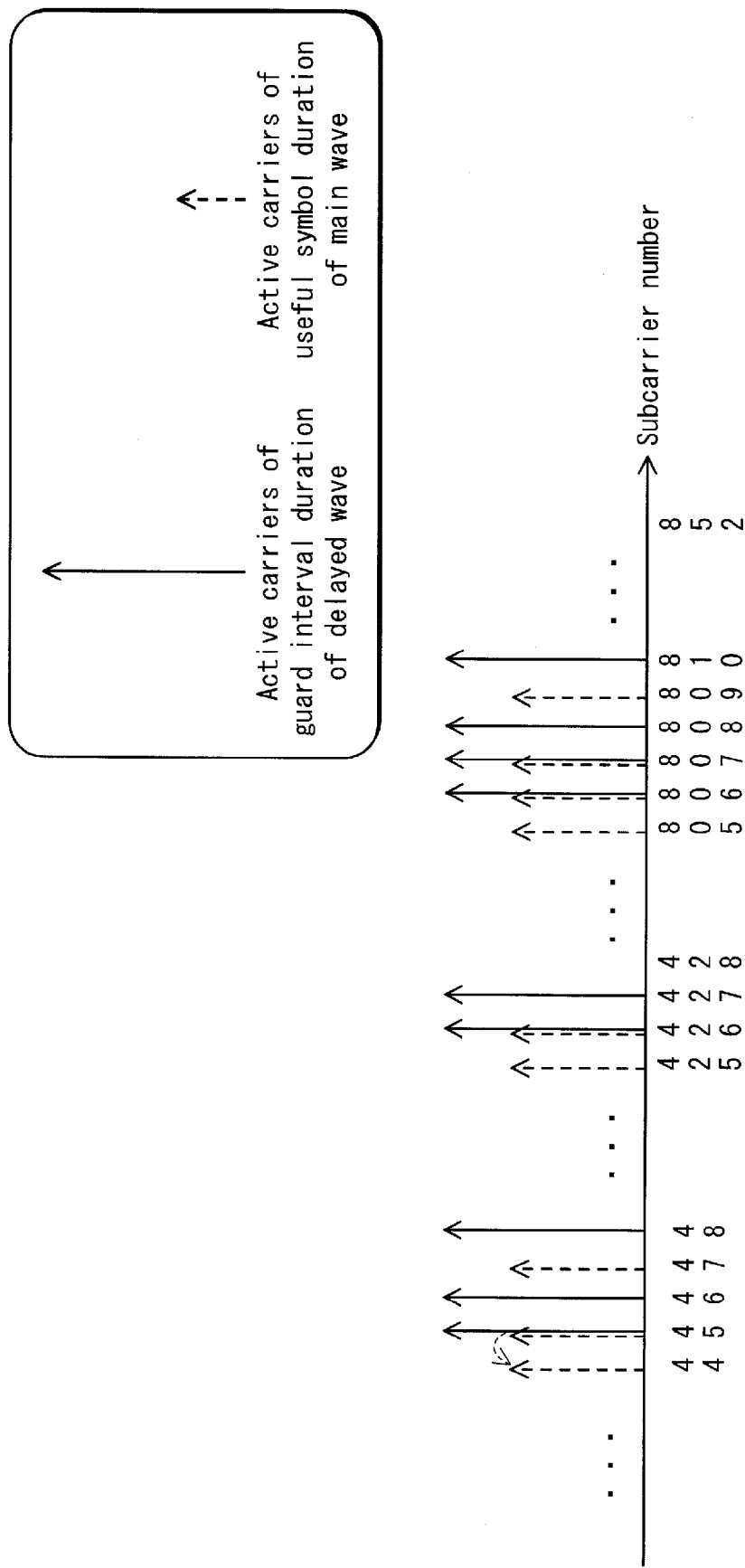
FIG. 10 is a schematic diagram illustrating a P1 symbol in the frequency domain in a case where a delayed wave exists.

Hence, when a delayed wave as illustrated in FIG. 8 exists in the signal received by the OFDM reception device 1, the distribution of subcarriers, in the frequency domain, in the signal (the signal output from the P1 orthogonal transformation unit 153U) obtained as a result of orthogonal transformation (for instance, FFT) being performed on the signal output from the P1 narrow band fc error detection/correction unit 152 is as illustrated in FIG. 9. Here, the orthogonal transformation is performed by setting the useful symbol duration of the main wave of the P1 symbol as the section on which orthogonal transformation is performed. In addition, the distribution of subcarriers, in the frequency domain, in the signal (signal output from the P1 orthogonal transformation unit 153G) obtained as a result of orthogonal transformation (for instance, FFT) being performed on the signal output from the P1 narrow band fc error detection/correction unit 152 is illustrated in FIG. 10. Here, the orthogonal transformation is performed by setting the combined guard interval duration of the main wave of the P1 symbol as the section on which orthogonal transformation is performed.

As illustrated in FIG. 9, when orthogonal transformation is performed on the signal for the useful symbol duration of the main wave of the P1 symbol, the signal components for the preceding guard interval duration of the delayed wave are included, and hence, active carriers of the delayed wave appear higher in the frequency direction by a frequency corresponding to one subcarrier of the P1 symbol than the active carriers of the main wave. On the other hand, as illustrated in FIG. 10, when orthogonal transformation is performed on the signal for the combined guard interval duration of the main wave of the P1 symbol, the signal components for the useful symbol duration of the delayed wave are included, and hence, active carriers of the delayed wave appear lower in the frequency direction by a frequency corresponding to one subcarrier of the P1 symbol than the active carriers of the main wave.

When taking into consideration the fact that the frequency domain signal output from the P1 orthogonal transformation unit 153G is shifted, in entirety, by one subcarrier with respect to the frequency domain signal output from the P1 orthogonal transformation unit 153U, the subcarrier positions at which the signal components of the delayed wave appear with respect to the null carriers differ between the two signals.

Hence, by performing the calculation indicated in Math 16 above, the active carrier signal components strengthen each other, whereas the null carrier signal components weaken each other. Accordingly, the increase in arrangement correlation values corresponding to incorrect shift amounts (wide band carrier frequency error amounts) is suppressed in the calculation of the arrangement correlations, and hence, detection of the correct shift amount (a wide band carrier frequency error amount) is realized. Hence, the wide band carrier frequency shift of the P1 symbol can be corrected according to an accurate estimation of the wide band carrier frequency error amount even in an environment with multi-path interference. As such, the S1 symbol and the S2 symbols can be obtained correctly.

Further, by performing calculation of the complex conjugate, the uncertainty of the polarity of the signals that DBPSK has been performed on and that are mapped to the active carriers can be eliminated while not requiring calculation of the power values of the subcarriers (active carriers and null carriers). Further, since the calculation of the power values of the subcarriers is not performed, the suppression of noise components having various phase components is realized when calculation is performed of the sum of the tap outputs in the calculation of the arrangement correlations. As such, the estimation of the wide band carrier frequency error amount can be performed with a high degree of accuracy even in an environment with noise.

Embodiment 2

In the following, explanation is provided of embodiment 2 of the present invention with reference to the accompanying drawings. Note that in the present embodiment, constituent elements that are substantially the same as the constituent elements of embodiments 1 are indicated with the same reference signs, and description thereof is omitted, since the same description as in embodiments 1 applies.

The OFDM reception device pertaining to embodiment 2 differs from the OFDM reception device 1, explanation of which has been provided in embodiment 1, in that the OFDM reception device pertaining to embodiment 2 includes a P1 wide band fc error detection/correction unit 200 that differs from the P1 wide band fc error detection/correction unit 155 included in the OFDM reception device 1. The P1 wide band fc error detection/correction unit 200 differs from the P1 wide band fc error detection/correction unit 155 of embodiment 1 in terms of the mechanism for detecting the wide band carrier frequency error amount.

Figure 11:
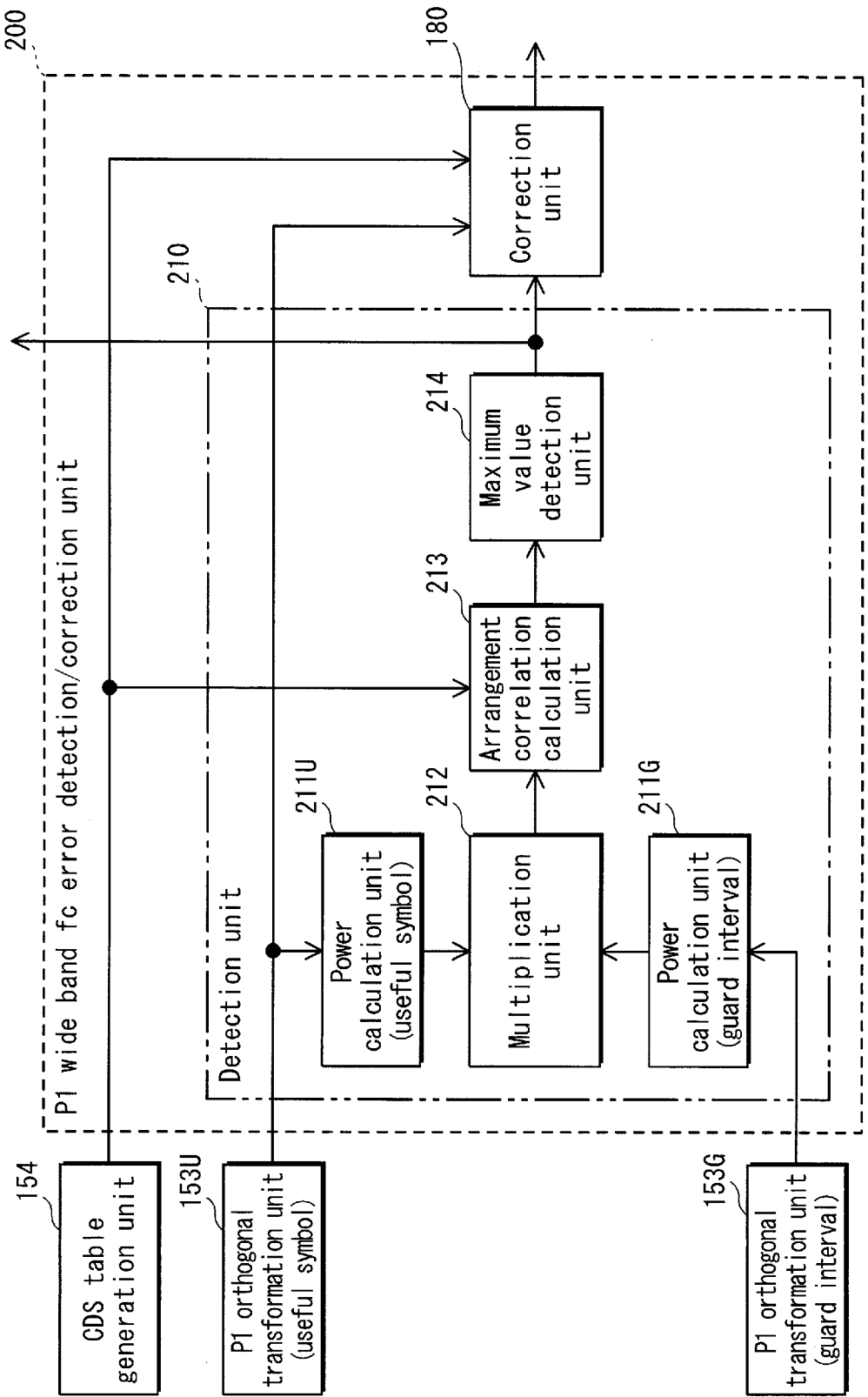
FIG. 11 illustrates a structure of a P1 wide band error detection/correction unit 200 pertaining to embodiment 2.

In the following, explanation is provided of the P1 wide band fc error detection/correction unit 200 with reference to FIG. 11. FIG. 6 illustrates a structure of the P1 wide band fc error detection/correction unit 200. Note that, in order as to clarify input to each of the units of the P1 wide band fc error detection/correction unit 200, the P1 orthogonal transformation unit 153U, the P1 orthogonal transformation unit 153G, and the CDS table generation unit 154 are also illustrated in FIG. 11.

The P1 wide band fc error detection/correction unit 200 includes a detection unit 210 and the correction unit 180.

The detection unit 210 detects, for the P1 symbol, a carrier frequency error amount having a frequency domain size in units of a subcarrier spacing of the P1 symbol (a wide band carrier frequency error amount). The detection unit 210 includes: a power calculation unit 211U; a power calculation unit 211G; a multiplication unit 212; an arrangement correlation calculation unit (summation processing unit) 213; and a maximum value detection unit 214.

The power calculation unit 211U calculates the power value for each subcarrier of the signal (a frequency domain complex baseband signal for the useful symbol duration of the P1 symbol) output from the P1 orthogonal transformation unit 153U and outputs the power values so calculated to the multiplication unit 212.

The power calculation unit 211G calculates the power value for each subcarrier of the signal (a frequency domain complex baseband signal for the combined guard interval duration of the P1 symbol) output from the P1 orthogonal transformation unit 153G and outputs the power values so calculated to the multiplication unit 212.

The multiplication unit 212 performs multiplication of the signal $|Y_U(n)|^2$ output from the power calculation unit 211U and the signal $|Y_G(n+1)|^2$ output from the power calculation unit 211G for each subcarrier as indicated in Math 19 below and outputs the result $Y_{COMB}(n)$ of the multiplication to the arrangement correlation calculation unit 213.

$$Y_{COMB}(n)=|Y_U(n)|^2 \cdot |Y_G(n+1)|^2 \qquad \text{Math 19}$$

The signal for the preceding guard interval duration and the signal for the succeeding guard interval duration are signals yielded by frequency shifting the signal for the useful symbol duration by a frequency $f_{SH}$ (by frequency shifting the signal for the useful symbol duration in the high frequency direction by a frequency corresponding to one subcarrier). As such, the signal output from the power calculation unit 211G is shifted in the high frequency direction by a frequency corresponding to one subcarrier with respect to the signal output from the power calculation unit 211U. Taking this into consideration, the multiplication unit 212 performs multiplication of the signal $|Y_U(n)|^2$ output from the power calculation unit 211U and the signal $|Y_G(n+1)|^2$ output from the power calculation unit 211G, which is shifted in the high frequency direction by a frequency corresponding to one subcarrier with respect to the signal $|Y_U(n)|^2$.

The arrangement correlation calculation unit 213 receives the signal $Y_{COMB}$ output from the multiplication unit 212 as input, as well as the active carrier arrangement sequence input from the CDS table generation unit 154. The arrangement correlation calculation unit 213 performs summation processing of summing values of subcarriers, among continuous subcarriers of the signal output from the multiplication unit 212, corresponding to subcarriers with a value "1" in the active carrier arrangement sequence. The summation processing is performed while sequentially shifting the continuous subcarriers of the signal output from the multiplication unit 212 one subcarrier at a time in the subcarrier direction within a predetermined range for every iteration (i.e. the arrangement correlation calculation unit 213 calculates arrangement correlations between the signal output from the multiplication unit 212 and the active carrier arrangement sequence while sequentially shifting the signal output from the multiplication unit 212 one subcarrier at a time in the subcarrier direction within the predetermined range). The arrangement correlation calculation unit 213 sequentially outputs summed values (arrangement correlation values) yielded as results of iterations of the summation processing to the maximum power detection unit 214.

The maximum value detection unit 214 detects the greatest arrangement correlation value from among the arrangement correlation values sequentially input from the arrangement correlation calculation unit 213. The maximum value detection unit 214 outputs a shift amount which yields the greatest arrangement correlation value to the correction unit 180 and the fc correction unit 102 illustrated in FIG. 3 as a frequency error amount having a frequency domain size in units of a subcarrier spacing of the P1 symbol (a wide band carrier frequency error amount).

The correction unit 180 corrects a wide band carrier frequency shift of the signal output from the P1 orthogonal transformation unit 153U by using the wide band carrier frequency error amount input from the maximum value detection unit 214 and extracts active carriers.

According to the present embodiment, the wide band carrier frequency shift can be corrected even in an environment with multi-path interference by accurately performing the estimation of the wide band carrier frequency error amount. As such, the S1 symbol and the S2 symbols can be obtained correctly.

Embodiment 3

In the following, explanation is provided of embodiment 3 of the present invention with reference to the accompanying drawings. Note that in the present embodiment, constituent elements that are substantially the same as the constituent elements of embodiments 1 and 2 are indicated with the same reference signs, and description thereof is omitted, since the same description as in embodiments 1 and 2 applies.

The OFDM reception device pertaining to embodiment 3 differs from the OFDM reception devices, explanation of which has been provided in embodiments 1 and 2, in that the OFDM reception device pertaining to embodiment 3 includes a P1 wide band fc error detection/correction unit 250 that differs from the P1 wide band fc error detection/correction units 155 and 200. In specific, the P1 wide band fc error detection/correction unit 250 differs from the P1 wide band fc error detection/correction units 155 and 200 of embodiments 1 and 2 in terms of the mechanism for detecting the wide band carrier frequency error amount.

Figure 12:
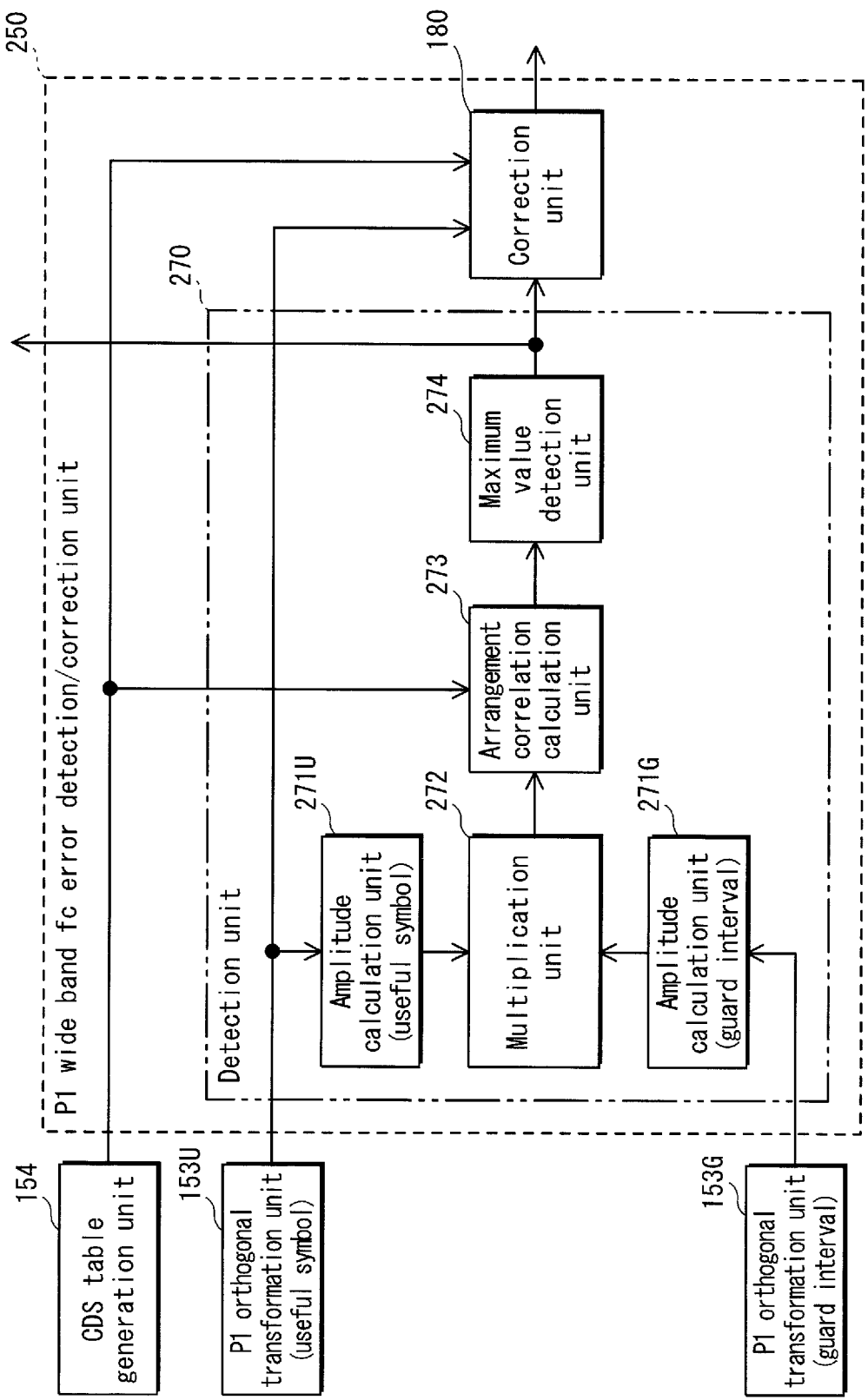
FIG. 12 illustrates a structure of a P1 wide band error detection/correction unit 250 pertaining to embodiment 3.

In the following, explanation is provided of the P1 wide band fc error detection/correction unit 250 pertaining to embodiment 3 with reference to FIG. 12. FIG. 12 illustrates a structure of the P1 wide band fc error detection/correction unit 250. Note that, in order as to clarify input to each of the units of the P1 wide band fc error detection/correction unit 250, the P1 orthogonal transformation unit 153U, the P1 orthogonal transformation unit 153G, and the CDS table generation unit 154 are also illustrated in FIG. 12.

The P1 wide band fc error detection/correction unit 250 includes a detection unit 270 and the correction unit 180.

The detection unit 270 detects, for the P1 symbol, a carrier frequency error amount having a frequency domain size in units of a subcarrier spacing of the P1 symbol (a wide band carrier frequency error amount). The detection unit 270 includes: an amplitude calculation unit 271U; an amplitude calculation unit 271G; a multiplication unit 272; an arrangement correlation calculation unit (summation processing unit) 273; and a maximum value detection unit 274.

The amplitude calculation unit 271U calculates the amplitude value for each subcarrier of the signal (a frequency domain complex baseband signal for the useful symbol duration of the P1 symbol) output from the P1 orthogonal transformation unit 153U and outputs the amplitude values so calculated to the multiplication unit 272.

The amplitude calculation unit 271U calculates the amplitude value for each subcarrier of the signal (a frequency domain complex baseband signal for the combined guard interval duration of the P1 symbol) output from the P1 orthogonal transformation unit 153G and outputs the amplitude values so calculated to the multiplication unit 272.

The multiplication unit 272 performs multiplication of the signal |Y$_U$(n)| output from the amplitude calculation unit 271U and the signal |Y$_G$(n+1)| output from the amplitude calculation unit 271G for each subcarrier as indicated in Math 20 below and outputs the result Y$_{COMB}$(n) of the multiplication to the arrangement correlation calculation unit 273.

$$Y_{comb}(n)=|Y_U(n)|\cdot|Y_G(n+1)|$$ Math 20

The signal for the preceding guard interval duration and the signal for the succeeding guard interval duration are signals yielded by frequency shifting the signal for the useful symbol duration by a frequency f$_{SH}$ (by frequency shifting the signal for the useful symbol duration in the high frequency direction by a frequency corresponding to one subcarrier). As such, the signal output from the amplitude calculation unit 271G is shifted in the high frequency direction by a frequency corresponding to one subcarrier with respect to the signal output from the amplitude calculation unit 271U. Taking this into consideration, the multiplication unit 272 performs multiplication of the signal |Y$_U$(n)| output from the amplitude calculation unit 271U and the signal |Y$_G$(n+1)| output from the amplitude calculation unit 271G, which is shifted in the high frequency direction by a frequency corresponding to one subcarrier with respect to the signal |Y$_U$(n)|.

The arrangement correlation calculation unit 273 receives the signal Y$_{COMB}$ output from the multiplication unit 272 as input, as well as the active carrier arrangement sequence input from the CDS table generation unit 154. The arrangement correlation calculation unit 273 performs summation processing of summing values of subcarriers, among continuous subcarriers of the signal output from the multiplication unit 272, corresponding to subcarriers with a value "1" in the active carrier arrangement sequence. The summation processing is performed while sequentially shifting the continuous subcarriers of the signal output from the multiplication unit 272 one subcarrier at a time in the subcarrier direction within a predetermined range for every iteration (i.e. the arrangement correlation calculation unit 273 calculates arrangement correlations between the signal output from the multiplication unit 272 and the active carrier arrangement sequence while sequentially shifting the signal output from the multiplication unit 272 one subcarrier at a time in the subcarrier direction within the predetermined range). Further, the arrangement correlation calculation unit 273 sequentially outputs summed values (arrangement correlation values) yielded as results of iterations of the summation processing to the maximum power detection unit 274.

The maximum value detection unit 274 detects the greatest arrangement correlation value from among the arrangement correlation values sequentially input from the arrangement correlation calculation unit 273. The maximum value detection unit 274 outputs a shift amount which yields the greatest arrangement correlation value to the correction unit 180 and the fc correction unit 102 illustrated in FIG. 3 as a frequency error amount having a frequency domain size in units of a subcarrier spacing of the P1 symbol (a wide band carrier frequency error amount).

The correction unit 180 corrects the wide band carrier frequency shift of the signal output from the P1 orthogonal transformation unit 153U by using the wide band carrier frequency error amount input from the maximum value detection unit 274 and extracts active carriers.

According to the present embodiment, the wide band carrier frequency shift can be corrected even in an environment with multi-path interference by accurately performing the estimation of the wide band carrier frequency error amount. As such, the S1 symbol and the S2 symbols can be obtained correctly.

Embodiment 4

In the following, explanation is provided of embodiment 4 of the present invention with reference to the accompanying drawings. Note that in the present embodiment, constituent elements that are substantially the same as the constituent elements of embodiments 1 through 3 are indicated with the same reference signs, and description thereof is omitted, since the same description as in embodiments 1 through 3 applies.

The OFDM reception device pertaining to embodiment 4 differs from the OFDM reception devices, explanation of which has been provided in embodiments 1 through 3, in that the OFDM reception device pertaining to embodiment 4 includes a P1 wide band fc error detection/correction unit 300 that differs from the P1 wide band fc error detection/correction unit 155 and the like. In specific, the P1 wide band fc error detection/correction unit 300 differs from the P1 wide band fc error detection/correction unit 155 and the like in terms of the mechanism for detecting the wide band carrier frequency error amount.

Figure 13:
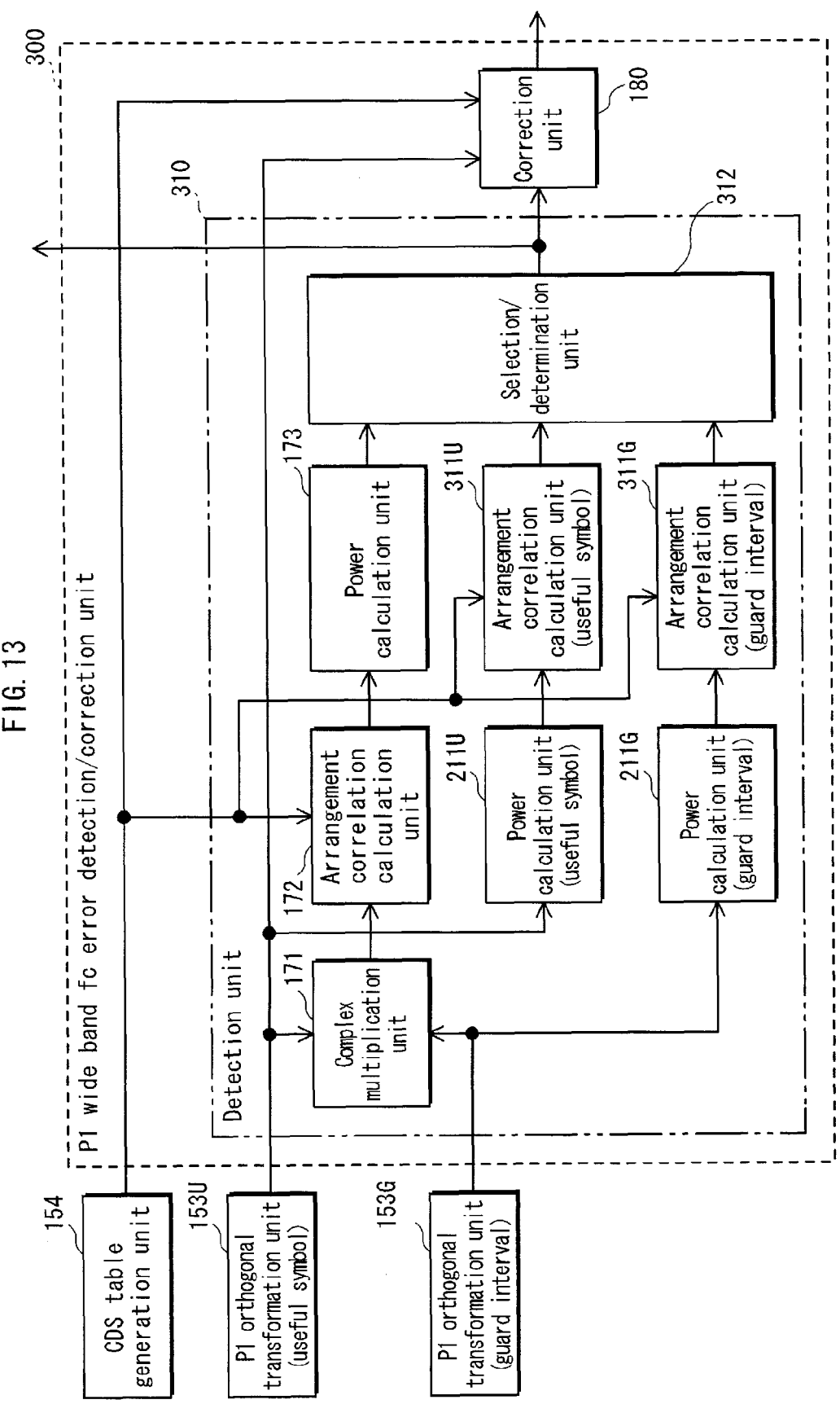
FIG. 13 illustrates a structure of a P1 wide band error detection/correction unit 300 pertaining to embodiment 4.

In the following, explanation is provided of the P1 wide band fc error detection/correction unit 300 pertaining to embodiment 4 with reference to FIG. 13. FIG. 13 illustrates a structure of the P1 wide band fc error detection/correction unit 300. Note that, in order as to clarify input to each of the units of the P1 wide band fc error detection/correction unit 300, the P1 orthogonal transformation unit 153U, the P1 orthogonal transformation unit 153G, and the CDS table generation unit 154 in are also illustrated in FIG. 13.

The P1 wide band fc error detection/correction unit 300 includes a detection unit 310 and the correction unit 180.

The detection unit 310 detects, for the P1 symbol, a carrier frequency error amount having a frequency domain size in units of a subcarrier spacing of the P1 symbol (a wide band carrier frequency error amount). The detection unit 310 includes: the complex multiplication unit 171; the arrangement correlation calculation unit (summation processing unit) 172; the power calculation unit 173; the power calculation unit 211U; an arrangement correlation calculation unit (summation processing unit) 311U; the power calculation unit 211G; an arrangement correlation calculation unit 311G; and a selection/determination unit 312.

Figure 14:
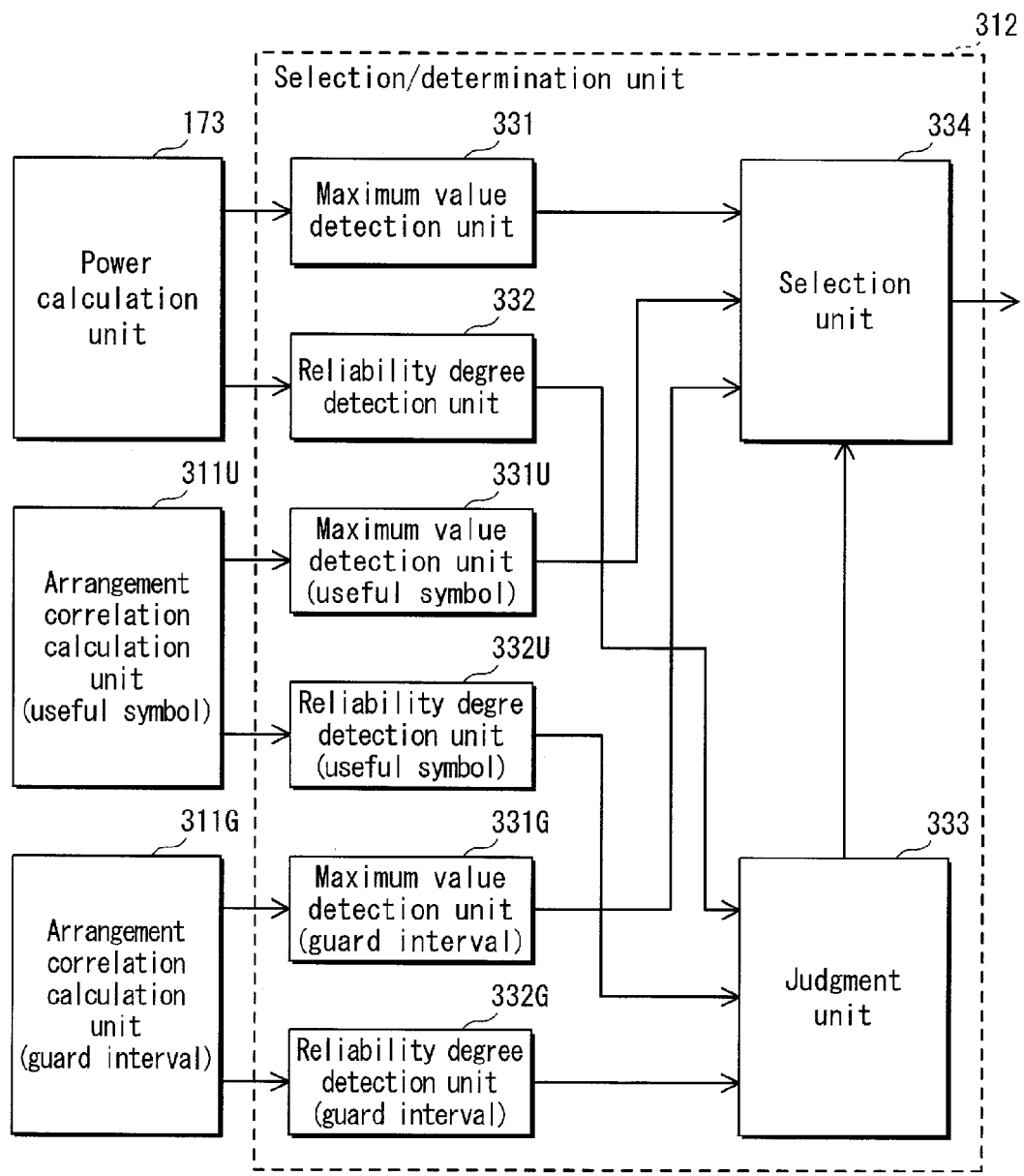
FIG. 14 illustrates a structure of a selection/determination unit 312 illustrated in FIG. 13.

The complex multiplication unit 171, the arrangement correlation calculation unit 172, and the power calculation unit 173 each perform the corresponding processing described above, and the signals (arrangement correlation power values) output from the power calculation unit 173 are supplied to the selection/determination unit 312 (more specifically, to a maximum value detection unit 331 and a reliability degree detection unit 332 illustrated in FIG. 14, explanation of which is provided in the following).

The power calculation unit 211U performs the corresponding processing described above, and the signals output from the power calculation unit 211U are supplied to the arrangement correlation calculation unit 311U.

The arrangement correlation calculation unit 311U receives the signal |Y$_U$|$^2$ output from the power calculation unit 211U as input, as well as the active carrier arrangement sequence input from the CDS table generation unit 154. The arrangement correlation calculation unit 311U performs summation processing of summing values of subcarriers, among continuous subcarriers of the signal output from the power calculation unit 211U, corresponding to subcarriers with a value of "1" in the active carrier arrangement sequence. The summation processing is performed while sequentially shifting the continuous subcarriers of the signal output from the power calculation unit 211U one subcarrier at a time in the subcarrier direction within a predetermined range for every iteration (i.e. the arrangement correlation calculation unit 311U calculates arrangement correlations between the signal output from the power calculation unit 211U and the active carrier arrangement sequence while sequentially shifting the signal output from the power calculation unit 211U one subcarrier at a time in the subcarrier direction within the predetermined range). The arrangement correlation calculation unit 311U sequentially outputs summed values (arrangement correlation values) yielded as results of iterations of the summation processing to the selection/determination unit 312 (more specifically, to a maximum value detection unit 331U and a reliability degree detection unit 332U illustrated in FIG. 14, explanation of which is provided in the following).

The power calculation unit 211G performs the corresponding processing described above, and the signals output from the power calculation unit 211G are supplied to the arrangement correlation calculation unit 311G.

The arrangement correlation calculation unit 311G receives the signal $|Y_G|^2$ output from the power calculation unit 211G as input, as well as the active carrier arrangement sequence input from the CDS table generation unit 154. The arrangement correlation calculation unit 311G performs summation processing of summing values of subcarriers, among continuous subcarriers of the signal output from the power calculation unit 211G, corresponding to subcarriers with a value of "1" in the active carrier arrangement sequence. The summation processing is performed while sequentially shifting the continuous subcarriers of the signal output from the power calculation unit 211G one subcarrier at a time in the subcarrier direction within a predetermined range for every iteration (i.e. the arrangement correlation calculation unit 311G calculates arrangement correlations between the signal output from the power calculation unit 211G and the active carrier arrangement sequence while sequentially shifting the signals output from the power calculation unit 211G one subcarrier at a time in the subcarrier direction within the predetermined range). The arrangement correlation calculation unit 311G sequentially outputs summed values (arrangement correlation values) yielded as results of iterations of the summation processing to the selection/determination unit 312 (more specifically, to a maximum value detection unit 331G and a reliability degree detection unit 332G illustrated in FIG. 14, explanation of which is provided in the following).

The selection/determination unit 312, as described in the following with reference to FIG. 14, detects, for the P1 symbol, a carrier frequency error amount having a frequency domain size in units of a subcarrier spacing of the P1 symbol (a wide band carrier frequency error amount) by using the signals output from the power calculation unit 173, the signals output from the arrangement correlation calculation unit 311U, and the signals output from the arrangement correlation calculation unit 311G. The selection/determination unit 312 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 312 and extracts active carriers.

In the following, explanation is provided of the selection/determination unit 312 illustrated in FIG. 13 with reference to FIG. 14. FIG. 14 illustrates a structure of the selection/determination unit 312 illustrated in FIG. 13. Note that, in order as to clarify input to each of the units of the selection/determination unit 312, the power calculation unit 173, the arrangement correlation calculation unit 311U, and the arrangement correlation calculation unit 311G are also illustrated in FIG. 14.

The selection/determination unit 312 includes: the maximum value detection unit 331; the reliability degree detection unit 332; the maximum value detection unit 331U; the reliability degree detection unit 332U; the maximum value detection unit 331G; the reliability degree detection unit 332G; a judgment unit 333; and a selection unit 334.

The maximum value detection unit 331 detects the greatest arrangement correlation power value from among the arrangement correlation power values sequentially input from the power calculation unit 173. Further, the maximum value detection unit 331 outputs a shift amount which yields the greatest arrangement correlation power value to the selection unit 334 as a candidate of the frequency error amount having a frequency domain size in units of a subcarrier spacing of the P1 symbol (the first candidate of the wide band carrier frequency error amount).

The reliability degree detection unit 332 detects the greatest arrangement correlation power value and the second greatest arrangement correlation power value from among the arrangement correlation power values sequentially input from the power calculation unit 173. Further, the reliability degree detection unit 332 divides the greatest arrangement correlation power value by the second greatest arrangement correlation power value and outputs a value obtained as a result of the division (greatest arrangement correlation power value÷second greatest arrangement correlation power value) to the judgment unit 333 as the reliability degree of the first candidate of the wide band carrier frequency error amount.

The maximum value detection unit 331U detects the greatest arrangement correlation value from among the arrangement correlation values sequentially input from the arrangement correlation calculation unit 311U. Further, the maximum value detection unit 331U outputs a shift amount which yields the greatest arrangement correlation value to the selection unit 334 as a candidate of the frequency error amount having a frequency domain size in units of a subcarrier spacing of the P1 symbol (the second candidate of the wide band carrier frequency error amount).

The reliability degree detection unit 332U detects the greatest arrangement correlation value and the second greatest arrangement correlation value from among the arrangement correlation values sequentially input from the arrangement correlation calculation unit 311U. Further, the reliability degree detection unit 332U divides the greatest arrangement correlation value by the second greatest arrangement correlation value and outputs a value obtained as a result of the division (greatest arrangement correlation value÷second greatest arrangement correlation value) to the judgment unit 333 as the reliability degree of the second candidate of the wide band carrier frequency error amount.

The maximum value detection unit 331G detects the greatest arrangement correlation value from among the arrangement correlation values sequentially input from the arrangement correlation calculation unit 311G. Further, the maximum value detection unit 331G outputs a shift amount that is larger, by a frequency corresponding to one subcarrier, than the shift amount which yields the greatest arrangement correlation value to the selection unit 334 as a candidate of the frequency error amount having a frequency domain size in units of a subcarrier spacing of the P1 symbol (the third candidate of the wide band carrier frequency error amount). The shift amount that is larger, by a frequency corresponding to one subcarrier, than the shift amount which yields the greatest arrangement correlation value is determined as the third candidate of the wide band carrier frequency error amount since the signal whose wide band carrier frequency shift has been corrected by the correction unit 180 is a signal for the useful symbol duration, and the signal for the guard interval duration is yielded by frequency shifting the signal for the useful symbol duration in the high frequency direction by a frequency corresponding to one subcarrier. Note that for instance, when the signal for the guard interval duration input to the orthogonal transformation unit 153G or the signal for the guard interval duration output from the orthogonal transformation unit 153G is frequency shifted by a frequency $-f_{SH}$ (when frequency shifting is performed in the low frequency direction by a frequency corresponding to one subcarrier), the maximum value detection unit 331G outputs a shift amount yielding the greatest arrangement correlation value to the selection unit 334 as the third candidate of the wide band carrier frequency error amount.

The reliability degree detection unit 332G detects the greatest arrangement correlation value and the second greatest arrangement correlation value from among the arrangement correlation values sequentially input from the arrangement correlation calculation unit 311G. Further, the reliability degree detection unit 332G divides the greatest arrangement correlation value by the second greatest arrangement correlation value and outputs a value obtained as a result of the division (greatest arrangement correlation value÷second greatest arrangement correlation value) to the judgment unit 333 as the reliability degree of the third candidate of the wide band carrier frequency error amount.

The judgment unit 333 compares the reliability degrees of the first, second, and third candidates of the wide band carrier frequency error amount respectively input from the reliability degree detection units 332, 332U, and 332G. The judgment unit 333 detects the candidate of the wide band carrier frequency error amount having the highest reliability degree (having the greatest reliability degree value) among the first, second, and third candidates of the wide band carrier frequency error amount. The judgment unit 333 notifies the selection unit 334 of the candidate of the wide band carrier frequency error amount having the highest reliability degree.

In the calculation of the arrangement correlations, the sum of the power values of all active carriers is calculated for the correct arrangement of subcarriers, whereas the sum of the power values of only a given number of active carriers and the power values of a given number of null carriers is calculated for incorrect arrangements of subcarriers. Hence, the greatest arrangement correlation power value and the greatest arrangement correlation value are yielded for the correct arrangement of subcarriers. The greatest arrangement correlation power value and the greatest arrangement correlation value are respectively greater than the second greatest arrangement correlation power value and the second greatest arrangement correlation value. Note that, the incorrect arrangement of subcarriers including the greatest number of active carriers includes half of the entire number of active carriers. Hence, the greatest values for a signal with a high reliability degree are values considerably greater than the second greatest values. Accordingly, the values (reliability degrees) obtained by dividing the greatest values by the second greatest values indicate a value considerably greater than 1. On the other hand, when influenced by external disturbance such as noise, impulse noise, and multi-path interference, the maximum arrangement correlation power value and the greatest arrangement correlation value take smaller values compared to the above. Further, since the power of the signal components for the null carriers is increased, the second greatest arrangement correlation power value and the second greatest arrangement correlation value take greater values compared to the above. Thus, there is a risk of the difference between the greatest values and the second greatest values being minimized and the greatest values being calculated by using an incorrect shift amount. Further, in such cases, the values (reliability degrees) obtained by dividing the greatest values by the second greatest values approximate 1. Taking this into consideration, the estimation of the reliability degree of the detection of the wide band carrier frequency error amount is performed according to the value obtained as a result of the division of the greatest values by the second greatest values.

According to the notification made by the judgment unit 333, the selection unit 334 selects the candidate having the highest reliability degree from among the first, second, and third candidates of the wide band carrier frequency error amount respectively input from the maximum value detection units 331, 331U, and 331G. Further, the selection unit 333 outputs the selected candidate of the wide band carrier frequency error amount to the fc correction unit 102 illustrated in FIG. 3 and the correction unit 180 illustrated in FIG. 13 as the wide band carrier frequency error amount to be used in the correction of the wide band carrier frequency shift of the P1 symbol.

Note that the complex multiplication unit 171, the arrangement correlation calculation unit 172, the power calculation unit 173, the maximum value detection unit 331, and the reliability degree detection unit 332 are blocks that detect the first candidate of the wide band carrier frequency error amount by using both the signal output from the orthogonal transformation unit 153U and the signal output from the orthogonal transformation unit 153G and that perform the first detection processing of detecting the reliability degree of the first candidate.

On the other hand, the power calculation unit 211U, the arrangement correlation calculation unit 311U, the maximum value detection unit 331U, and the reliability degree detection unit 332U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and that perform the second detection processing of detecting the reliability degree of the second candidate.

Further, the power calculation unit 211G, the arrangement correlation calculation unit 311G, the maximum value detection unit 331G, and the reliability degree detection unit 332G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and that perform the third detection processing of detecting the reliability degree of the third candidate.

According to the present embodiment, the detection of the wide band carrier frequency error amount is performed by utilizing the results of three types of detection, namely: (i) the detection of the first candidate of the wide band carrier frequency error amount by using both the signal for the useful symbol duration and the signal for the combined guard interval duration; (ii) the detection of the second candidate of the wide band carrier frequency error amount by using only the signal for the useful symbol duration; and (iii) the detection of the third candidate of the wide band carrier frequency error amount by using only the signal for the combined guard interval duration. By performing the detection of the wide band carrier frequency error amount in such a manner, the risk of incorrect estimation of the wide band carrier frequency error amount is reduced, and reception performance of the OFDM reception device is improved even in an environment where impulse noises locally exist in the preceding guard interval duration, the succeeding guard interval duration, or the useful symbol duration, as well as in an environment with multi-path interference and/or an environment with noise.

Embodiment 5

In the following, explanation is provided of embodiment 5 of the present invention with reference to the accompanying drawings. Note that in the present embodiment, constituent elements that are substantially the same as the constituent elements of embodiments 1 through 4 are indicated with the same reference signs, and description thereof is omitted, since the same description as in embodiments 1 through 4 applies.

The OFDM reception device pertaining to embodiment 5 differs from the OFDM reception devices, explanation of which has been provided in embodiments 1 through 4, in that the OFDM reception device pertaining to embodiment 5 includes a P1 wide band fc error detection/correction unit 350 that differs from the P1 wide band fc error detection/correction unit 155 and the like. In specific, the P1 wide band fc error detection/correction unit 350 differs from the P1 wide band fc error detection/correction unit 155 and the like in terms of the mechanism for detecting the wide band carrier frequency error amount.

Figure 15:
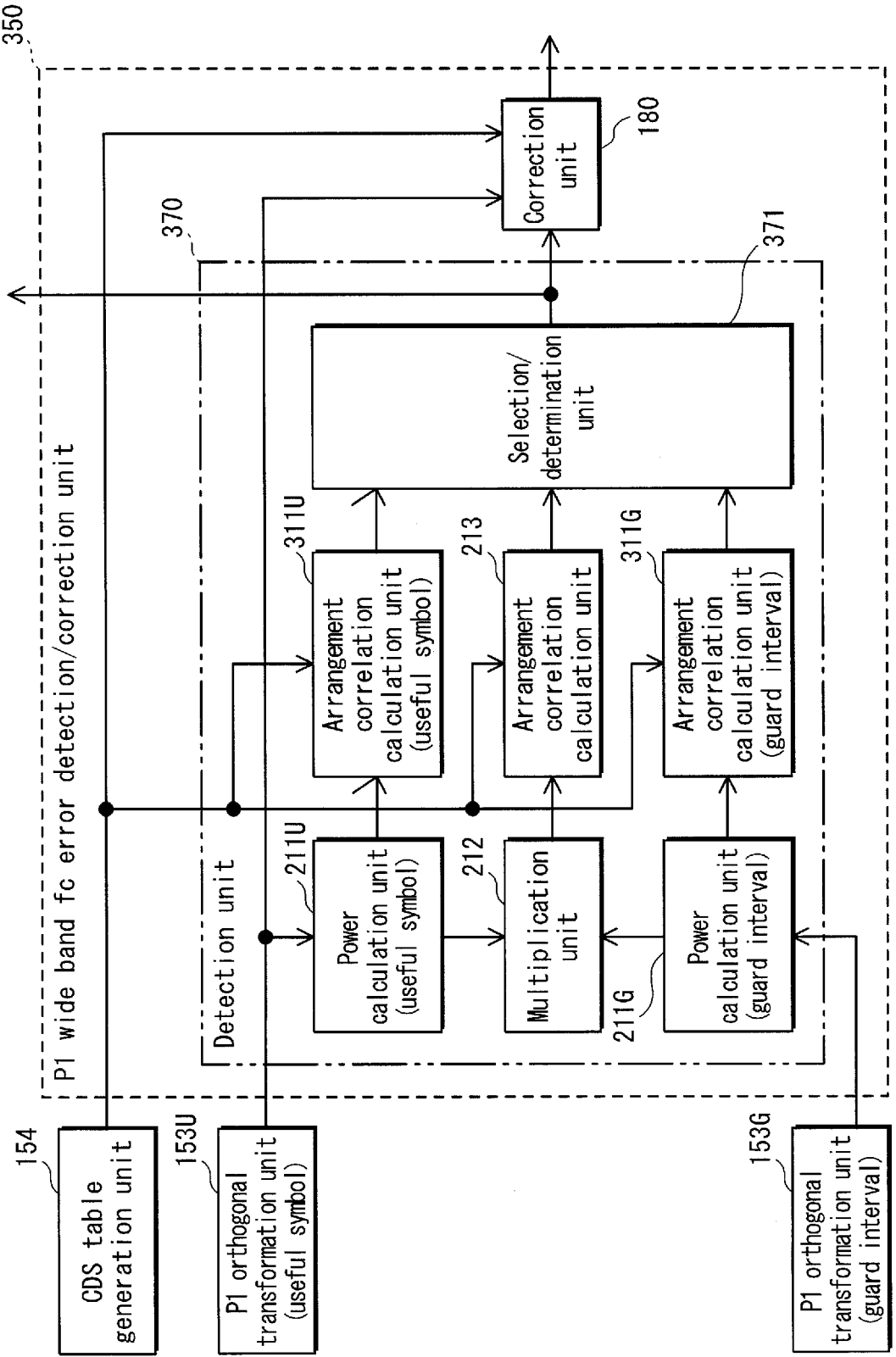
FIG. 15 illustrates a structure of a P1 wide band error detection/correction unit 350 pertaining to embodiment 5.

In the following, explanation is provided of the P1 wide band fc error detection/correction unit 350 pertaining to embodiment 5 with reference to FIG. 15. FIG. 15 illustrates a structure of the P1 wide band fc error detection/correction unit 350. Note that, in order as to clarify input to each of the units of the P1 wide band fc error detection/correction unit 350, the P1 orthogonal transformation unit 153U, the P1 orthogonal transformation unit 153G, and the CDS table generation unit 154 are also illustrated in FIG. 15.

The P1 wide band fc error detection/correction unit 350 includes a detection unit 370 and the correction unit 180.

The detection unit 370 detects, for the P1 symbol, a carrier frequency error amount having a frequency domain size in units of a subcarrier spacing of the P1 symbol (a wide band carrier frequency error amount). The detection unit 370 includes: the power calculation unit 211U; the power calculation unit 211G; the multiplication unit 212; the arrangement correlation calculation unit (summation processing unit) 213; the arrangement correlation calculation unit (summation processing unit) 311U; the arrangement correlation calculation unit (summation processing unit) 311G; and a selection/determination unit 371.

Figure 16:
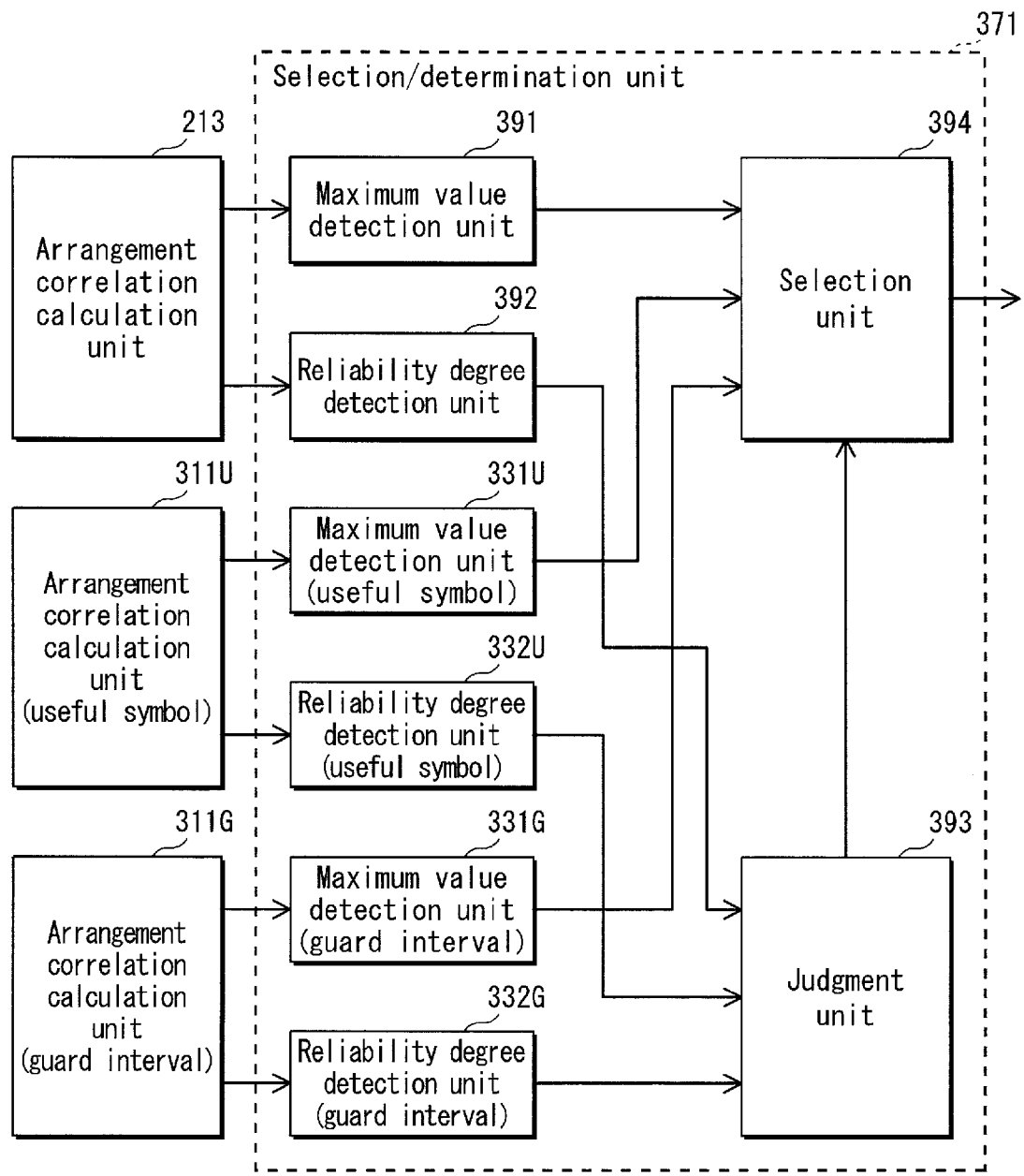
FIG. 16 illustrates a structure of a selection/determination unit 371 illustrated in FIG. 15.

The power calculation unit 211U, the power calculation unit 211G, and the arrangement correlation calculation unit 213 each perform the corresponding processing described above, and the signals (arrangement correlation values) output from the arrangement correlation calculation unit 213 are supplied to the selection/determination unit 371 (more specifically, to a maximum value detection unit 391 and a reliability degree detection unit 392 illustrated in FIG. 16, explanation of which is provided in the following).

The power calculation unit 211U and the arrangement correlation calculation unit 311U each perform the corresponding processing described above, and the signals (arrangement correlation values) output from the arrangement correlation calculation unit 311U are supplied to the selection/determination unit 371 (more specifically, to the maximum value detection unit 331U and the reliability degree detection unit 332U illustrated in FIG. 16, explanation of which is provided in the following).

The power calculation unit 211G and the arrangement correlation calculation unit 311G each perform the corresponding processing described above, and the signals (arrangement correlation values) output from the arrangement correlation calculation unit 311G are supplied to the selection/determination unit 371 (more specifically, to the maximum value detection unit 331G and the reliability degree detection unit 332G illustrated in FIG. 16, explanation of which is provided in the following).

The selection/determination unit 371, as described in the following with reference to FIG. 16, detects, for the P1 symbol, a carrier frequency error amount having a frequency domain size in units of a subcarrier spacing of the P1 symbol (a wide band carrier frequency error amount) by using the signals output from the arrangement correlation calculation unit 213, the signals output from the arrangement correlation calculation unit 311U, and the signals output from the arrangement correlation calculation unit 311G. The selection/determination unit 371 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 371 and extracts active carriers.

In the following, explanation is provided of the selection/determination unit 371 illustrated in FIG. 15 with reference to FIG. 16. FIG. 16 illustrates a structure of the selection/determination unit 371 illustrated in FIG. 15. Note that, in order as to clarify input to each of the units of the selection/determination unit 371, the arrangement correlation calculation unit 213, the arrangement correlation calculation unit 311U, and the arrangement correlation calculation unit 311G are also illustrated in FIG. 16.

The selection/determination unit 371 includes: the maximum value detection unit 391; the reliability degree detection unit 392; the maximum value detection unit 331U; the reliability degree detection unit 332U; the maximum value detection unit 331G; the reliability degree detection unit 332G; a judgment unit 393; and a selection unit 394.

The maximum value detection unit 391 detects the greatest arrangement correlation value from among the arrangement correlation values sequentially input from the arrangement correlation calculation unit 213. Further, the maximum value detection unit 391 outputs a shift amount which yields the greatest arrangement correlation value to the selection unit 394 as a candidate of the frequency error amount having a frequency domain size in units of a subcarrier spacing of the P1 symbol (the first candidate of the wide band carrier frequency error amount).

The reliability degree detection unit 392 detects the greatest arrangement correlation value and the second greatest arrangement correlation value from among the arrangement correlation values sequentially input from the arrangement correlation calculation unit 213. Further, the reliability degree detection unit 392 divides the greatest arrangement correlation value by the second greatest arrangement correlation value and outputs a value obtained as a result of the division (greatest arrangement correlation value÷second greatest arrangement correlation value) to the judgment unit 393 as the reliability degree of the first candidate of the wide band carrier frequency error amount.

The maximum value detection unit 331U and the reliability degree detection unit 332U each perform the corresponding processing described above to respectively detect the second candidate of the wide band carrier frequency error amount and the reliability degree of the second candidate. Further, the maximum value detection unit 331U and the reliability degree detection unit 332U respectively output the second candidate of the wide band carrier frequency error amount and the reliability degree of the second candidate to the selection unit 394 and the judgment unit 393.

The maximum value detection unit 331G and the reliability degree detection unit 332G each perform the corresponding processing described above to respectively detect the third candidate of the wide band carrier frequency error amount and the reliability degree of the third candidate. Further, the maximum value detection unit 331G and the reliability degree detection unit 332G respectively output the third candidate of the wide band carrier frequency error amount and the reliability degree of the third candidate to the selection unit 394 and the judgment unit 393.

The judgment unit 393 compares the reliability degrees of the first, second, and third candidates of the wide band carrier frequency error amount respectively input from the reliability degree detection units 392, 332U, and 332G. The judgment unit 393 detects the candidate of the wide band carrier frequency error amount having the highest reliability degree (having the greatest reliability degree value) among the first, second, and third candidates of the wide band carrier frequency error amount. The judgment unit 393 notifies the selection unit 394 of the candidate of the wide band carrier frequency error amount having the highest reliability degree.

According to the notification made by the judgment unit 393, the selection unit 394 selects the candidate having the highest reliability degree from among the first, second, and third candidates of the wide band carrier frequency error amount respectively input from the maximum value detection units 391, 331U, and 331G. Further, the selection unit 394 outputs the selected candidate of the wide band carrier frequency error amount to the fc correction unit 102 illustrated in FIG. 3 and the correction unit 180 illustrated in FIG. 15 as the wide band carrier frequency error amount to be used in the correction of the wide band carrier frequency shift of the P1 symbol.

Note that the power calculation unit 211U, the power calculation unit 211G, the multiplication unit 212, the arrangement correlation calculation unit 213, the maximum value detection unit 391, and the reliability degree detection unit 392 are blocks that detect the first candidate of the wide band carrier frequency error amount by using both the signal output from the orthogonal transformation unit 153U and the signal output from the orthogonal transformation unit 153G, and that perform the first detection processing of detecting the reliability degree of the first candidate.

On the other hand, the power calculation unit 211U, the arrangement correlation calculation unit 311U, the maximum value detection unit 331U, and the reliability degree detection unit 332U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and that perform the second detection processing of detecting the reliability degree of the second candidate.

Further, the power calculation unit 211G, the arrangement correlation calculation unit 311G, the maximum value detection unit 331G, and the reliability degree detection unit 332G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and that perform the third detection processing of detecting the reliability degree of the third candidate.

According to the present embodiment, the estimation of the wide band carrier frequency error amount can be performed with a high degree of accurately even in an environment where impulse noises locally exist in the preceding guard interval duration, the succeeding guard interval duration, or the useful symbol duration, as well as in an environment with multi-path interference and/or an environment with noise.

Further, the OFDM reception device pertaining to the present embodiment may be additionally provided with (i) a square calculation unit which performs a square calculation on the signals output from the power calculation unit 211U and outputs the results of the square calculation to the arrangement correlation calculation unit 311U and (ii) a square calculation unit which performs a square calculation on the signals output from the power calculation unit 211G and outputs the results of the square calculation to the arrangement correlation calculation unit 311G.

Embodiment 6

In the following, explanation is provided of embodiment 6 of the present invention with reference to the accompanying drawings. Note that in the present embodiment, constituent elements that are substantially the same as the constituent elements of embodiments 1 through 5 are indicated with the same reference signs, and description thereof is omitted, since the same description as in embodiments 1 through 5 applies.

The OFDM reception device pertaining to embodiment 6 differs from the OFDM reception devices, explanation of which has been provided in embodiments 1 through 5, in that the OFDM reception device pertaining to embodiment 6 includes a P1 wide band fc error detection/correction unit 400 that differs from the P1 wide band fc error detection/correction unit 155 and the like. In specific, the P1 wide band fc error detection/correction unit 400 differs from the P1 wide band fc error detection/correction unit 155 and the like in terms of the mechanism for detecting the wide band carrier frequency error amount.

Figure 17:
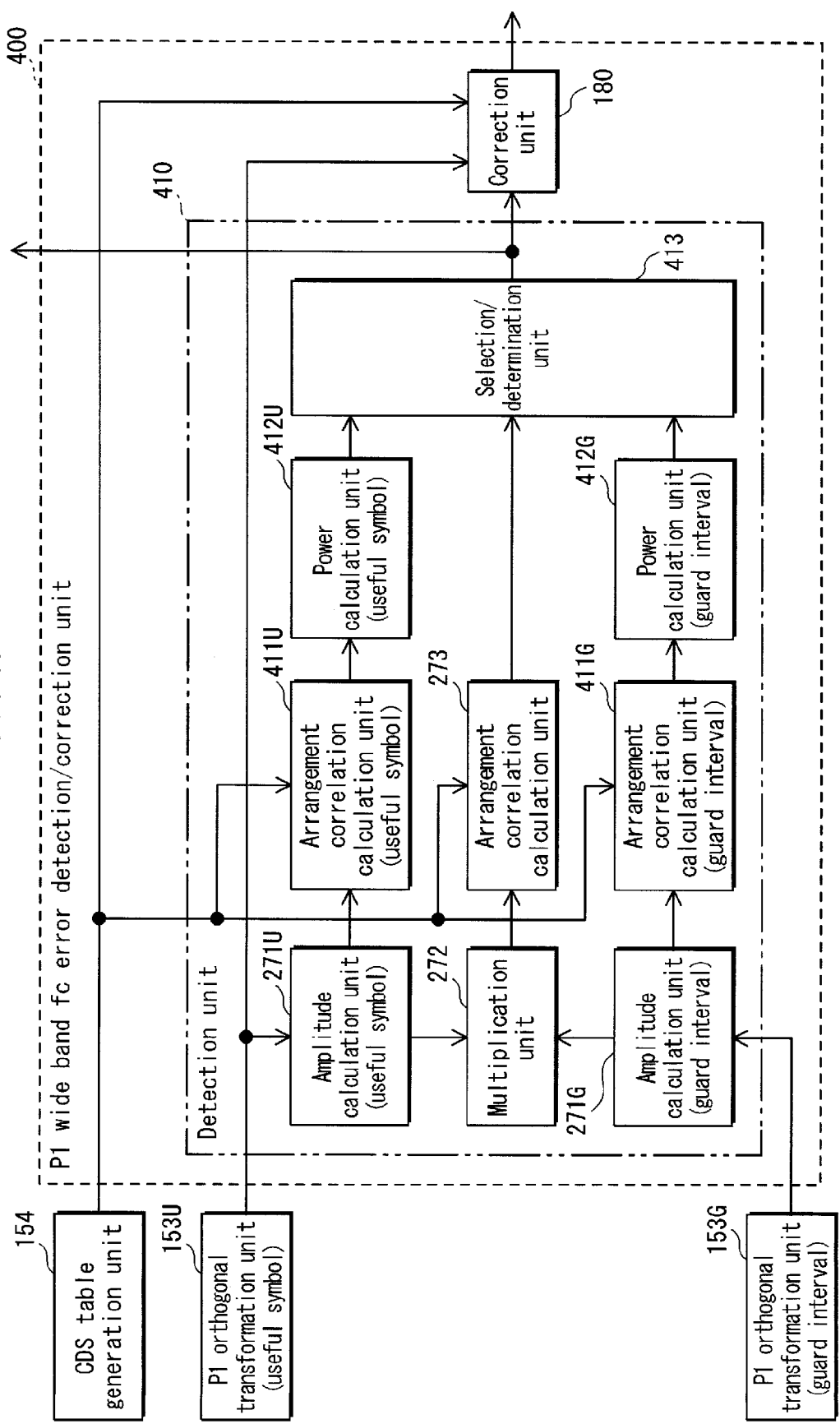
FIG. 17 illustrates a structure of a P1 wide band error detection/correction unit 400 pertaining to embodiment 6.

In the following, explanation is provided of the P1 wide band fc error detection/correction unit 400 pertaining to embodiment 6 with reference to FIG. 17. FIG. 17 illustrates a structure of the P1 wide band fc error detection/correction unit 400. Note that, in order as to clarify input to each of the units of the P1 wide band fc error detection/correction unit 400, the P1 orthogonal transformation unit 153U, the P1 orthogonal transformation unit 153G, and the CDS table generation unit 154 are also illustrated in FIG. 17.

The P1 wide band fc error detection/correction unit 400 includes a detection unit 410 and the correction unit 180.

The detection unit 410 detects, for the P1 symbol, a carrier frequency error amount having a frequency domain size in units of a subcarrier spacing of the P1 symbol (a wide band carrier frequency error amount). The detection unit 410 includes: the amplitude calculation unit 271U; the amplitude calculation unit 271G; the multiplication unit 272; the arrangement correlation calculation unit (summation processing unit) 273; an arrangement correlation calculation unit (summation processing unit) 411U; a power calculation unit 412U; an arrangement correlation calculation unit (summation processing unit) 411G; a power calculation unit 412G; and a selection/determination unit 413.

Figure 18:
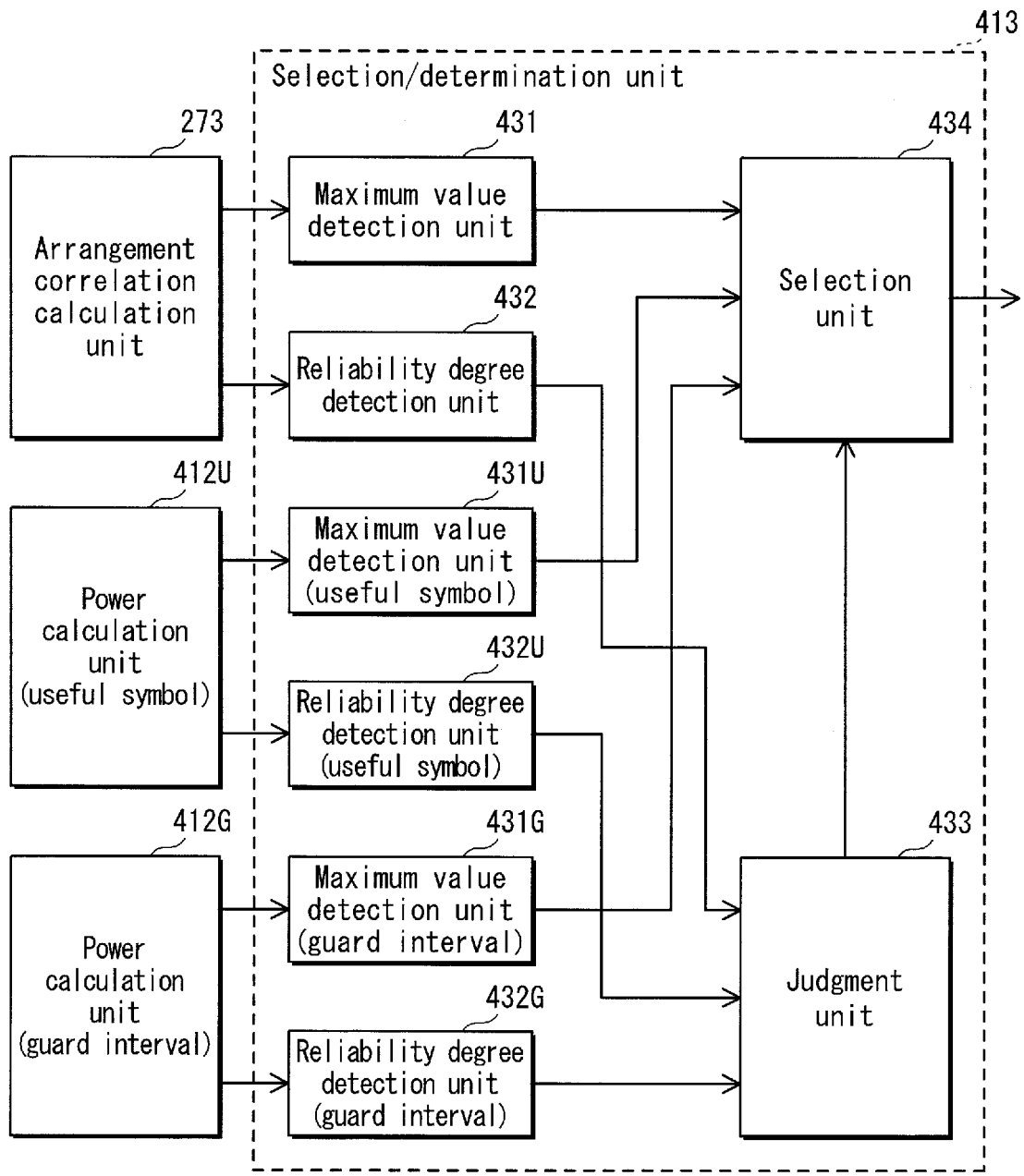
FIG. 18 illustrates a structure of a selection/determination unit 413 illustrated in FIG. 17.

The amplitude calculation unit 271U, the amplitude calculation unit 211G, the multiplication unit 272, and the arrangement correlation calculation unit 273 each perform the corresponding processing described above, and the signals (arrangement correlation values) output from the arrangement correlation calculation unit 273 are supplied to the selection/determination unit 413 (more specifically, to a maximum value detection unit 431 and a reliability degree detection unit 432 illustrated in FIG. 18, explanation of which is provided in the following).

The amplitude calculation unit 271U performs the corresponding processing described above, and the signals output from the amplitude calculation unit 271U are supplied to the arrangement correlation calculation unit 411U.

The arrangement correlation calculation unit 411U receives the signal $|Y_U|$ output from the amplitude calculation unit 271U as input, as well as the active carrier arrangement sequence from the CDS table generation unit 154. The arrangement correlation calculation unit 411U performs summation processing of summing values of subcarriers, among continuous subcarriers of the signal output from the amplitude calculation unit 271U, corresponding to subcarriers with a value of "1" in the active carrier arrangement sequence. The summation processing is performed while sequentially shifting the continuous subcarriers of the signal output from the amplitude calculation unit 271U one subcarrier at a time in the subcarrier direction within a predetermined range for every iteration (i.e. the arrangement correlation calculation unit 411U calculates arrangement correlations between the signal output from the amplitude calculation unit 271U and the active carrier arrangement sequence while sequentially shifting the signal output from the amplitude calculation unit 271U one subcarrier at a time in the subcarrier direction within the predetermined range). The arrangement correlation calculation unit 411U sequentially outputs summed values (arrangement correlation values) yielded as results of iterations of the summation processing to the power calculation unit 412U.

The power calculation unit 412U calculates arrangement correlation power values by using the arrangement correlation values sequentially input from the arrangement correlation calculation unit 411U. The power calculation unit 412U outputs the arrangement correlation power values so calculated to the selection/determination unit 413 (more specifically, to a maximum value detection unit 431U and a reliability degree detection unit 432U illustrated in FIG. 18, explanation of which is provided in the following).

The amplitude calculation unit 271U performs the corresponding processing described above, and the signals output from the amplitude calculation unit 271U are supplied to the arrangement correlation calculation unit 411G.

The arrangement correlation calculation unit 411G receives the signal $|Y_G|$ output from the amplitude calculation unit 271G as input, as well as the active carrier arrangement sequence from the CDS table generation unit 154. The arrangement correlation calculation unit 411G performs summation processing of summing values of subcarriers, among continuous subcarriers of the signal output from the amplitude calculation unit 271G, corresponding to subcarriers with a value of "1" in the active carrier arrangement sequence. The summation processing is performed while sequentially shifting the continuous subcarriers of the signal output from the amplitude calculation unit 271G one subcarrier at a time in the subcarrier direction within a predetermined range for every iteration (i.e. the arrangement correlation calculation unit 411G calculates arrangement correlations between the signal output from the amplitude calculation unit 271G and the active carrier arrangement sequence while sequentially shifting the signal output from the amplitude calculation unit 271G one subcarrier at a time in the subcarrier direction within the predetermined range). Further, the arrangement correlation calculation unit 411G sequentially outputs summed values (arrangement correlation values) yielded as results of iterations of the summation processing to the power calculation unit 412G.

The power calculation unit 412G calculates arrangement correlation power values by using the arrangement correlation values sequentially input from the arrangement correlation calculation unit 411G. The power calculation unit 412G outputs the arrangement correlation power values so calculated to the selection/determination unit 413 (more specifically, to a maximum value detection unit 431G and a reliability degree detection unit 432G illustrated in FIG. 18, explanation of which is provided in the following).

The selection/determination unit 413, as described in the following with reference to FIG. 18, detects, for the P1 symbol, a carrier frequency error amount having a frequency domain size in units of a subcarrier spacing of the P1 symbol (a wide band carrier frequency error amount) by using the signals output from the arrangement correlation calculation unit 273, the signals output from the power calculation unit 412U, and the signals output from the power calculation unit 412G. The selection/determination unit 413 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 413 and extracts active carriers.

In the following, explanation is provided of the selection/determination unit 413 illustrated in FIG. 17 with reference to FIG. 18. FIG. 18 illustrates a structure of the selection/determination unit 413 illustrated in FIG. 17. Note that, in order as to clarify input to each of the units of the selection/determination unit 413, the arrangement correlation calculation unit 273, the arrangement correlation calculation unit 412U, and the arrangement correlation calculation unit 412G are also illustrated in FIG. 18.

The selection/determination unit 413 includes: the maximum value detection unit 431; the reliability degree detection unit 432; the maximum value detection unit 431U; the reliability degree detection unit 432U; the maximum value detection unit 431G; the reliability degree detection unit 432G; a judgment unit 433; and a selection unit 434.

The maximum value detection unit 431 detects the greatest arrangement correlation value from among the arrangement correlation values sequentially input from the arrangement correlation calculation unit 273. Further, the maximum value detection unit 431 outputs a shift amount which yields the greatest arrangement correlation value to the selection unit 434 as a candidate of the frequency error amount having a frequency domain size in units of a subcarrier spacing of the P1 symbol (the first candidate of the wide band carrier frequency error amount).

The reliability degree detection unit 432 detects the greatest arrangement correlation value and the second greatest arrangement correlation value from among the arrangement correlation values sequentially input from the arrangement correlation calculation unit 273. Further, the reliability degree detection unit 432 divides the greatest arrangement correlation value by the second greatest arrangement correlation value and outputs a value obtained as a result of the division (greatest arrangement correlation value÷second greatest arrangement correlation value) to the judgment unit 433 as the reliability degree of the first candidate of the wide band carrier frequency error amount.

The maximum value detection unit 431U detects the greatest arrangement correlation power value from among the arrangement correlation power values sequentially input from the power calculation unit 412U. Further, the maximum value detection unit 431U outputs a shift amount which yields the greatest arrangement correlation power value to the selection unit 434 as a candidate of the frequency error amount having a frequency domain size in units of a subcarrier spacing of the P1 symbol (the second candidate of the wide band carrier frequency error amount).

The reliability degree detection unit 432U detects the greatest arrangement correlation power value and the second greatest arrangement correlation power value from among the arrangement correlation power values sequentially input from the power calculation unit 412U. Further, the reliability degree detection unit 432U divides the greatest arrangement correlation power value by the second greatest arrangement correlation power value and outputs a value obtained as a result of the division (greatest arrangement correlation power value÷second greatest arrangement correlation power value) to the judgment unit 433 as the reliability degree of the second candidate of the wide band carrier frequency error amount.

The maximum value detection unit 431G detects the greatest arrangement correlation power value from among the arrangement correlation power values sequentially input from the arrangement correlation calculation unit power calculation unit 412G. Further, the maximum value detection unit 431G outputs a shift amount that is larger, by a frequency corresponding to one subcarrier, than the shift amount which yields the greatest arrangement correlation power value to the selection unit 334 as a candidate of the frequency error amount having a frequency domain size in units of a subcarrier spacing of the P1 symbol (the third candidate of the wide band carrier frequency error amount). The shift amount larger, by a frequency corresponding to one subcarrier, than the shift amount which yields the greatest arrangement correlation power value is determined as the third candidate of the wide band carrier frequency error amount since the signal whose wide band carrier frequency shift has been corrected by the correction unit 180 is a signal for the useful symbol duration, and the signal for the guard interval duration is yielded by frequency shifting the signal for the useful symbol duration in the high frequency direction by a frequency corresponding to one subcarrier. Note that for instance, when the signal for the guard interval duration input to the orthogonal transformation unit 153G or the signal for the guard interval duration output from the orthogonal transformation unit 153G is frequency shifted by a frequency $-f_{SH}$ (when frequency shifting is performed in the low frequency direction by a frequency corresponding to one subcarrier), the maximum value detection unit 431G outputs a shift amount yielding the greatest arrangement correlation power value to the selection unit 434 as the third candidate of the wide band carrier frequency error amount.

The reliability degree detection unit 432G detects the greatest arrangement correlation power value and the second greatest arrangement correlation power value from among the arrangement correlation power values sequentially input from the power calculation unit 412G. Further, the reliability degree detection unit 432G divides the greatest arrangement correlation power value by the second greatest arrangement correlation power value and outputs a value obtained as a result of the division (greatest arrangement correlation power value÷second greatest arrangement correlation power value) to the judgment unit 433 as the reliability degree of the third candidate of the wide band carrier frequency error amount.

The judgment unit 433 compares the reliability degrees of the first, second, and third candidates of the wide band carrier frequency error amount respectively input from the reliability degree detection units 432, 432U, and 432G. The judgment unit 433 detects the candidate of the wide band carrier frequency error amount having the highest reliability degree (having the greatest reliability degree value) among the first, second, and third candidates of the wide band carrier frequency error amount. The judgment unit 433 notifies the selection unit 434 of the candidate of the wide band carrier frequency error amount having the highest reliability degree.

According to the notification made by the judgment unit 433, the selection unit 434 selects the candidate having the highest reliability degree from among the first, second, and third candidates of the wide band carrier frequency error amount respectively input from the maximum value detection units 431, 431U, and 431G. Further, the selection unit 434 outputs the selected candidate of the wide band carrier frequency error amount to the fc correction unit 102 illustrated in FIG. 3 and the correction unit 180 illustrated in FIG. 17 as the wide band carrier frequency error amount to be used in the correction of the wide band carrier frequency shift of the P1 symbol.

Note that the amplitude calculation unit 271U, the amplitude calculation unit 271G, the multiplication unit 272, the arrangement correlation calculation unit 273, the maximum value detection unit 431, and the reliability degree detection unit 432 are blocks that detect the first candidate of the wide band carrier frequency error amount by using both the signal output from the orthogonal transformation unit 153U and the signal output from the orthogonal transformation unit 153G, and perform the first detection processing of detecting the reliability degree of the first candidate.

On the other hand, the amplitude calculation unit 271U, the arrangement correlation calculation unit 411U, the power calculation unit 412U, the maximum value detection unit 431U, and the reliability degree detection unit 432U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and perform the second detection processing of detecting the reliability degree of the second candidate.

Further, the amplitude calculation unit 271G, the arrangement correlation calculation unit 411G, the power calculation unit 412G, the maximum value detection unit 431G, and the reliability degree detection unit 432G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and perform the third detection processing of detecting the reliability degree of the third candidate.

According to the present embodiment, the risk of incorrect estimation of the wide band carrier frequency error amount is reduced, and reception performance of the OFDM reception device is improved even in an environment where impulse noises locally exist in the preceding guard interval duration, the succeeding guard interval duration, or the useful symbol duration, as well as in an environment with multi-path interference and/or an environment with noise.

Embodiment 7

In the following, explanation is provided of embodiment 7 of the present invention with reference to the accompanying drawings. Note that in the present embodiment, constituent elements that are substantially the same as the constituent elements of embodiments 1 through 6 are indicated with the same reference signs, and description thereof is omitted, since the same description as in embodiments 1 through 6 applies.

The OFDM reception device pertaining to embodiment 7 differs from the OFDM reception devices, explanation of which has been provided in embodiments 1 through 6, in that the OFDM reception device pertaining to embodiment 7 includes a P1 wide band fc error detection/correction unit 450 that differs from the P1 wide band fc error detection/correction unit 155 and the like. In specific, the P1 wide band fc error detection/correction unit 450 differs from the P1 wide band fc error detection/correction unit 155 and the like in terms of the mechanism for detecting the wide band carrier frequency error amount.

Figure 19:
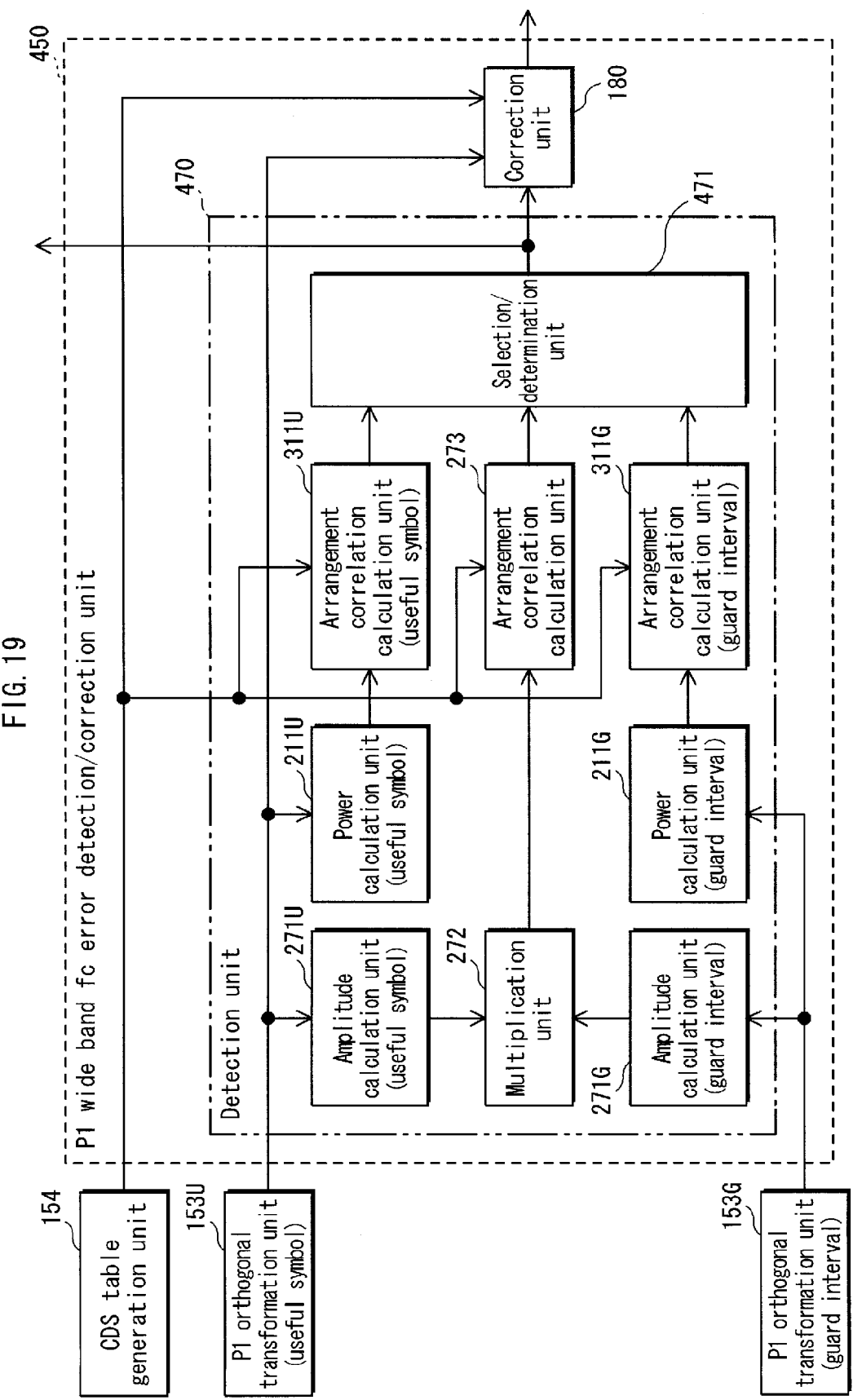
FIG. 19 illustrates a structure of a P1 wide band error detection/correction unit 450 pertaining to embodiment 7.

In the following, explanation is provided of the P1 wide band fc error detection/correction unit 450 pertaining to embodiment 7 with reference to FIG. 19. FIG. 19 illustrates a structure of the P1 wide band fc error detection/correction unit 450. Note that, in order as to clarify input to each of the units of the P1 wide band fc error detection/correction unit 450, the P1 orthogonal transformation unit 153U, the P1 orthogonal transformation unit 153G, and the CDS table generation unit 154 are also illustrated in FIG. 19.

The P1 wide band fc error detection/correction unit 450 includes a detection unit 470 and the correction unit 180.

The detection unit 470 detects, for the P1 symbol, a carrier frequency error amount having a frequency domain size in units of a subcarrier spacing of the P1 symbol (a wide band carrier frequency error amount). The detection unit 470 includes: the amplitude calculation unit 271U; the amplitude calculation unit 271G; the multiplication unit 272; the arrangement correlation calculation unit (summation processing unit) 273; the power calculation unit 211U; the arrangement correlation calculation unit (summation processing unit) 311U; the power calculation unit 211G; the arrangement correlation calculation unit (summation processing unit) 311G; and a selection/determination unit 471.

Figure 20:
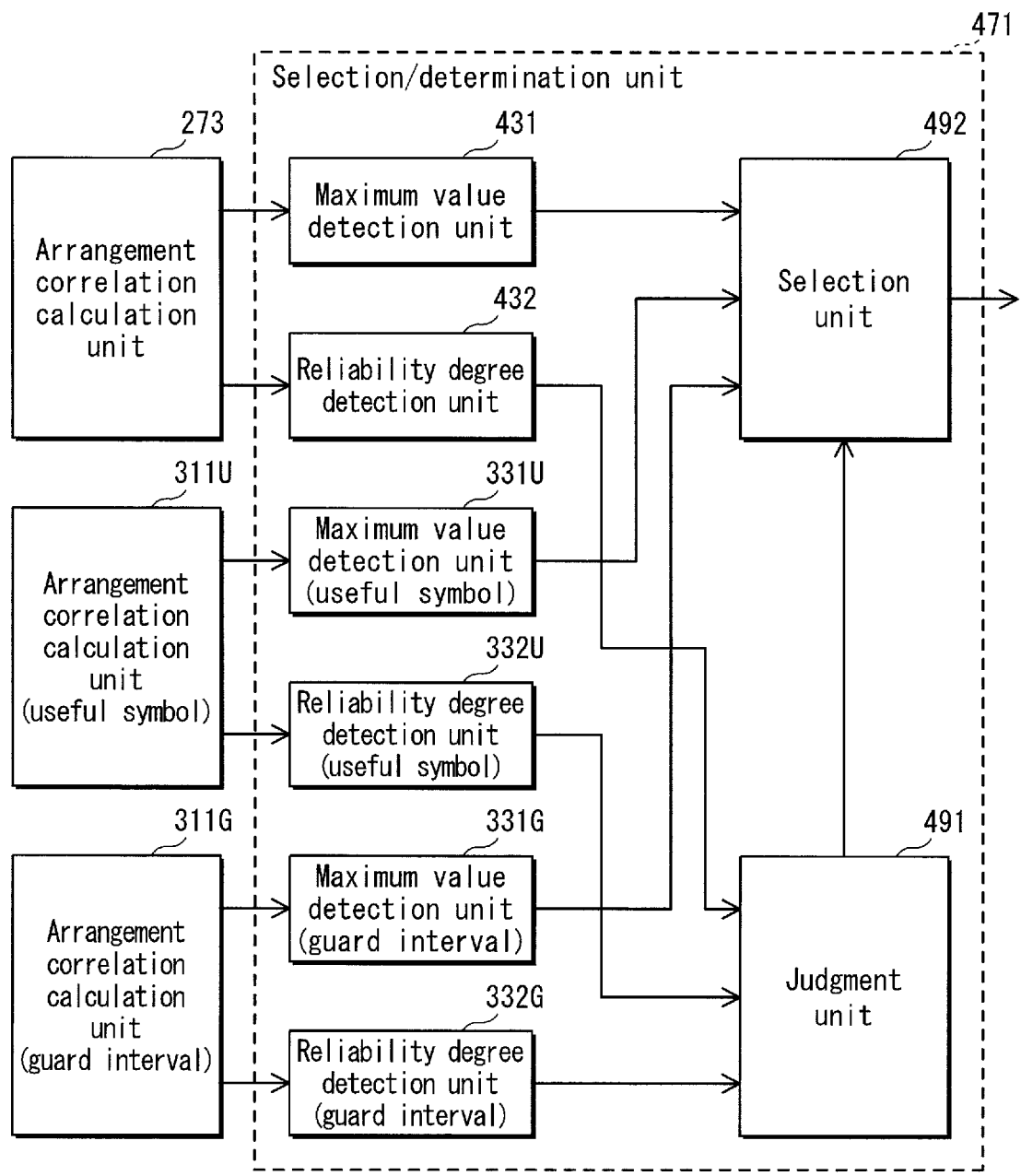
FIG. 20 illustrates a structure of a selection/determination unit 471 illustrated in FIG. 19.

The amplitude calculation unit 271U, the amplitude calculation unit 271G, the multiplication unit 272, and the arrangement correlation calculation unit 273 each perform the corresponding processing described above, and the signals (arrangement correlation values) output from the arrangement correlation calculation unit 273 are supplied to the selection/determination unit 471 (more specifically, to the maximum value detection unit 431 and the reliability degree detection unit 432 illustrated in FIG. 20, explanation of which is provided in the following).

The power calculation unit 211G and the arrangement correlation calculation unit 311U each perform the corresponding processing described above, and the signals (arrangement correlation values) output from the arrangement correlation calculation unit 311U are supplied to the selection/determination unit 471 (more specifically, to the maximum value detection unit 331U and the reliability degree detection unit 332U illustrated in FIG. 20, explanation of which is provided in the following).

The power calculation unit 211G and the arrangement correlation calculation unit 311G each perform the corresponding processing described above, and the signals (arrangement correlation values) output from the arrangement correlation calculation unit 311G are supplied to the selection/determination unit 471 (more specifically, to the maximum value detection unit 331G and the reliability degree detection unit 332G illustrated in FIG. 20, explanation of which is provided in the following).

The selection/determination unit 471, as described in the following with reference to FIG. 20, detects, for the P1 symbol, a carrier frequency error amount having a frequency domain size in units of a subcarrier spacing of the P1 symbol (a wide band carrier frequency error amount) by using the signals output from the arrangement correlation calculation unit 273, the signals output from the arrangement correlation calculation unit 311U, and the signals output from the arrangement correlation calculation unit 311G. The selection/determination unit 471 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 471 and extracts active carriers.

In the following, explanation is provided of the selection/determination unit 471 illustrated in FIG. 19 with reference to FIG. 20. FIG. 20 illustrates a structure of the selection/determination unit 471 illustrated in FIG. 19. Note that, in order as to clarify input to each of the units of the selection/determination unit 471, the arrangement correlation calculation unit 273, the arrangement correlation calculation unit 311U, and the arrangement correlation calculation unit 311G are also illustrated in FIG. 20.

The selection/determination unit 471 includes: the maximum value detection unit 431; the reliability degree detection unit 432; the maximum value detection unit 331U; the reliability degree detection unit 332U; the maximum value detection unit 331G; the reliability degree detection unit 332G; a judgment unit 491; and a selection unit 492.

The maximum value detection unit 431 and the reliability degree detection unit 432 each perform the corresponding processing described above to respectively detect the first candidate of the wide band carrier frequency error amount and the reliability degree of the first candidate. Further, the maximum value detection unit 431 and the reliability degree detection unit 432 respectively output the first candidate of the wide band carrier frequency error amount and the reliability degree of the first candidate to the selection unit 492 and the judgment unit 491.

The maximum value detection unit 331U and the reliability degree detection unit 332U each perform the corresponding processing described above to respectively detect the second candidate of the wide band carrier frequency error amount and the reliability degree of the second candidate. Further, the maximum value detection unit 331U and the reliability degree detection unit 332U respectively output the second candidate of the wide band carrier frequency error amount and the reliability degree of the second candidate to the selection unit 492 and the judgment unit 491.

The maximum value detection unit 331G and the reliability degree detection unit 332G each perform the corresponding processing described above to respectively detect the third candidate of the wide band carrier frequency error amount and the reliability degree of the third candidate. Further, the maximum value detection unit 331G and the reliability degree detection unit 332G respectively output the third candidate of the wide band carrier frequency error amount and the reliability degree of the third candidate to the selection unit 492 and the judgment unit 491.

The judgment unit 491 compares the reliability degrees of the first, second, and third candidates of the wide band carrier frequency error amount respectively input from the reliability degree detection units 432, 332U, and 332G and detects the candidate of the wide band carrier frequency error amount having the highest reliability degree (having the greatest reliability degree value) among the first, second, and third candidates of the wide band carrier frequency error amount. Further, the judgment unit 491 notifies the selection unit 492 of the candidate of the wide band carrier frequency error amount having the highest reliability degree.

According to the notification made by the judgment unit 491, the selection unit 492 selects the candidate having the highest reliability degree from among the first, second, and third candidates of the wide band carrier frequency error amount respectively input from the maximum value detection units 431, 331U, and 331G. Further, the selection unit 492 outputs the selected candidate of the wide band carrier frequency error amount to the fc correction unit 102 illustrated in FIG. 3 and the correction unit 180 illustrated in FIG. 19 as the wide band carrier frequency error amount to be used in the correction of the wide band carrier frequency shift of the P1 symbol.

Note that the amplitude calculation unit 271U, the amplitude calculation unit 271G, the multiplication unit 272, the arrangement correlation calculation unit 273, the maximum value detection unit 431, and the reliability degree detection unit 432 are blocks that detect the first candidate of the wide band carrier frequency error amount by using both the signal output from the orthogonal transformation unit 153U and the signal output from the orthogonal transformation unit 153G and perform the first detection processing of detecting the reliability degree of the first candidate.

On the other hand, the power calculation unit 211U, the arrangement correlation calculation unit 311U, the maximum value detection unit 331U, and the reliability degree detection unit 332U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and perform the second detection processing of detecting the reliability degree of the second candidate.

Further, the power calculation unit 211G, the arrangement correlation calculation unit 311G, the maximum value detection unit 331G, and the reliability degree detection unit 332G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and perform the third detection processing of detecting the reliability degree of the third candidate.

According to the present embodiment, the estimation of the wide band carrier frequency error amount can be performed with a high degree of accurately even in an environment where impulse noises locally exist in the preceding guard interval duration, the succeeding guard interval duration, or the useful symbol duration, as well as in an environment with multi-path interference and/or an environment with noise.

Embodiment 8

In the following, explanation is provided of embodiment 8 of the present invention with reference to the accompanying drawings. Note that in the present embodiment, constituent elements that are substantially the same as the constituent elements of embodiments 1 through 7 are indicated with the same reference signs, and description thereof is omitted, since the same description as in embodiments 1 through 7 applies.

The OFDM reception device pertaining to embodiment 8 differs from the OFDM reception devices, explanation of which has been provided in embodiments 1 through 7, in that the OFDM reception device pertaining to embodiment 8 includes a P1 wide band fc error detection/correction unit 500 that differs from the P1 wide band fc error detection/correction unit 155 and the like. In specific, the P1 wide band fc error detection/correction unit 500 differs from the P1 wide band fc error detection/correction unit 155 and the like in terms of the mechanism for detecting the wide band carrier frequency error amount.

Figure 21:
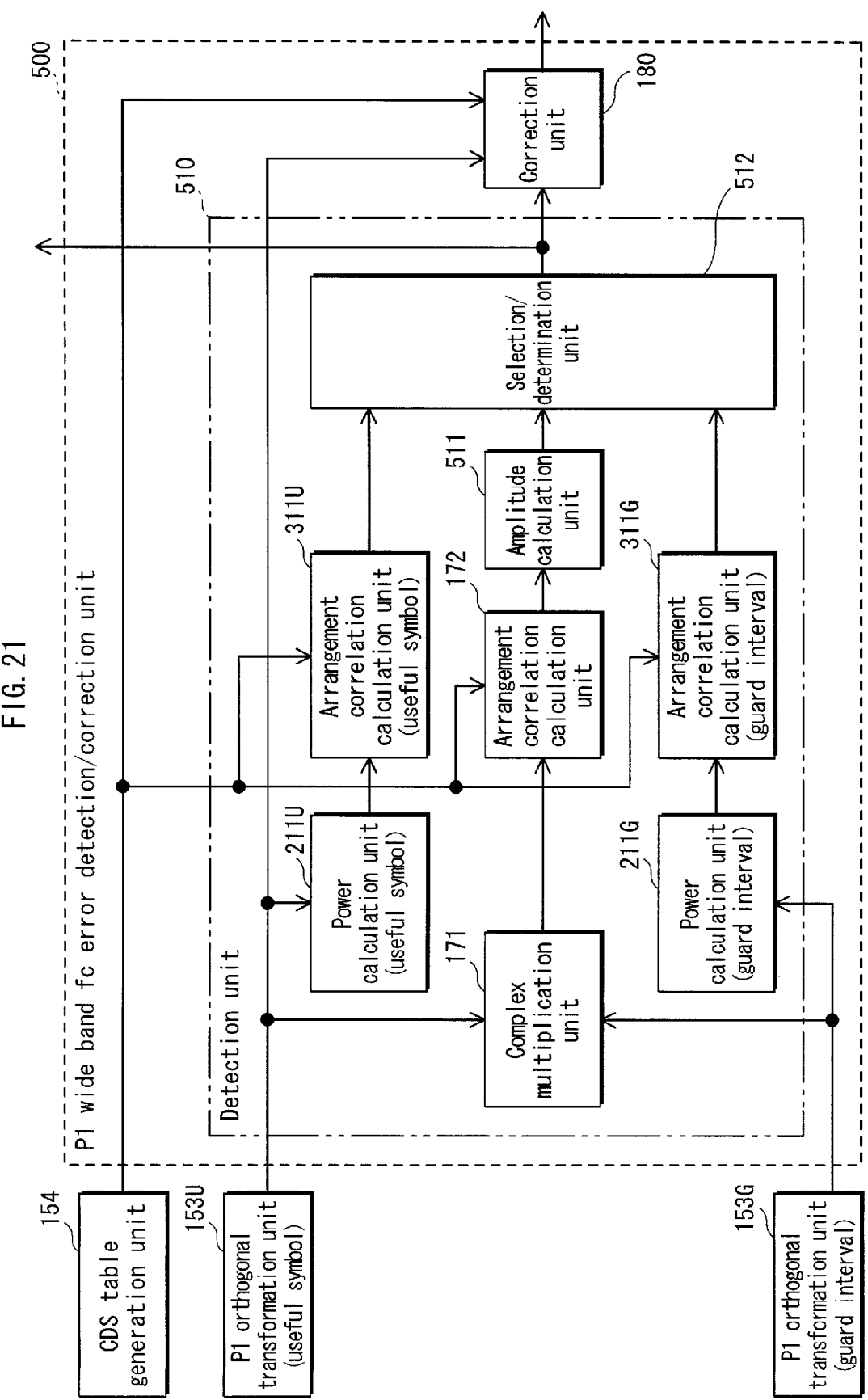
FIG. 21 illustrates a structure of a P1 wide band error detection/correction unit 500 pertaining to embodiment 8.

In the following, explanation is provided of the P1 wide band fc error detection/correction unit 500 pertaining to embodiment 8 with reference to FIG. 21. FIG. 21 illustrates a structure of the P1 wide band fc error detection/correction unit 500. Note that, in order as to clarify input to each of the units of the P1 wide band fc error detection/correction unit 500, the P1 orthogonal transformation unit 153U, the P1 orthogonal transformation unit 153G, and the CDS table generation unit 154 are also illustrated in FIG. 21.

The P1 wide band fc error detection/correction unit 500 includes a detection unit 510 and the correction unit 180.

In specific, the detection unit 510 detects, for the P1 symbol, a carrier frequency error amount having a frequency domain size in units of a subcarrier spacing of the P1 symbol (a wide band carrier frequency error amount). The detection unit 510 includes: the complex multiplication unit 171; the arrangement correlation calculation unit (summation processing unit) 172; an amplitude calculation unit 511; the power calculation unit 211U; the arrangement correlation calculation unit (summation processing unit) 311U; the power calculation unit 211G; the arrangement correlation calculation unit (summation processing unit) 311G; and a selection/detection unit 512.

The complex multiplication unit 171 and the arrangement correlation calculation unit 172 each perform the corresponding processing described above, and the signals (arrangement correlation values) output from the arrangement correlation calculation unit 172 are supplied to the amplitude calculation unit 511. The amplitude calculation unit 511 calculates amplitude values of the arrangement correlation values sequentially input from the arrangement correlation calculation unit 172. The amplitude calculation unit 511 outputs the arrangement correlation amplitude values so calculated to the selection/determination unit 512 (more specifically, to a maximum value detection unit 531 and a reliability degree detection unit 532 illustrated in FIG. 22, explanation of which is provided in the following).

Figure 22:
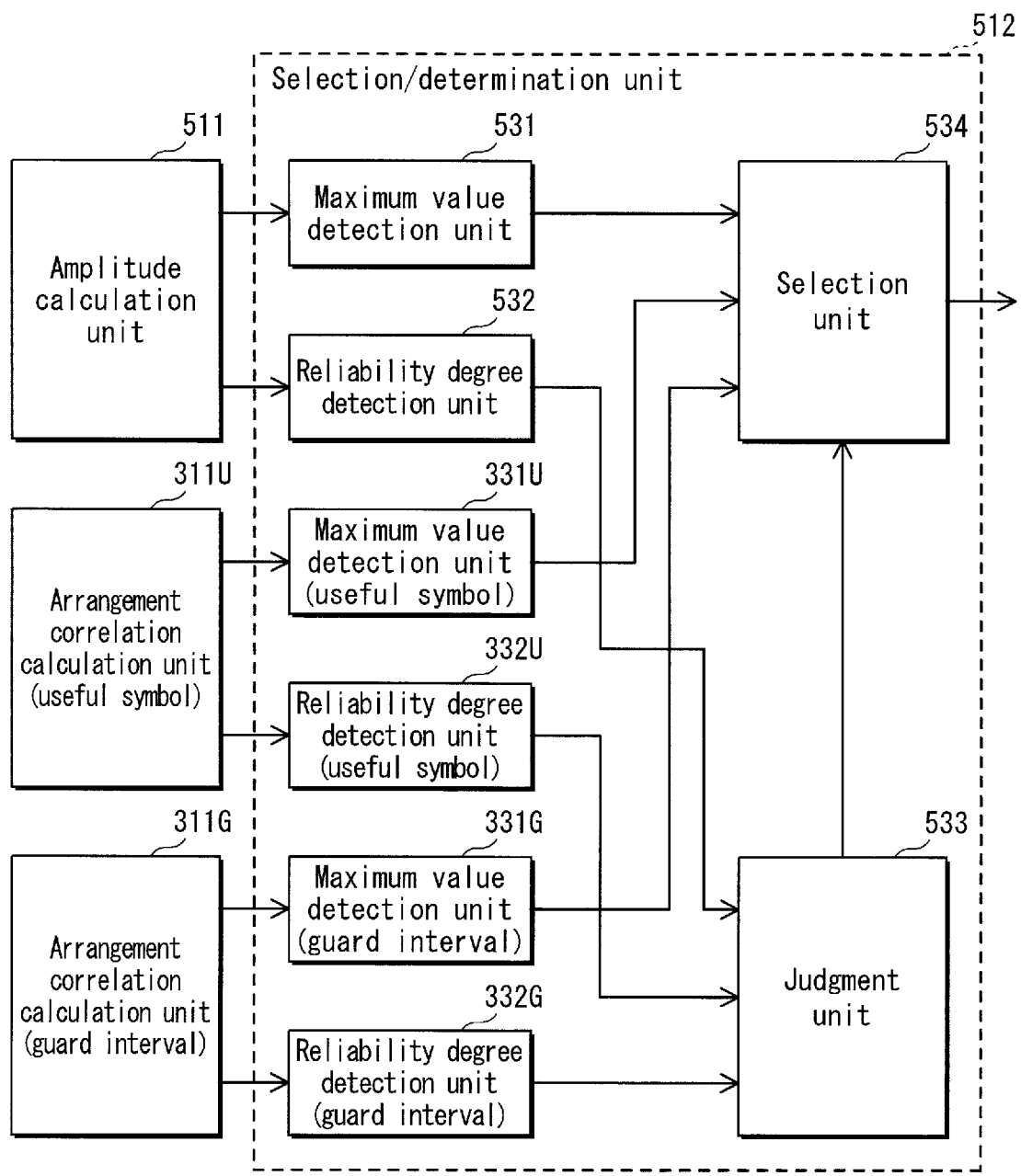
FIG. 22 illustrates a structure of a selection/determination unit 512 illustrated in FIG. 21.

The power calculation unit 211U and the arrangement correlation calculation unit 311U each perform the corresponding processing described above, and the signals (arrangement correlation values) output from the arrangement correlation calculation unit 311U are supplied to the selection/determination unit 512 (more specifically, to the maximum value detection unit 331U and the reliability degree detection unit 332U illustrated in FIG. 22, explanation of which is provided in the following).

The power calculation unit 211G and the arrangement correlation calculation unit 311G each perform the corresponding processing described above, and the signals (arrangement correlation values) output from the arrangement correlation calculation unit 311G are supplied to the selection/determination unit 512 (more specifically, to the maximum value detection unit 331G and the reliability degree detection unit 332G illustrated in FIG. 22, explanation of which is provided in the following).

The selection/determination unit 512, as described in the following with reference to FIG. 22, detects, for the P1 symbol, a carrier frequency error amount having a frequency domain size in units of a subcarrier spacing of the P1 symbol (a wide band carrier frequency error amount) by using the signals output from the amplitude calculation unit 511, the signals output from the arrangement correlation calculation unit 311U, and the signals output from the arrangement correlation calculation unit 311G. The selection/determination unit 512 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 512 and extracts active carriers.

In the following, explanation is provided of the selection/determination unit 512 illustrated in FIG. 21 with reference to FIG. 22. FIG. 22 illustrates a structure of the selection/determination unit 512 illustrated in FIG. 21. Note that, in order as to clarify input to each of the units of the selection/determination unit 512, the amplitude calculation unit 511, the arrangement correlation calculation unit 311U, and the arrangement correlation calculation unit 311G are also illustrated in FIG. 22.

The selection/determination unit 512 includes: the maximum value detection unit 531; the reliability degree detection unit 532; the maximum value detection unit 331U; the reliability degree detection unit 332U; the maximum value detection unit 331G; the reliability degree detection unit 332G; a judgment unit 533; and a selection unit 534.

The maximum value detection unit 531 detects the greatest arrangement correlation amplitude value from among the arrangement correlation amplitude values sequentially input from the amplitude calculation unit 511. Further, the maximum value detection unit 531 outputs a shift amount which yields the greatest arrangement correlation amplitude value to the selection unit 534 as a candidate of the frequency error amount having a frequency domain size in units of a subcarrier spacing of the P1 symbol (the first candidate of the wide band carrier frequency error amount).

The reliability degree detection unit 532 detects the greatest arrangement correlation amplitude value and the second greatest arrangement correlation amplitude value from among the arrangement correlation amplitude values sequentially input from the amplitude calculation unit 511. Further, the reliability degree detection unit 532 divides the greatest arrangement correlation amplitude value by the second greatest arrangement correlation amplitude value and outputs a value obtained as a result of the division (greatest arrangement correlation amplitude value÷second greatest arrangement correlation amplitude value) to the judgment unit 533 as the reliability degree of the first candidate of the wide band carrier frequency error amount.

The maximum value detection unit 331U and the reliability degree detection unit 332U each perform the corresponding processing described above to respectively detect the second candidate of the wide band carrier frequency error amount and the reliability degree of the second candidate. Further, the maximum value detection unit 331U and the reliability degree detection unit 332U respectively output the second candidate of the wide band carrier frequency error amount and the reliability degree of the second candidate to the selection unit 534 and the judgment unit 533.

The maximum value detection unit 331G and the reliability degree detection unit 332G each perform the corresponding processing described above to respectively detect the third candidate of the wide band carrier frequency error amount and the reliability degree of the third candidate. Further, the maximum value detection unit 331G and the reliability degree detection unit 332G respectively output the third candidate of the wide band carrier frequency error amount and the reliability degree of the third candidate to the selection unit 534 and the judgment unit 533.

The judgment unit 533 compares the reliability degrees of the first, second, and third candidates of the wide band carrier frequency error amount respectively input from the reliability degree detection units 532, 332U, and 332G and detects the candidate of the wide band carrier frequency error amount having the highest reliability degree (having the greatest reliability degree value) among the first, second, and third candidates of the wide band carrier frequency error amount. Further, the judgment unit 533 notifies the selection unit 534 of the candidate of the wide band carrier frequency error amount having the highest reliability degree.

According to the notification made by the judgment unit 533, the selection unit 534 selects the candidate having the highest reliability degree from among the first, second, and third candidates of the wide band carrier frequency error amount respectively input from the maximum value detection units 531, 331U, and 331G. Further, the selection unit 534 outputs the selected candidate of the wide band carrier frequency error amount to the fc correction unit 102 illustrated in FIG. 3 and the correction unit 180 illustrated in FIG. 21 as the wide band carrier frequency error amount to be used in the correction of the wide band carrier frequency shift of the P1 symbol.

Note that the complex multiplication unit 171, the arrangement correlation calculation unit 172, the amplitude calculation unit 511, the maximum value detection unit 531, and the reliability degree detection unit 532 are blocks that detect the first candidate of the wide band carrier frequency error amount by using both the signal output from the orthogonal transformation unit 153U and the signal output from the orthogonal transformation unit 153G and perform a first detection processing of detecting the reliability degree of the first candidate.

On the other hand, the power calculation unit 211U, the arrangement correlation calculation unit 311U, the maximum value detection unit 331U, and the reliability degree detection unit 332U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and perform the second detection processing of detecting the reliability degree of the second candidate.

Further, the power calculation unit 211G, the arrangement correlation calculation unit 311G, the maximum value detection unit 331G, and the reliability degree detection unit 332G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and perform the third detection processing of detecting the reliability degree of the third candidate.

According to the present embodiment, the estimation of the wide band carrier frequency error amount can be performed with a high degree of accurately even in an environment where impulse noises locally exist in the preceding guard interval duration, the succeeding guard interval duration, or the useful symbol duration, as well as in an environment with multi-path interference and/or an environment with noise.

Embodiment 9

In the following, explanation is provided of embodiment 9 of the present invention with reference to the accompanying drawings. Note that in the present embodiment, constituent elements that are substantially the same as the constituent elements of embodiments 1 through 8 are indicated with the same reference signs, and description thereof is omitted, since the same description as in embodiments 1 through 8 applies.

The OFDM reception device pertaining to embodiment 9 differs from the OFDM reception devices, explanation of which has been provided in embodiments 1 through 8, in that the OFDM reception device pertaining to embodiment 9 includes a P1 wide band fc error detection/correction unit 550 that differs from the P1 wide band fc error detection/correction unit 155 and the like. In specific, the P1 wide band fc error detection/correction unit 550 differs from the P1 wide band fc error detection/correction unit 155 and the like in terms of the mechanism for detecting the wide band carrier frequency error amount.

Figure 23:
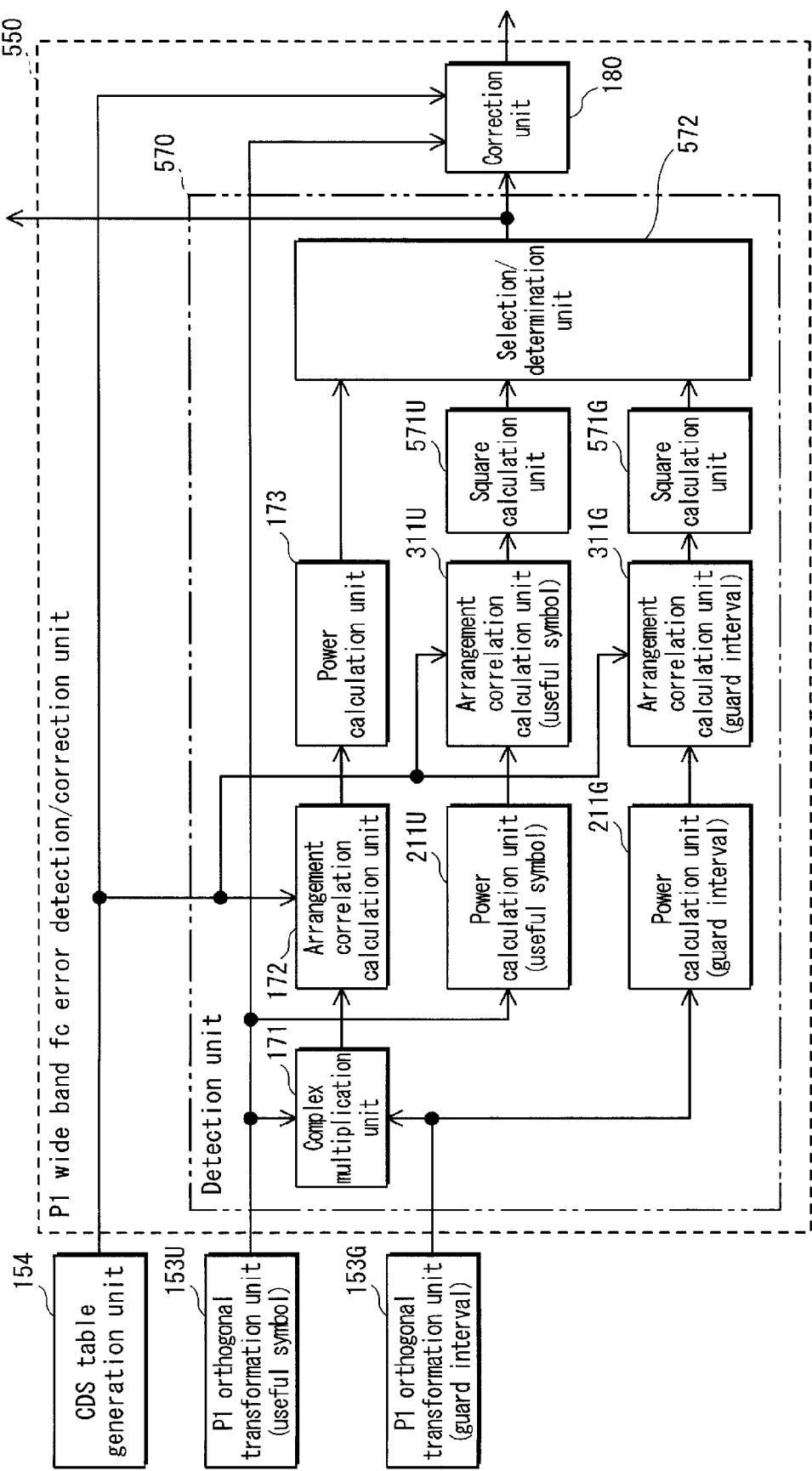
FIG. 23 illustrates a structure of a P1 wide band error detection/correction unit 550 pertaining to embodiment 9.

In the following, explanation is provided of the P1 wide band fc error detection/correction unit 550 pertaining to embodiment 9 with reference to FIG. 23. FIG. 23 illustrates a structure of the P1 wide band fc error detection/correction unit 550. Note that, in order as to clarify input to each of the units of the P1 wide band fc error detection/correction unit 550, the P1 orthogonal transformation unit 153U, the P1 orthogonal transformation unit 153G, and the CDS table generation unit 154 are also illustrated in FIG. 23.

The P1 wide band fc error detection/correction unit 550 includes a detection unit 570 and the correction unit 180.

In specific, the detection unit 570 detects, for the P1 symbol, a carrier frequency error amount having a frequency domain size in units of a subcarrier spacing of the P1 symbol (a wide band carrier frequency error amount). The detection unit 570 includes: the complex multiplication unit 171; the arrangement correlation calculation unit (summation processing unit) 172; the power calculation unit 173; the power calculation unit 211U; the arrangement correlation calculation unit (summation processing unit) 311U; a square calculation unit 571U; the power calculation unit 211G; the arrangement correlation calculation unit 311G; a square calculation unit 571G; and a selection/detection unit 572.

Figure 24:
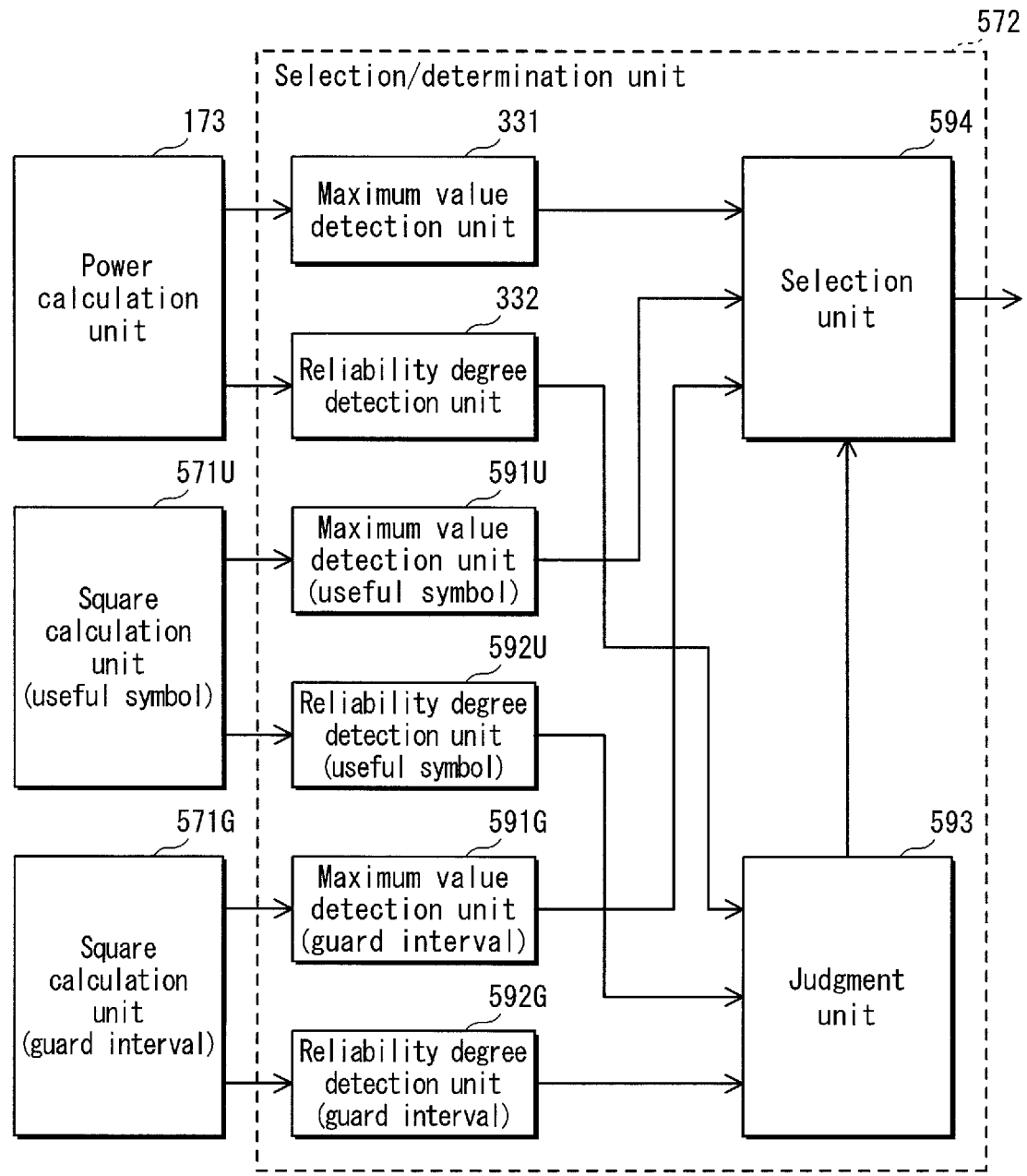
FIG. 24 illustrates a structure of a selection/determination unit 572 illustrated in FIG. 23.

The complex multiplication unit 171, the arrangement correlation calculation unit 172, and the power calculation unit 173 each perform the corresponding processing described above, and the signals (arrangement correlation power values) output from the power calculation unit 173 are supplied to the selection/determination unit 572 (more specifically, to the maximum value detection unit 331 and the reliability degree detection unit 332 illustrated in FIG. 24, explanation of which is provided in the following).

The power calculation unit 211U and the arrangement correlation calculation unit 311U each perform the corresponding processing described above, and the signals (arrangement correlation values) output from the arrangement correlation calculation unit 311U are supplied to the square calculation unit 571U. The square calculation unit 571U performs a square calculation on the arrangement correlation values sequentially input from the arrangement correlation calculation unit 311U and outputs the results of the square calculation to the selection/determination unit 572 (more specifically, to a maximum value detection unit 591U and a reliability degree detection unit 592U illustrated in FIG. 24, explanation of which is provided in the following).

The power calculation unit 211G and the arrangement correlation calculation unit 311G each perform the corresponding processing described above, and the signals (arrangement correlation values) output from the arrangement correlation calculation unit 311G are supplied to the square calculation unit 571G. The square calculation unit 571G performs a square calculation on the arrangement correlation values sequentially input from the arrangement correlation calculation unit 311G and outputs the results of the square calculation to the selection/determination unit 572 (more specifically, to a maximum value detection unit 591G and a reliability degree detection unit 592G illustrated in FIG. 24, explanation of which is provided in the following).

The selection/determination unit 572, as described in the following with reference to FIG. 24, detects, for the P1 symbol, a carrier frequency error amount having a frequency domain size in units of a subcarrier spacing of the P1 symbol (a wide band carrier frequency error amount) by using the signals output from the power calculation unit 173, the signals output from the square calculation unit 571U, and the signals output from the square calculation unit 571G. The selection/determination unit 572 outputs the wide band carrier frequency error amount so detected to the fc correction unit 102 and the correction unit 180 illustrated in FIG. 3.

The correction unit 180 corrects the wide band carrier frequency shift of the signal output from the P1 orthogonal transformation unit 153U by using the wide band carrier frequency error amount input from the selection/determination unit 572 and extracts active carriers.

In the following, explanation is provided of the selection/determination unit 572 illustrated in FIG. 23 with reference to FIG. 24. FIG. 24 illustrates a structure of the selection/determination unit 572 illustrated in FIG. 23. Note that, in order as to clarify input to each of the units of the selection/determination unit 572, the power calculation unit 173, the square calculation unit 571U, and the square calculation unit 571G are also illustrated in FIG. 24.

The selection/determination unit 572 includes: the maximum value detection unit 331; the reliability degree detection unit 332; the maximum value detection unit 591U; the reliability degree detection unit 592U; the maximum value detection unit 591G; the reliability degree detection unit 592G; a judgment unit 593; and a selection unit 594.

The maximum value detection unit 331 and the reliability degree detection unit 332 each perform the corresponding processing described above to respectively detect the first candidate of the wide band carrier frequency error amount and the reliability degree of the first candidate. Further, the maximum value detection unit 331 and the reliability degree detection unit 332 respectively output the first candidate of the wide band carrier frequency error amount and the reliability degree of the first candidate to the selection unit 594 and the judgment unit 593.

The maximum value detection unit 591U detects a greatest arrangement correlation squared value from among the arrangement correlation squared values sequentially input from the square calculation unit 571U. Further, the maximum value detection unit 591U outputs a shift amount which yields the greatest arrangement correlation squared value to the selection unit 594 as a candidate of the frequency error amount having a frequency domain size in units of a subcarrier spacing of the P1 symbol (second candidate of the wide band carrier frequency error amount).

The reliability degree detection unit 592U detects the greatest arrangement correlation squared value and the second greatest arrangement correlation squared value from among the arrangement correlation squared values sequentially input from the square calculation unit 571U. Further, the reliability degree detection unit 592U divides the greatest arrangement correlation squared value by the second greatest arrangement correlation squared value and outputs a value obtained as a result of the division (greatest arrangement correlation squared value÷second greatest arrangement correlation squared value) to the judgment unit 593 as the reliability degree of the second candidate of the wide band carrier frequency error amount.

The maximum value detection unit 591G detects the greatest arrangement correlation squared value from among the arrangement correlation squared values sequentially input from the square calculation unit 571G. Further, the maximum value detection unit 591G outputs a shift amount that is larger, by a frequency corresponding to one subcarrier, than the shift amount which yields the greatest arrangement correlation squared value to the selection unit 594 as a candidate of the frequency error amount having a frequency domain size in units of a subcarrier spacing of the P1 symbol (a third candidate of the wide band carrier frequency error amount). The shift amount larger, by a frequency corresponding to one subcarrier, than the shift amount which yields the maximum arrangement correlation squared value is determined as the third candidate of the wide band carrier frequency error amount since the signal whose wide band carrier frequency shift has been corrected by the correction unit 180 is a signal for the useful symbol duration, and the signal for the guard interval duration is yielded by frequency shifting the signal for the useful symbol duration in the high frequency direction by a frequency corresponding to one subcarrier. Note that for instance, when the signal for the guard interval duration input to the orthogonal transformation unit 153G or the signal for the guard interval duration output from the orthogonal transformation unit 153G is frequency shifted by a frequency $-f_{SH}$ (when frequency shifting is performed in the low frequency direction by a frequency corresponding to one subcarrier), the maximum value detection unit 591G outputs a shift amount yielding the maximum arrangement correlation squared value to the selection unit 594 as the third candidate of the wide band carrier frequency error amount.

The reliability degree detection unit 592G detects the greatest arrangement correlation squared value and the second greatest arrangement correlation squared value from among the arrangement correlation squared values sequentially input from the square calculation unit 571U. Further, the reliability degree detection unit 592U divides the greatest arrangement correlation squared value by the second greatest arrangement correlation squared value and outputs a value obtained as a result of the division (greatest arrangement correlation squared value÷second greatest arrangement correlation squared value) to the judgment unit 593 as the reliability degree of the second candidate of the wide band carrier frequency error amount.

The judgment unit 593 compares the reliability degrees of the first, second, and third candidates of the wide band carrier frequency error amount respectively input from the reliability degree detection units 332, 592U, and 592G and detects the candidate of the wide band carrier frequency error amount having the highest reliability degree (having the greatest reliability degree value) among the first, second, and third candidates of the wide band carrier frequency error amount. Further, the judgment unit 593 notifies the selection unit 594 of the candidate of the wide band carrier frequency error amount having the highest reliability degree.

According to the notification made by the judgment unit 593, the selection unit 594 selects the candidate having the highest reliability degree from among the first, second, and third candidates of the wide band carrier frequency error amount respectively input from the maximum value detection units 331, 591U, and 591G. Further, the selection unit 594 outputs the selected candidate of the wide band carrier frequency error amount to the fc correction unit 102 illustrated in FIG. 3 and the correction unit 180 illustrated in FIG. 23 as the wide band carrier frequency error amount to be used in the correction of the wide band carrier frequency shift of the P1 symbol.

Note that the complex multiplication unit 171, the arrangement correlation calculation unit 172, the power calculation unit 173, the maximum value detection unit 331, and the reliability degree detection unit 332 are blocks that detect the first candidate of the wide band carrier frequency error amount by using both the signal output from the orthogonal transformation unit 153U and the signal output from the orthogonal transformation unit 153G and perform the first detection processing of detecting the reliability degree of the first candidate.

On the other hand, the power calculation unit 211U, the arrangement correlation calculation unit 311U, the square calculation unit 571U, the maximum value detection unit 591U, and the reliability degree detection unit 592U are blocks that detect the second candidate of the wide band carrier frequency error amount by using only the signal output from the orthogonal transformation unit 153U, among the signal output from the orthogonal transformation unit 153U and the signal output from the orthogonal transformation unit 153G, and perform the second detection processing of detecting the reliability degree of the second candidate.

Further, the power calculation unit 211G, the arrangement correlation calculation unit 311G, the square calculation unit 571G, the maximum value detection unit 591G, and the reliability degree detection unit 592G are blocks that detect the third candidate of the wide band carrier frequency error amount by using only the signal output from the orthogonal transformation unit 153G, among the signal output from the orthogonal transformation unit 153U and the signal output from the orthogonal transformation unit 153G, and perform the third detection processing of detecting the reliability degree of the third candidate.

According to the present embodiment, the estimation of the wide band carrier frequency error amount can be performed with a high degree of accuracy even in an environment where impulse noises locally exist in the preceding guard interval duration, the succeeding guard interval duration, or the useful symbol duration, as well as in an environment with multi-path interference and/or an environment with noise.

Embodiment 10

In the following, explanation is provided of embodiment 10 of the present invention with reference to the accompanying drawings. Note that in the present embodiment, constituent elements that are substantially the same as the constituent elements of embodiments 1 through 9 are indicated with the same reference signs, and description thereof is omitted, since the same description as in embodiments 1 through 9 applies.

The OFDM reception device pertaining to embodiment 10 differs from the OFDM reception devices, explanation of which has been provided in embodiments 1 through 9, in that the OFDM reception device pertaining to embodiment 10 includes a P1 wide band fc error detection/correction unit 600 that differs from the P1 wide band fc error detection/correction unit 155 and the like. In specific, the P1 wide band fc error detection/correction unit 600 is yielded by adding, to the P1 wide band fc error detection/correction unit 155 and the like, functions of (i) selecting one of the signal output from the P1 orthogonal transformation unit 153U and the signal output from the P1 orthogonal transformation unit 153G and (ii) performing the correction of the wide band carrier frequency shift of the P1 symbol on the signal so selected.

Figure 25:
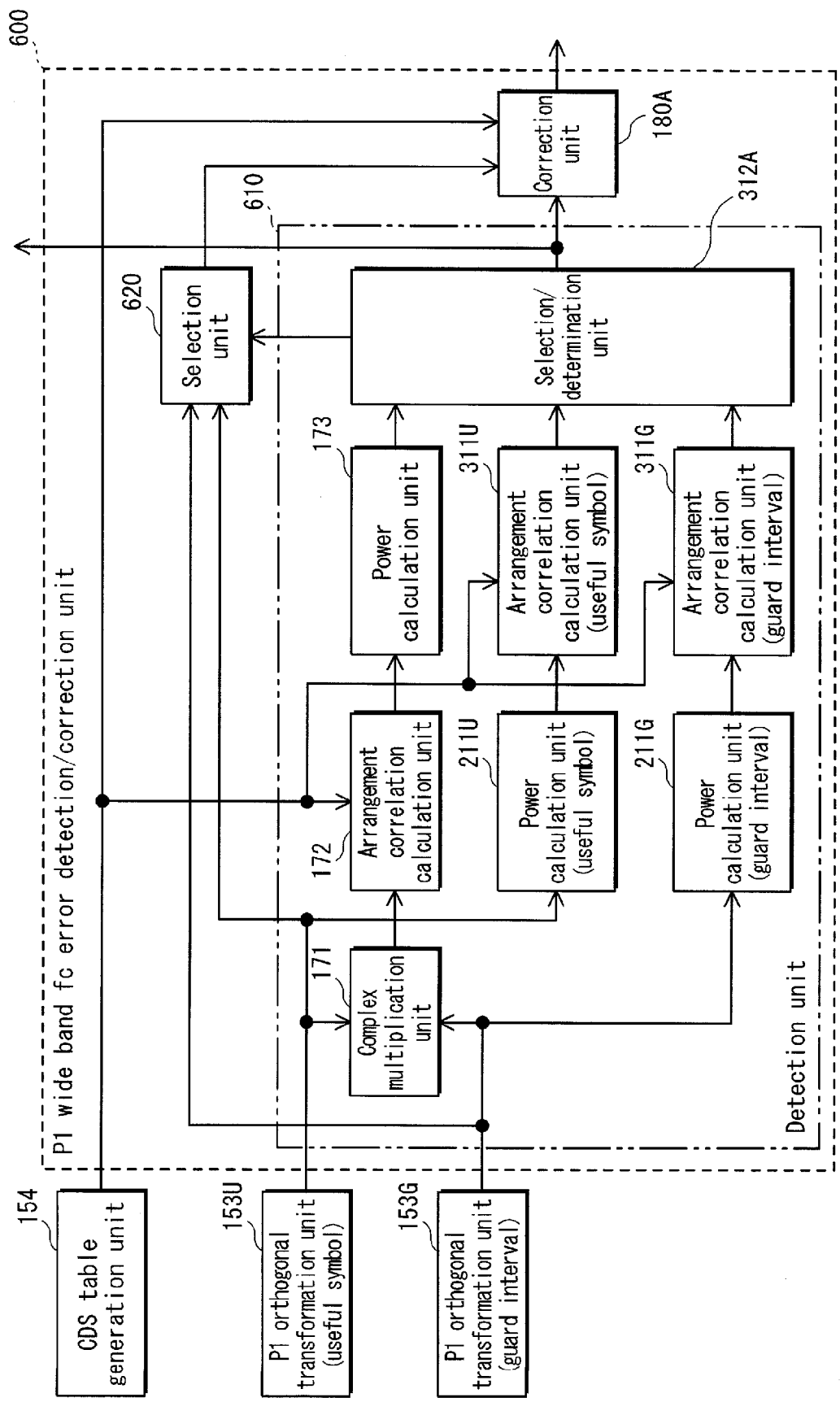
FIG. 25 illustrates a structure of a P1 wide band error detection/correction unit 600 pertaining to embodiment 10.

In the following, explanation is provided of the P1 wide band fc error detection/correction unit 600 pertaining to embodiment 10 with reference to FIG. 25. FIG. 25 illustrates a structure of the P1 wide band fc error detection/correction unit 600. Note that, in order as to clarify input to each of the units of the P1 wide band fc error detection/correction unit 600, the P1 orthogonal transformation unit 153U, the P1 orthogonal transformation unit 153G, and the CDS table generation unit 154 are illustrated in FIG. 25.

Figure 26:
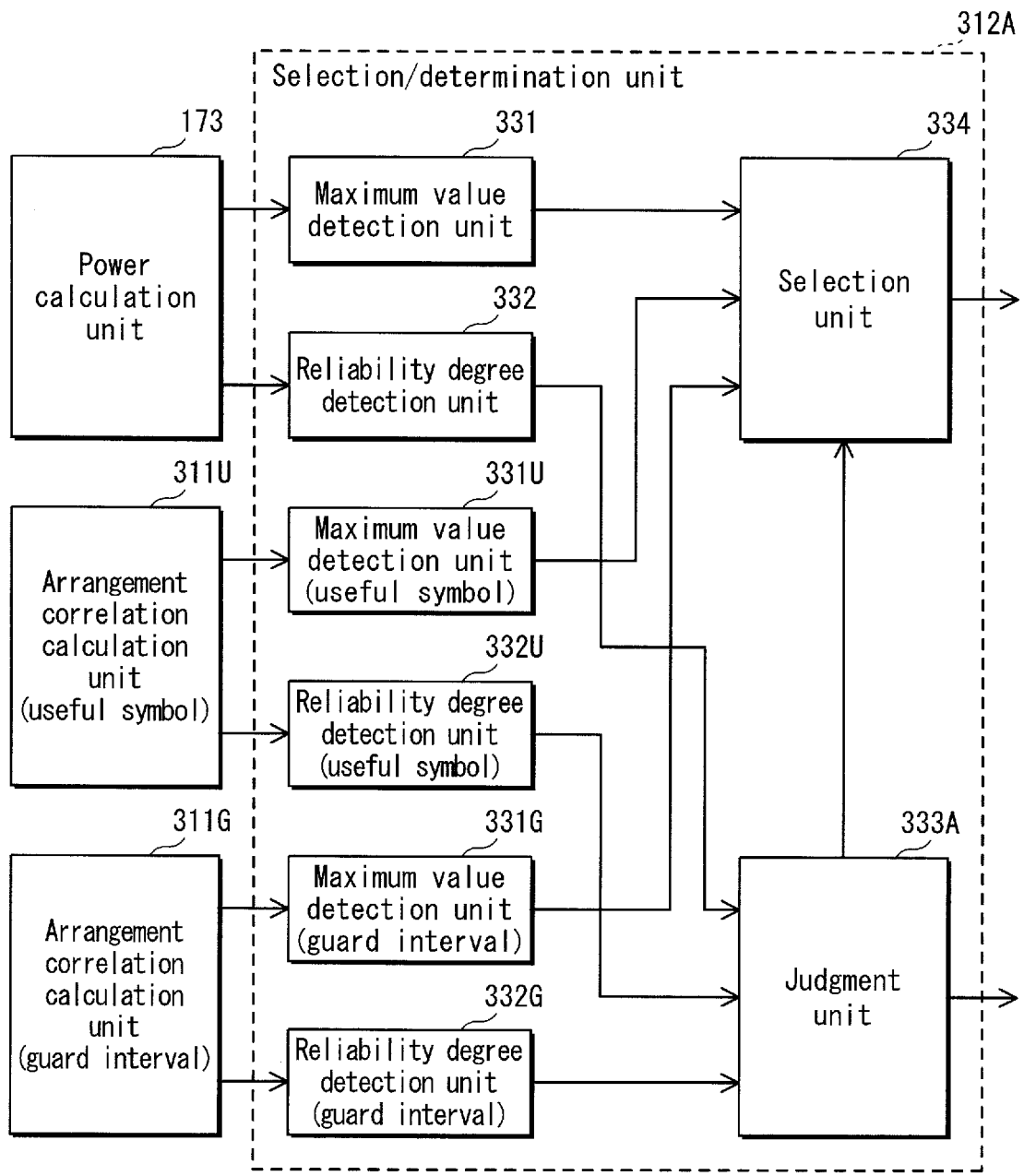
FIG. 26 illustrates a structure of a selection/determination unit 312A illustrated in FIG. 25.
Figure 27:
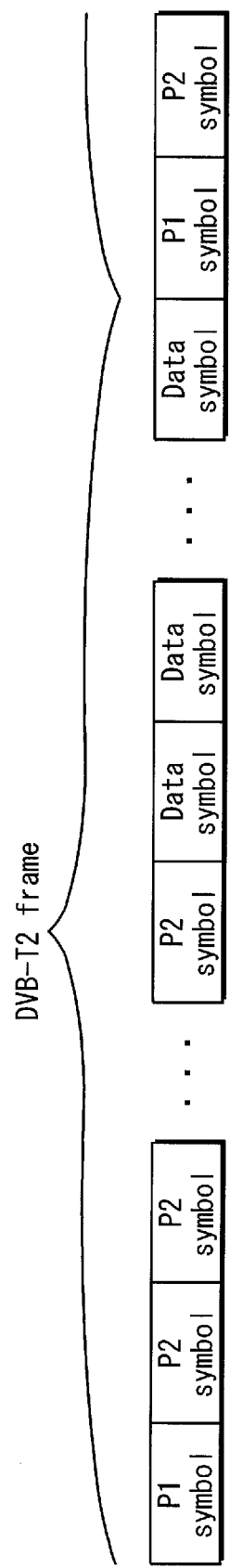
FIG. 27 is a schematic diagram illustrating a frame structure under the DVB-T2 transmission standard.

The detection unit 610 includes a selection unit 312A instead of the selection/determination unit 312 included in the detection unit 310 illustrated in FIG. 13. The selection unit 312A has a structure as illustrated in FIG. 26 and includes a judgment unit 333A instead of the judgment unit 333 illustrated in FIG. 14.

The judgment unit 333A has the following functions in addition to the functions of the judgment unit 333. The judgment unit 333A compares the reliability degrees of the first, second, and third candidates of the wide band carrier frequency error amount respectively input from the reliability degree detection units 332, 332U, and 332G. Further, when the first candidate has the highest reliability degree, the judgment unit 333A notifies the selection unit 620 to select the signal output from the P1 orthogonal transformation unit 153U and to output the signal so selected to a correction unit 180A. Similarly, when the second candidate has the highest reliability degree, the judgment unit 333A notifies the selection unit 620 to select the signal output from the P1 orthogonal transformation unit 153U and to output the signal so selected to the correction unit 180A. Finally, when the third candidate has the highest reliability degree, the judgment unit 333A notifies the selection unit 620 to select the signal output from the P1 orthogonal transformation unit 153G and to output the signal so selected to the correction unit 180A.

Note that the judgment unit 333A compares the reliability degrees of the second and third candidates of the wide band carrier frequency error amount respectively input from the reliability degree detection units 332U and 332G. When the second candidate has a higher reliability degree, the judgment unit 333A notifies the selection unit 620 to select the signal output from the P1 orthogonal transformation unit 153U and to output the signal so selected to the correction unit 180A. On the other hand, when the third candidate has a higher reliability degree, the judgment unit 333A may notify the selection unit 620 to select the signal output from the P1 orthogonal transformation unit 153G and to output the signal so selected to the correction unit 180A.

According to the notification made by the judgment unit 333A included in the selection/determination unit 312A, the selection unit 620 illustrated in FIG. 25 selects one of the signal output from the P1 orthogonal transformation unit 153U and the signal output from the P1 orthogonal transformer 153G and outputs the signal so selected to the correction unit 180A.

The correction unit 180A corrects the wide band carrier frequency shift of the signal (a frequency domain complex baseband signal) output from the selection unit 620 by using the wide band carrier frequency error amount output from the selection unit 334 included in the selection/determination unit 312A. The correction unit 180A extracts only the active carriers from the frequency domain complex baseband signal whose wide band carrier frequency shift has been corrected by using the active carrier arrangement sequence input from the CDS table generation unit 154 and outputs the active carriers so extracted to the P1 decoding unit 156 illustrated in FIG. 4 (more specifically, to the descrambling unit 191 illustrated in FIG. 7). Note that the selection unit 334A included in the selection/determination unit 312A supplies the wide band carrier frequency error amount for the frequency domain signal for the useful symbol duration to the correction unit 180A. The signal for the combined guard interval duration is a signal yielded by frequency shifting the signal for the useful symbol duration by a frequency $f_{SH}$ (by frequency shifting the signal for the useful symbol duration in the high frequency direction by a frequency corresponding to one subcarrier). Accordingly, when the selection unit 620 selects the signal output from the P1 orthogonal transformation unit 153G, the correction unit 180A corrects a wide band carrier frequency shift that is smaller, by a frequency corresponding to one subcarrier, than the wide band carrier frequency error amount supplied thereto.

According to the present embodiment, the decoding of the P1 symbol is performed by using the signal having a higher reliability degree among the signal for the useful symbol duration and the signal for the combined guard interval duration. Hence, the accuracy with which the decoding of the P1 symbol is performed is improved.

<Supplement>

The present invention is not limited to the above-described embodiments but rather may be implemented in any form in order to achieve the object of the present invention or a related or associated object thereof. For example, the following modifications are possible.

(1) The complex multiplication unit 171, the multiplication unit 212, and the multiplication unit 272 explained in the above-presented embodiments respectively perform calculation according to Math 16, Math 19, Math 20 provided in the above taking into consideration that the signal for the combined guard interval duration is frequency shifted in the high frequency direction by a frequency corresponding to one subcarrier with respect to the signal for the useful symbol duration. However, the present invention is not limited to this, and provided that consideration is made that the signal for the combined guard interval duration is frequency shifted in the high frequency direction by one subcarrier, processing may be performed as provided in the following, for instance.

A frequency shift correction unit may be additionally provided to perform processing preceding the P1 orthogonal transformation unit 153G. The frequency shift correction unit frequency shifts the time domain complex baseband signal for the combined guard interval duration of the P1 symbol by a frequency $-f_{sh}$ (i.e. performs correction by frequency shifting in a direction opposite the direction to which the signal for the guard interval duration has been frequency shifted and thereby eliminating the frequency shift corresponding to a frequency $f_{sh}$ having been added at the transmitting end) and outputs the frequency shifted time domain complex baseband signal to the P1 orthogonal transformation unit 153G. Alternatively, a frequency shift correction unit may be additionally provided to perform processing succeeding the P1 orthogonal transformation unit 153G. The frequency shift correction unit performs correction by frequency shifting the signal (frequency domain complex baseband signal for the combined guard interval duration of the P1 symbol) output from the P1 orthogonal transformation unit 153G in the low frequency direction by a frequency corresponding to one subcarrier (i.e. performs correction processing by frequency shifting in a direction opposite the direction to which the signal for the guard interval duration has been frequency shifted and thereby eliminating the frequency shift corresponding to a frequency $f_{sh}$ having been added at the transmitting end) and outputs a time domain complex baseband signal which has been corrected by frequency shifting in the low frequency direction by a frequency corresponding to one subcarrier to the P1 wide band fc error detection/correction unit 155. Alternatively, the P1 orthogonal transformation unit 153G may perform correction by frequency shifting the time domain complex baseband signal by a frequency $-f_{sh}$ when performing the orthogonal transformation.

In such cases, the complex multiplication unit 171 is to perform the calculation indicated in Math 21 below instead of performing the calculation indicated in Math 16 above, the multiplication unit 212 is to perform the calculation indicated in Math 22 below instead of performing the calculation indicated in Math 19 above, and the multiplication unit 272 is to perform the calculation indicated in Math 23 below instead of performing the calculation indicated in Math 20 above.

$$Y_{comb}(n)=Y_U(n) \cdot Y_G(n)^* \qquad \text{Math 21}$$

$$Y_{comb}(n)=|Y_U(n)|^2 \cdot |Y_G(n)|^2 \qquad \text{Math 22}$$

$$Y_{comb}(n)=|Y_U(n)| \cdot |Y_G(n)| \qquad \text{Math 23}$$

Note that the complex multiplication unit 171 may multiply the signal $Y_U(n)^*$, which is the complex conjugate of the output signal $Y_U(n)$, and the output signal $Y_G(n)$ instead of performing the calculation indicated by Math 21 above.

In addition, when the signal for the guard interval duration (the preceding guard interval duration and the succeeding guard interval duration) is a signal yielded by frequency shifting the signal for the useful symbol duration in the high frequency direction by a frequency $f_x$, which is a frequency corresponding to an X number of subcarriers (X being an integer), the above-described frequency shift correction unit may perform processing as described in the following. That is, the frequency shift correction unit may perform correction processing (processing of frequency shifting by a frequency $-f_x$) of frequency shifting in a direction opposite the direction to which the signal for the guard interval duration has been frequency shifted and thereby eliminating the frequency shift corresponding to a frequency $f_x$ having been added at the transmitting end.

Here, when X takes a negative value, the signal for the guard interval duration has been yielded by frequency shifting the signal for the useful symbol duration in the low frequency direction by a frequency corresponding to an (X) number of subcarriers.

(2) The complex multiplication unit 171, the multiplication unit 212, and the multiplication unit 272 explained in the above-presented embodiments respectively perform calculation according to Math 16, Math 19, Math 20 provided in the above taking into consideration that the signal for the combined guard interval duration is frequency shifted in the high frequency direction by a frequency corresponding to one subcarrier with respect to the signal for the useful symbol duration. However, when the signal for the guard interval duration (the preceding guard interval duration and the succeeding guard interval duration) is a signal yielded by frequency shifting the signal for the useful symbol duration in the high frequency direction by a frequency $f_x$, which is a frequency corresponding to an X number of subcarriers (X being an integer), the complex multiplication unit 171 is to perform the calculation indicated in Math 24 below instead of performing the calculation indicated in Math 16 above, the multiplication unit 212 is to perform the calculation indicated in Math 25 below instead of performing the calculation indicated in Math 19 above, and the multiplication unit 272 is to perform the calculation indicated in Math 26 below instead of performing the calculation indicated in Math 20 above.

$$Y_{comb}(n)=Y_U(n) \cdot Y_G(n+X)^* \qquad \text{Math 24}$$

$$Y_{comb}(n)=|Y_U(n)|^2 \cdot |Y_G(n+X)|^2 \qquad \text{Math 25}$$

$$Y_{comb}(n)=|Y_U(n)| \cdot |Y_G(n+X)| \qquad \text{Math 26}$$

Here, when X takes a negative value, the signal for the guard interval duration has been yielded by frequency shifting the signal for the useful symbol duration in the low frequency direction by a frequency corresponding to an (X) number of subcarriers.

In addition, the complex multiplication unit 171 may multiply the signal $Y_U(n)^*$, which is the complex conjugate of the output signal $Y_U(n)$, and the output signal $Y_G(n)$ instead of performing the calculation indicated by Math 24 above.

(3) In embodiment 4 and the successive embodiments, a value obtained by dividing a greatest value of a signal input to a reliability degree detection unit by a second greatest value of the signal input to the reliability degree detection unit (greatest value÷second greatest value) is used as a value indicating a reliability degree of a candidate of the wide band carrier frequency error amount. However, the present invention is not limited to this, and other values may be applied as the value indicating a reliability degree, provided that such values measure reliability by reflecting the influences that the signal qualities of the active carriers and the null carriers have on the arrangement correlations. For instance, such values as provided in the following may be used as the value indicating the reliability degree. For instance, a value obtained by dividing a second greatest value of a signal input to a reliability degree detection unit by the greatest value of the signal input to the reliability degree detection unit (second greatest value÷greatest value) may be used as the value indicating a reliability degree of a candidate of the wide band carrier frequency error amount. In such a case, a candidate of the wide band carrier frequency error amount is considered as having a high reliability degree when a relatively small value is obtained as a result of the division. Alternatively, the greatest value of a signal input to a reliability degree detection unit may be used as the value indicating a reliability degree of a candidate of the wide band carrier frequency error amount. In such a case, a candidate of the wide band carrier frequency error amount is considered as having a high reliability degree when the greatest value is a relatively great value. Further, a value indicating the difference between the greatest value of a signal input to a reliability degree detection unit and the second greatest value of the signal input to the reliability degree detection unit may be used as the value indicating a reliability degree of a candidate of the wide band carrier frequency error amount. In such a case, a candidate of the wide band carrier frequency error amount is considered as having a high reliability degree when the value indicating the difference is a relatively great value.

(4) In embodiment 4 and the successive embodiments, explanation is provided that three types of processing, namely the first detection processing, the second detection processing, and the third detection processing, are performed. However, the present invention is not limited to this, and configuration may be made such that only two of the three types of processing are performed.

(5) In embodiment 10 above, the P1 wide band fc error detection/correction unit 600 is provided with the functions of (i) selecting one of the signal output from the P1 orthogonal transformation unit 153U and the signal output from the P1 orthogonal transformation unit 153G and (ii) correcting the wide band carrier frequency shift of the signal so selected. Such functions may also be provided to the P1 wide band fc error detection/correction units 350, 400, 450, 500, and 550, explanation of which is respectively provided in embodiments 5 though 9.

(6) In the above embodiments, one orthogonal transformation unit is provided, among the orthogonal transformation unit 106, the P1 orthogonal transformation unit 153U, and the P1 orthogonal transformation unit 153G, for each orthogonal transformation performed. However, the present invention is not limited to this, and some or all of these units may be used in common.

(7) In the above embodiments, the narrow band carrier frequency error amount and the wide band carrier frequency error amount detected by the respective P1 demodulation units are output to the fc correction unit 102, where both are used to correct the carrier frequency shift of the P1 symbol. However, the present invention is not limited to this, and the fc correction unit 102 may use only one, or neither, of the narrow band carrier frequency error amount and the wide band carrier frequency error amount, both of which having been detected by the respective P1 demodulation units.

In addition, the method according to which the narrow band fc error calculation unit 105 and the wide band fc error calculation unit 107 respectively calculate the narrow band carrier frequency error amount and the wide band carrier frequency error amount for the P2 symbols and the data symbols and the method according to which the P1 narrow band fc error detection/correction unit 152 detects the narrow band carrier frequency error amount for the P1 symbol is not limited to the methods provided in the above, and a known method may be applied. For instance, the narrow band carrier frequency error amount may be calculated from the phase difference between pilot symbols included in the P2 symbols and the data symbols in the signal output from the orthogonal transformation unit 106.

(8) In the above embodiments, explanation has been provided of OFDM reception devices and the like which conform to the DVB-T2 transmission standard. However, the present invention is not limited this and is also applicable to, for instance, an OFDM reception device or the like conforming to a broadcasting standard making use of an FEF part, since a P1 symbol is similarly inserted at the top of an FEF part in a broadcasting standard using FEF parts within the DVB-T2 transmission standard.

(9) In the above embodiments, explanation has been provided on the P1 symbol conforming to the DVB-T2 transmission format. However, the present invention is not limited to this, and may also be applied to an OFDM symbol including a signal for a useful symbol duration and a signal for a guard interval duration generated based on the signal for the useful symbol duration.

For instance, the signal for the guard interval duration is not limited to a signal yielded by frequency shifting the signal for the useful symbol duration by a frequency $f_{SH}$. That is, the signal for the useful symbol duration need not be frequency shifted, or may be frequency shifted by a frequency other than the frequency $f_{SH}$. Furthermore, the signal for the guard interval duration is not limited to a signal yielded by frequency shifting the entire signal for the useful symbol duration. The signal for the guard interval duration may be yielded by frequency shifting a portion of the signal for the useful symbol duration, with the remaining portion of the signal for the useful symbol duration not being frequency shifted.

In addition, the guard interval duration is not limited to being divided into the preceding guard interval duration and the succeeding guard interval duration. That is, the guard interval duration may be composed of only the preceding guard interval duration or only the succeeding guard interval duration. Note that the guard interval duration may also be divided into three or more sections. For instance, the useful interval duration may be divided into sections, and a section of the guard interval duration may be inserted between sections of the useful interval duration.

The time domain length of the guard interval duration is not limited to matching the time domain length of the useful symbol duration. That is, the time domain length of the guard interval duration may differ from the time domain length of the useful symbol duration.

(10) In the above embodiments, the FFT size is 1 k, but the FFT size is not limited to 1 k and may be a different value (such as 2 k, 4 k, 8 k, or the like).

(11) In the above embodiments, differential demodulation is demodulation corresponding to DBPSK, but differential demodulation is not limited in this way. The differential demodulation may be demodulation corresponding to differential modulation other than DBPSK, such as Differential Quadrature Phase Shift Keying (DQPSK). Further, in the above embodiments, explanation is provided taking differential demodulation as an example, but the demodulation need not be differential demodulation.

(12) In the above embodiments, explanation is provided that the active carriers in the P1 symbol are arranged as illustrated in FIG. 32 since explanation has been provided based on the DVB-T2 transmission standard. However, the present invention is not limited to this, and the arrangement of active carriers is to be determined in accordance with the broadcasting method applied.

(13) Each of the constituent elements in the reception device of each of the above embodiments may be implemented as an LSI, which is an integrated circuit. In this case, the constituent elements may respectively be made into discrete chips, or part or all of the components may be made into one chip. While described here as an LSI, depending on the degree of integration, the terms IC, system LSI, super LSI, or ultra LSI are also used. In addition, the method for assembling integrated circuits is not limited to LSI, and a dedicated circuit or a general-purpose processor may be used. A Field Programmable Gate Array (FPGA) or a reconfigurable processor, which allows reconfiguration of the connection and setting of circuit cells inside the LSI, may be used. Furthermore, if technology for assembling integrated circuits that replace LSIs emerges, owing to advances in semiconductor technology or to another derivative technology, the integration of functional blocks may naturally be accomplished using such technology. The application of biotechnology or the like is possible.

(14) At least a portion of the procedures for operations by the reception device described in the above embodiments may be listed in a reception program. For example, a Central Processing Unit (CPU) may read the program from a memory and execute the program, or the program may be stored on a recording medium for distribution or the like.

(15) A reception device may be implemented to perform at least a portion of the reception processing by the reception device in the above embodiments.

(16) The above embodiments may be achieved by combining any reception device, reception method, reception circuit, or program for performing a portion of the reception processing achieved by the above embodiments. For example, the embodiments may be achieved as follows. A portion of the structure of the reception device described in the above embodiments may be achieved by a reception device or an integrated circuit, whereas the procedures for operations performed by the remaining structures may be listed in a reception program and stored in memory. A CPU, for example, may then read and execute the reception program.

(17) The contents of the above embodiments and the like may be combined as appropriate.

INDUSTRIAL APPLICABILITY

The present invention can be applied in an OFDM reception device that receives OFDM symbols including a signal for a useful symbol duration and a signal for a guard interval duration generated based on the signal for the useful symbol duration.

REFERENCE SIGNS LIST 30 demodulation unit
103 P1 demodulation unit
151 P1 position detection unit
152 P1 narrow band fc error detection/correction unit
153U P1 orthogonal transformation unit
153G P1 orthogonal transformation unit
154 CDS table generation unit
155 P1 wide band fc error detection/correction unit
170 detection unit
171 complex multiplication unit
172 arrangement correlation unit
173 power calculation unit
174 maximum value detection unit
180 correction unit

The invention claimed is:

1. An OFDM reception device for receiving an OFDM symbol that includes a signal for a useful symbol duration and a signal for a guard interval duration generated based on the signal for the useful symbol duration, the OFDM reception device comprising:
a first orthogonal transformation unit that orthogonally transforms the signal for the useful symbol duration and outputs a resulting orthogonally transformed signal;
a second orthogonal transformation unit that orthogonally transforms the signal for the guard interval duration and outputs a resulting orthogonally transformed signal;
a detection unit that detects a wide band carrier frequency error amount according to the signal output from the first orthogonal transformation unit and the signal output from the second orthogonal transformation unit, the wide band carrier frequency error amount having a frequency domain size in units of a subcarrier spacing of the OFDM symbol and being a first type of a carrier frequency error amount, a second type of a carrier frequency error amount being a narrow band carrier frequency error amount, the narrow band carrier frequency error amount having a frequency domain size less than one subcarrier spacing of the OFDM symbol; and
a correction unit that corrects a wide band carrier frequency shift of the OFDM symbol according to the wide band carrier frequency error amount.

2. The OFDM reception device of claim 1, wherein
the signal for the guard interval duration results from a frequency shift applied to the signal for the useful symbol duration.

3. The OFDM reception device of claim 2, further comprising:
a frequency shift correction unit that corrects one of (i) the signal for the guard interval duration input to the second orthogonal transformation unit and (ii) the signal output from the second orthogonal transformation unit by applying an opposite direction frequency shift so as to eliminate the frequency shift applied to the signal for the useful symbol duration, wherein
the detection unit detects the wide band carrier frequency error amount according to the signal output from the first orthogonal transformation unit and one of (i) the signal output from the second orthogonal transformation unit, which has been corrected by the frequency shift correction unit, and (ii) the signal output from the frequency shift correction unit, which has been orthogonally transformed by the second orthogonal transformation unit.

4. The OFDM reception device of claim 1, wherein
the OFDM symbol is a P1 symbol in the DVB-T2 transmission standard,
the guard interval duration includes a preceding guard interval duration that precedes the useful symbol duration and a succeeding guard interval duration that follows the useful symbol duration, and
the second orthogonal transformation unit performs the orthogonal transformation by orthogonally transforming a signal that is a combination of a signal for the preceding guard interval duration and a signal for the succeeding guard interval duration.

5. The OFDM reception device of claim 1, wherein
the OFDM symbol includes a plurality of subcarriers, the subcarriers including active carriers and null carriers,
a predetermined arrangement pattern specifies positions, in the OFDM symbol, of subcarriers corresponding to the active carriers, and
the detection unit performs summation processing with respect to continuous subcarriers of a signal in accordance with the signals output from the first and second orthogonal transformation units, the summation processing being processing of summing values of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing, and
the detection unit detects the wide band carrier frequency error amount according to results of iterations of the summation processing.

6. The OFDM reception device of claim 5, wherein the detection unit includes:
- a complex multiplication unit that performs a complex multiplication of corresponding subcarriers of the signals output from the first and second orthogonal transformation units to obtain complex products of the continuous subcarriers;
- a summation processing unit that performs the summation processing by summing complex products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing;
- a power calculation unit that calculates power values for signals output from the summation processing unit and that outputs the power values so calculated, the signals output from the summation processing unit each being a result of an iteration of the summation processing; and
- a maximum value detection unit that detects the wide band carrier frequency error amount by detecting the greatest power value among the power values output from the power calculation unit.

7. The OFDM reception device of claim 5, wherein the detection unit includes:
- a first power calculation unit that calculates a power value for each subcarrier of the signal output from the first orthogonal transformation unit;
- a second power calculation unit that calculates a power value for each subcarrier of the signal output from the second orthogonal transformation unit;
- a multiplication unit that performs multiplication of power values of corresponding subcarriers of the signals output from the first and second orthogonal transformation units to obtain products of the continuous subcarriers;
- a summation processing unit that performs the summation processing by summing products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing; and
- a maximum value detection unit that detects the wide band carrier frequency error amount by detecting the greatest value among values of signals output from the summation processing unit, the signals output from the summation processing unit each being a result of an iteration of the summation processing.

8. The OFDM reception device of claim 5, wherein the detection unit includes:
- a first amplitude calculation unit that calculates an amplitude value for each subcarrier of the signal output from the first orthogonal transformation unit;
- a second power calculation unit that calculates an amplitude value for each subcarrier of the signal output from the second orthogonal transformation unit;
- a multiplication unit that performs multiplication of amplitude values of corresponding subcarriers of the signals output from the first and second orthogonal transformation units to obtain products of the continuous subcarriers;
- a summation processing unit that performs the summation processing by summing products of subcarriers, among the continuous subcarriers, at positions matching the positions of the subcarriers corresponding to the active carriers in the OFDM symbol specified by the predetermined arrangement pattern, the continuous subcarriers being shifted one subcarrier at a time in a subcarrier direction within a predetermined range for every iteration of the summation processing; and
- a maximum value detection unit that detects the wide band carrier frequency error amount by detecting the greatest value among values of signals output from the summation processing unit, the signals output from the summation processing unit each being a result of an iteration of the summation processing.

9. The OFDM reception device of claim 1, wherein the OFDM symbol includes a plurality of subcarriers, the subcarriers including active carriers and null carriers, a predetermined arrangement pattern specifies positions, in the OFDM symbol, of subcarriers corresponding to the active carriers, the detection unit performs at least two of:
- (i) a first detection processing of detecting a first candidate of the wide band carrier frequency error amount by using both the signal output from the first orthogonal transformation unit and the signal output from the second orthogonal transformation unit and of further detecting a reliability degree of the first candidate;
- (ii) a second detection processing of detecting a second candidate of the wide band carrier frequency error amount by using only the signal output from the first orthogonal transformation unit, among the signals output from the first and second orthogonal transformation units, and of further detecting a reliability degree of the second candidate; and
- (iii) third detection processing of detecting a third candidate of the wide band carrier frequency error amount by using only the signal output from the second orthogonal transformation unit, among the signals output from the first and second orthogonal transformation units, and of further detecting a reliability degree of the third candidate, and the detection unit selects the candidate having the highest reliability degree among the first, second, and third candidates of the wide band carrier frequency error amount as the wide band carrier frequency error amount to be used by the correction unit for correcting the wide band carrier frequency shift of the OFDM symbol.

10. The OFDM reception device of claim 9, wherein the detection unit performs the first detection processing by (i) performing summation processing, with respect to a first signal in accordance with the signals output from the first and second orthogonal transformation units, of summing values of subcarriers, among continuous subcarriers of the first signal, at positions matching the positions of the subcarriers corresponding to the active carriers in the OFDM symbol specified by the predetermined arrangement pattern, the continuous subcarriers of the first signal being shifted one subcarrier at a time in a subcarrier direction within a predetermined range for every iteration of the summation processing performed with respect to the first signal, and (ii) detecting the first candidate of the wide band carrier frequency error amount and the reliability degree of the first candidate according to results of the summation processing performed with respect to the first signal, the detection unit performs the second detection processing by (i) performing summation processing, with respect to a second signal in accordance with the signal output from the first orthogonal transformation unit, of summing values of subcarriers, among continuous subcarriers of the second signal, at positions matching the positions of the subcarriers corresponding to the active carriers in the OFDM symbol specified by the predetermined arrangement pattern, the continuous subcarriers of the second signal being shifted one subcarrier at a time in a subcarrier direction within a predetermined range for every iteration of the summation processing performed with respect to the second signal, and (ii) detecting the second candidate of the wide band carrier frequency error amount and the reliability degree of the second candidate according to results of the summation processing performed with respect to the second signal, and the detection unit performs the third detection processing by (i) performing summation processing, with respect to a third signal in accordance with the signal output from the second orthogonal transformation unit, of summing values of subcarriers, among continuous subcarriers of the third signal, at positions matching the positions of the subcarriers corresponding to the active carriers in the OFDM symbol specified by the predetermined arrangement pattern, the continuous subcarriers of the third signal being shifted one subcarrier at a time in a subcarrier direction within a predetermined range for every iteration of the summation processing performed with respect to the third signal, and (ii) detecting the third candidate of the wide band carrier frequency error amount and the reliability degree of the third candidate according to results of the summation processing performed with respect to the third signal.

11. The OFDM reception device of claim 10, wherein the reliability degree of each of the first, second, and third candidates is calculated as (i) a value obtained by dividing a greatest value, among the results of the summation processing performed with respect to the corresponding signal, by a second greatest value, among the results of the summation processing performed with respect to the corresponding signal, or (ii) a value obtained by dividing the second greatest value by the greatest value, and when the reliability degree is calculated by dividing the greatest value by the second greatest value, a relatively great value obtained as a result of division indicates a high reliability degree of the corresponding candidate, whereas when the reliability degree is calculated by dividing the second greatest value by the greatest value, a relatively great value obtained as a result of division indicates a high reliability degree of the corresponding candidate.

12. The OFDM reception device of claim 10, wherein the reliability degree of each of the first, second, and third candidates is a greatest value among the results of the summation processing performed with respect to the corresponding signal, and a greatest value for a candidate having a relatively high reliability degree indicates a relatively great value among the greatest values for the first, second, and third candidates.

13. The OFDM reception device of claim 10, wherein the reliability degree of each of the first, second, and third candidates is calculated as a value obtained by subtracting a second greatest value, among the results of the summation processing performed with respect to the corresponding signal, from a greatest value, among the results of the summation processing performed with respect to the corresponding signal, and a relatively great value obtained as a result of the subtraction indicates a high reliability degree of the corresponding candidate.

14. The OFDM reception device of claim 10, further comprising:

a selection unit that selects one of the signal for the useful symbol duration and the signal for the guard interval duration according to the reliability degrees of the first, second, and third candidates and that outputs a selected signal to the correction unit, wherein the correction unit corrects the wide band carrier frequency shift of the selected signal.

15. An OFDM reception circuit for receiving an OFDM symbol that includes a signal for a useful symbol duration and a signal for a guard interval duration generated based on the signal for the useful symbol duration, the OFDM reception circuit comprising:

a first orthogonal transformation circuit that orthogonally transforms the signal for the useful symbol duration and outputs a resulting orthogonally transformed signal;

a second orthogonal transformation circuit that orthogonally transforms the signal for the guard interval duration and outputs a resulting orthogonally transformed signal;

a detection circuit that detects a wide band carrier frequency error amount according to the signal output from the first orthogonal transformation circuit and the signal output from the second orthogonal transformation circuit, the wide band carrier frequency error amount having a frequency domain size in units of a subcarrier spacing of the OFDM symbol and being a first type of a carrier frequency error amount, a second type of a carrier frequency error amount being a narrow band carrier frequency error amount, the narrow band carrier frequency error amount having a frequency domain size less than one subcarrier spacing of the OFDM symbol; and a correction circuit that corrects a wide band carrier frequency shift of the OFDM symbol according to the wide band carrier frequency error amount.

16. An OFDM reception method used in an OFDM reception device for receiving an OFDM symbol that includes a signal for a useful symbol duration and a signal for a guard interval duration generated based on the signal for the useful symbol duration, the OFDM reception method comprising:

a first orthogonal transformation step of orthogonally transforming the signal for the useful symbol duration;

a second orthogonal transformation step of orthogonally transforming the signal for the guard interval duration;

a detection step of detecting a wide band carrier frequency error amount according to results of the orthogonal transformation in the first orthogonal transformation step and results of the orthogonal transformation in the second orthogonal transformation step, the wide band carrier frequency error amount having a frequency domain size in units of a subcarrier spacing of the OFDM symbol and being a first type of a carrier frequency error amount, a second type of a carrier frequency error amount being a narrow band carrier frequency error amount, the narrow band carrier frequency error amount having a frequency domain size less than one subcarrier spacing of the OFDM symbol; and a correction step of correcting a wide band carrier frequency shift of the OFDM symbol according to the wide band carrier frequency error amount.

* * * * *